United States Patent
Ikeda et al.

(10) Patent No.: US 10,254,702 B2
(45) Date of Patent: Apr. 9, 2019

(54) END MEMBER, PHOTOSENSITIVE DRUM UNIT, AND PROCESS CARTRIDGE

(71) Applicants: Mitsubishi Chemical Corporation, Chiyoda-ku (JP); GENERAL PLASTIC INDUSTRIAL CO., LTD., Wu-Chi Town (TW)

(72) Inventors: Shuichi Ikeda, Odawara (JP); Yohei Matsuoka, Odawara (JP); Shinichi Iijima, Glendale, CA (US)

(73) Assignees: Mitsubishi Chemical Corporation, Chiyida-ku (JP); General Plastic Industrial Co., Ltd., Wu-Chi Town (TW)

( * ) Notice: Subject to any disclaimer, the term of this patent is extended or adjusted under 35 U.S.C. 154(b) by 0 days.

(21) Appl. No.: 15/843,204

(22) Filed: Dec. 15, 2017

(65) Prior Publication Data
US 2018/0203403 A1 Jul. 19, 2018

Related U.S. Application Data

(63) Continuation of application No. PCT/JP2016/067982, filed on Jun. 16, 2016.
(Continued)

(51) Int. Cl.
*G03G 15/00* (2006.01)
*G03G 21/18* (2006.01)
*F16D 1/10* (2006.01)

(52) U.S. Cl.
CPC .......... *G03G 15/757* (2013.01); *F16D 1/10* (2013.01); *G03G 21/185* (2013.01);
(Continued)

(58) Field of Classification Search
CPC .......... G03G 15/757; G03G 21/185; G03G 21/1857; F16D 1/10; F16D 2001/102
See application file for complete search history.

(56) References Cited

U.S. PATENT DOCUMENTS

| 5,903,803 A | 5/1999 | Kawai et al. |
| 6,128,454 A | 10/2000 | Kawai et al. |

(Continued)

FOREIGN PATENT DOCUMENTS

| JP | 8-328449 | 12/1996 |
| JP | 2875203 | 1/1999 |

(Continued)

OTHER PUBLICATIONS

Written Opinion of the International Searching Authority dated Sep. 6, 2016 in PCT/JP2016/067982, filed on Jun. 16, 2016, 5 pages (submitting English translation only, document previously filed).

(Continued)

*Primary Examiner* — Sandra Brase
(74) *Attorney, Agent, or Firm* — Oblon, McClelland, Maier & Neustadt, L.L.P.

(57) ABSTRACT

An end member includes a tubular bearing member and a shaft member held by the bearing member. The shaft member includes a rotating shaft rotatable around an axis and movable in an axial direction, and a rotating force receiving member disposed in one end portion of the rotating shaft and including an engaging member to be engaged with a driving shaft of the image forming apparatus body. The engaging member is switchable between a posture of being engaged with the driving shaft and a posture of not being engaged with the driving shaft. A maximum static friction coefficient applied when the rotating shaft moves in a rotating axial direction with respect to the bearing member is equal to or (Continued)

less than 0.40 where a force that acts in a direction orthogonal to a frictional force direction is 2.5 to 10.5 N.

6 Claims, 58 Drawing Sheets

Related U.S. Application Data

(60) Provisional application No. 62/180,824, filed on Jun. 17, 2015.

(52) U.S. Cl.
CPC ....... *G03G 21/186* (2013.01); *G03G 21/1853* (2013.01); *G03G 21/1857* (2013.01); *F16D 2001/102* (2013.01); *G03G 2221/1657* (2013.01)

(56) References Cited

U.S. PATENT DOCUMENTS

| | | | |
|---|---|---|---|
| 6,175,706 B1 | 1/2001 | Watanabe et al. | |
| 6,226,478 B1 | 5/2001 | Watanabe et al. | |
| 6,240,266 B1 | 5/2001 | Watanabe et al. | |
| 6,349,188 B1 | 2/2002 | Kawai et al. | |
| 6,400,914 B1 | 6/2002 | Noda et al. | |
| 6,501,926 B1 | 12/2002 | Watanabe et al. | |
| 6,501,927 B1 | 12/2002 | Watanabe et al. | |
| 2002/0018666 A1 | 2/2002 | Noda et al. | |
| 2004/0086300 A1 | 5/2004 | Kawai et al. | |
| 2005/0163526 A1 | 7/2005 | Kawai et al. | |
| 2006/0008287 A1 | 1/2006 | Noda et al. | |
| 2006/0198654 A1 | 9/2006 | Noda et al. | |
| 2007/0104510 A1 | 5/2007 | Kawai et al. | |
| 2007/0104511 A1 | 5/2007 | Kawai et al. | |
| 2008/0056754 A1 | 3/2008 | Noda et al. | |
| 2008/0063429 A1 | 3/2008 | Watanabe et al. | |
| 2008/0260428 A1* | 10/2008 | Ueno ................... | G03G 15/757 399/167 |
| 2009/0074452 A1 | 3/2009 | Noda et al. | |
| 2009/0074453 A1 | 3/2009 | Noda et al. | |
| 2009/0290908 A1 | 11/2009 | Noda et al. | |
| 2010/0278559 A1 | 11/2010 | Komatsu et al. | |
| 2011/0159970 A1 | 6/2011 | Okabe | |
| 2011/0211863 A1 | 9/2011 | Watanabe et al. | |
| 2013/0071141 A1 | 3/2013 | Ueno et al. | |
| 2013/0164031 A1 | 6/2013 | Ueno et al. | |
| 2014/0064783 A1 | 3/2014 | Ueno et al. | |
| 2014/0086634 A1 | 3/2014 | Ueno et al. | |
| 2014/0112685 A1 | 4/2014 | Komatsu et al. | |
| 2014/0205322 A1 | 7/2014 | Watanabe et al. | |
| 2015/0050048 A1* | 2/2015 | Huang ................ | G03G 15/757 399/167 |
| 2015/0050050 A1* | 2/2015 | Huang ............... | G03G 21/1857 399/167 |
| 2015/0346670 A1 | 12/2015 | Ueno et al. | |
| 2016/0370756 A1 | 12/2016 | Komatsu et al. | |

FOREIGN PATENT DOCUMENTS

| | | |
|---|---|---|
| JP | 2005-148089 | 6/2005 |
| JP | 2008-233868 | 10/2008 |
| JP | 2010-262056 | 11/2010 |
| JP | 2011-133682 | 7/2011 |
| JP | 2015-180909 | 10/2015 |
| WO | WO 2012/113289 A1 | 8/2012 |
| WO | WO 2012/152203 A1 | 11/2012 |

OTHER PUBLICATIONS

"Journal of Technical Disclosure No. 2010-502200" Japan Institute of Invention and Innocation, Apr. 22, 2010, 31 Pages.

International Search Report dated Sep. 6, 2016 in PCT/JP2016/067982, filed on Jun. 16, 2016 ( with English Translation).

Written Opinion dated Sep. 6, 2016 in PCT/JP2016/067982, filed on Jun. 16, 2016.

"Journal of Technical Disclosure No. 2010-502197", Japan Institute of Invention and Innovation, Apr. 22, 2010, 18 pages.

* cited by examiner

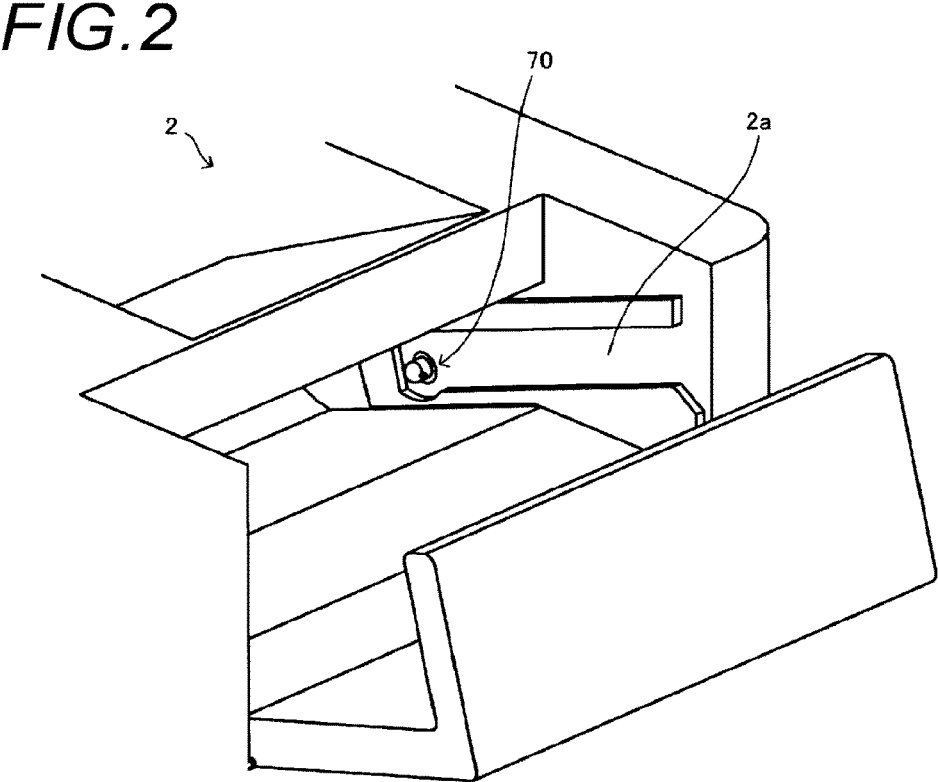

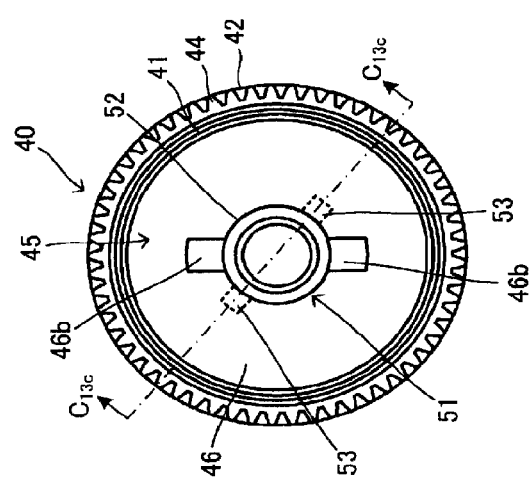
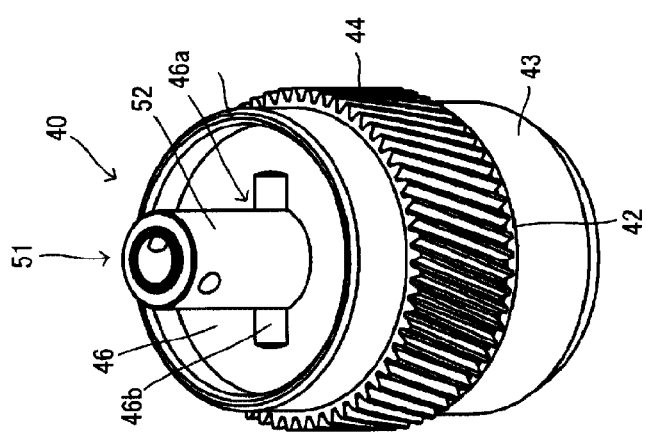
FIG.13A  FIG.13B  FIG.13C

FIG.14A
FIG.14B
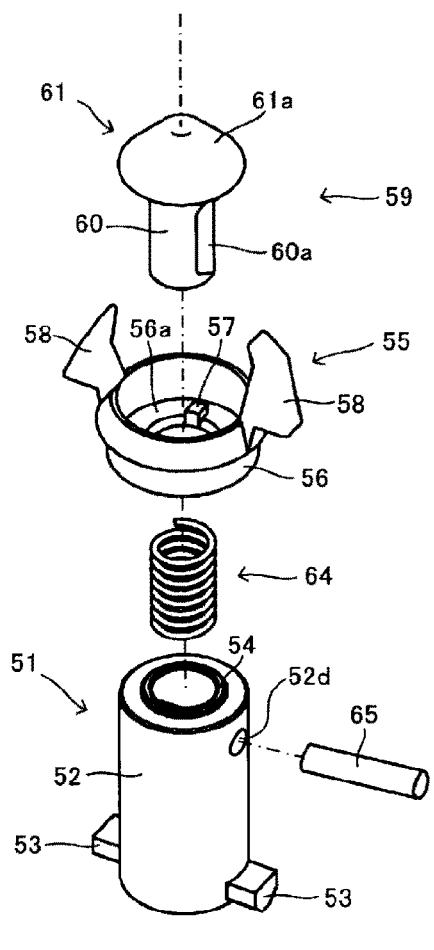
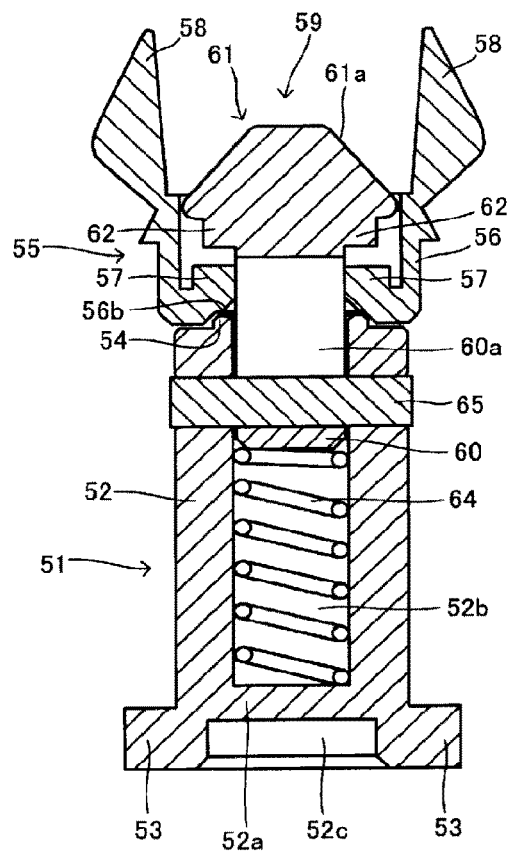

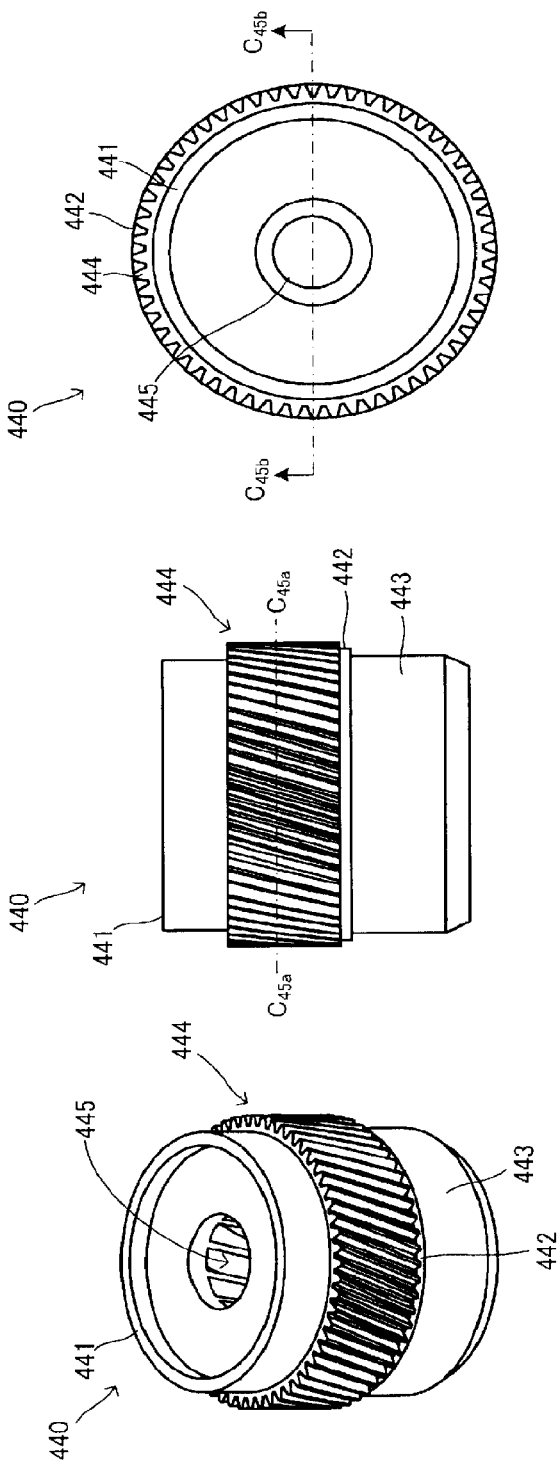

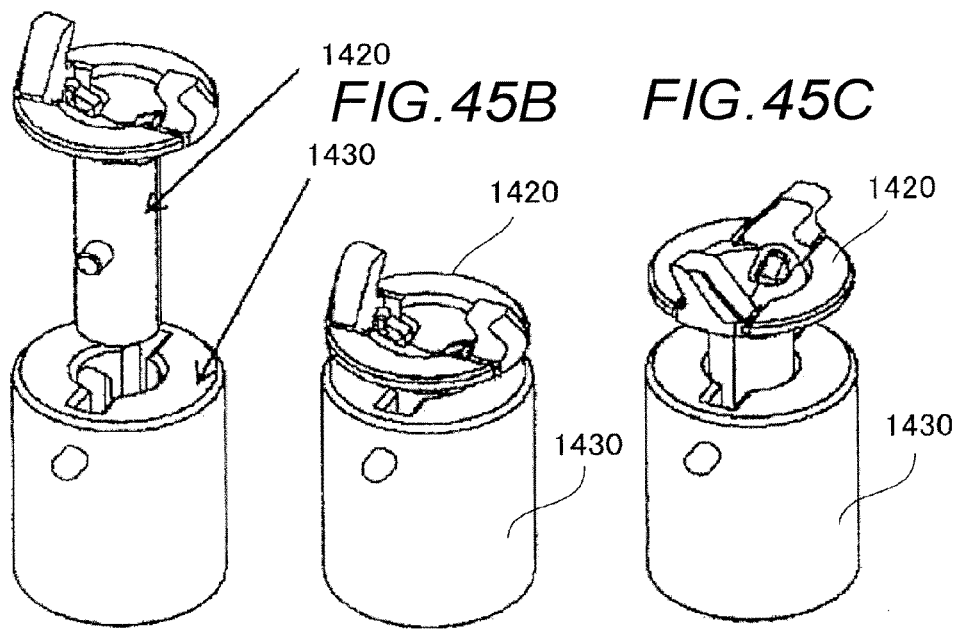

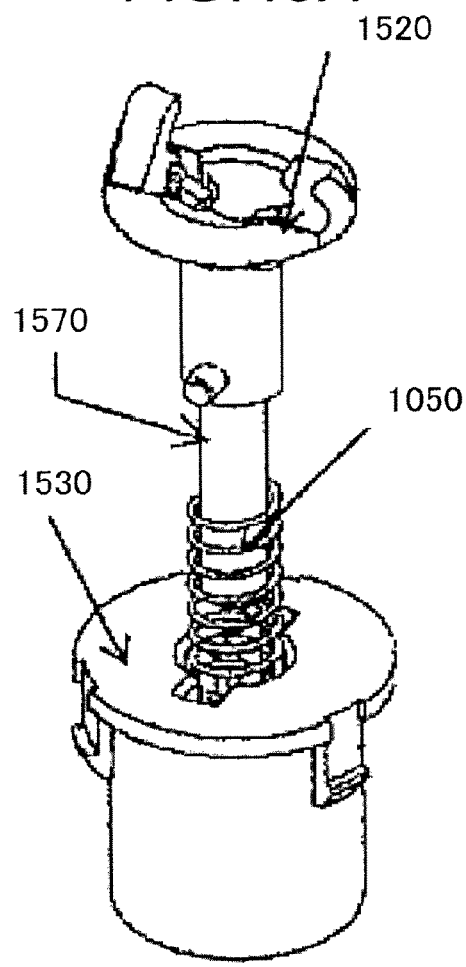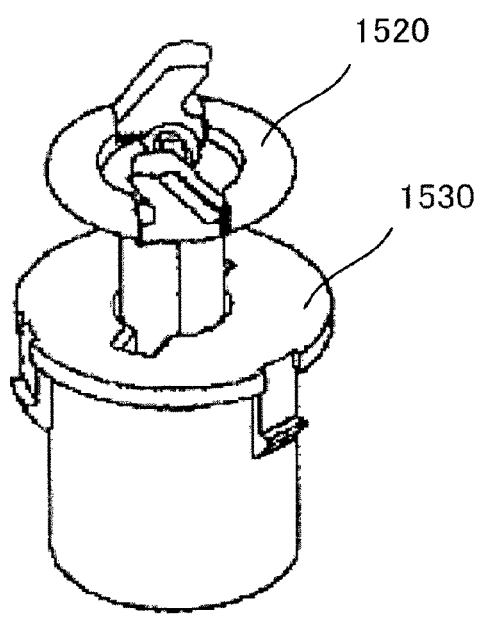
FIG.49A
FIG.49B 1630      1630      1630
1660      1660      1660

END MEMBER, PHOTOSENSITIVE DRUM UNIT, AND PROCESS CARTRIDGE

CROSS REFERENCE TO RELATED APPLICATION(S)

This application is a continuation of international application No. PCT/JP2016/067982 filed on Jun. 16, 2016 based upon and claiming the benefit of a priority of US provisional application No. 62/180,824 filed on Jun. 17, 2015, the contents of which are incorporated herein by reference in its entirety.

BACKGROUND OF THE INVENTION

1. Field of the Invention

The present invention relates to a process cartridge which is mounted on an image forming apparatus, such as a laser printer or a copying machine, an end member which is disposed in the process cartridge, and a method for disengaging the process cartridge from an image forming apparatus body.

2. Description of the Related Art

In an image forming apparatus which is represented by a laser printer or a copying machine, a process cartridge which is attachable to and detachable from a body (hereinafter, referred to as an "apparatus body") of the image forming apparatus is provided.

The process cartridge is a member which forms contents to be expressed by letters or figures and transfers the contents to a recording medium, such as a paper sheet. Therefore, in the process cartridge, the photosensitive drum in which the transferred contents are formed is included, and various tools for forming the contents to be transferred by acting on the photosensitive drum are disposed together. Examples of those tools include a developing roller unit, a charging roller unit, and a cleaning unit.

The process cartridge is configured such that the same process cartridge is attached to and detached from the apparatus body for maintenance, or an old process cartridge is disengaged from the apparatus body and then a new process cartridge is mounted on the apparatus body instead. Attaching and detaching the process cartridge in this manner is performed by users of the image forming apparatus themselves, and it is desirable to perform attaching and detaching as easily as possible.

Meanwhile, it is necessary that the photosensitive drum included in the process cartridge is rotated around an axis during the operation thereof. Therefore, the photosensitive drum is configured to be engaged with a driving shaft of the apparatus body directly or via another member at least during the operation, to receive a rotating force from the driving shaft, and to rotate. Therefore, in order to attach and detach the process cartridge to and from the apparatus body, it is necessary to release (disengage) the engagement between the driving shaft of the apparatus body and the photosensitive drum every time attaching and detaching occur, and to mount the process cartridge again.

Here, if it is possible to move the photosensitive drum (process cartridge) in the axial direction of the driving shaft of the apparatus body to attach and detach the photosensitive drum, the above-described structure for attaching and detaching is relatively simple. However, from the viewpoint of reducing the image forming apparatus in size or ensuring an attachment and detachment space of the process cartridge, it is preferable to disengage the process cartridge from the apparatus body to be pulled out in the direction which is different from the axial direction of the driving shaft, and to mount the process cartridge on the apparatus body to be pushed from this direction.

Patent Literature 1 discloses a technology in which the driving force from the apparatus body side is transferred to the photosensitive drum when a cover of the apparatus body is closed, and movement to be separated is performed so that the driving force is not transferred to the photosensitive drum when the cover is opened. Accordingly, the process cartridge can be attached to and detached from the apparatus body in the direction which is different from the axial direction of the driving shaft.

In addition, there is a technology in which a gear is provided in the photosensitive drum and the photosensitive drum rotates by meshing the gear with a gear driven by the apparatus body.

In addition, Patent Literature 2 discloses an invention in which the driving shaft of the apparatus body and the photosensitive drum unit are engaged with each other via a rotating force transmission component having a trunnion structure attached to the photosensitive drum, and the photosensitive drum is rotated. Since the rotating force transmission component can change an angle with respect to the axis of the photosensitive drum by the trunnion structure, engagement and disengagement between the driving shaft of the apparatus body and the photosensitive drum unit are easily performed.

Patent Literature 3 discloses a technology in which a claw member disposed in a bearing member engaged with the driving shaft is provided to be movable in a radial direction by an elastic member, such as a spring. Accordingly, since the bearing member and the driving shaft are reliably engaged with each other, transmission of a rotating force is appropriately performed, the claw member is movable when attaching and detaching the bearing member and the driving shaft, and thus, the attachment and detachment are smoothly performed.

Furthermore, Patent Literature 4 discloses a technology in which a claw member provided in the shaft member engaged with the driving shaft rises up by pressing a projection at the center of the shaft member. Accordingly, since the bearing member and the driving shaft are reliably engaged with each other, transmission of a rotating force is appropriately performed, the claw member is movable when attaching and detaching the bearing member and the driving shaft, and thus, the attachment and detachment are smoothly performed.

Non-Patent Literature 1 discloses a technology in which a bearing member engaged with the driving shaft is provided to be movable in the axial direction by an elastic member, such as a spring. Accordingly, while the bearing member is biased by the elastic member when attaching and detaching the bearing member and the driving shaft, the attachment and detachment are smoothly performed by moving and retreating in the axial direction.

CITATION LIST

Patent Literature

Patent Literature 1: Japanese Patent No. 2875203
Patent Literature 2: JP-A-2008-233868
Patent Literature 3: International Publication No. 2012/113289

Patent Literature 4: International Publication No. 2012/152203

Non Patent Literature

Non-Patent Literature 1: Journal of technical disclosure No. 2010-502197, published by Japan Institute of Invention and Innovation

SUMMARY OF THE INVENTION

However, in the invention described in Patent Literature 1, when attaching and detaching the process cartridge, a process of moving a rotating body in the axial direction of the rotating body by interlocking the rotating body with the opening and closing of a lid, is included, and a mechanism therefor is necessary. In addition, in the technology in which a gear is provided in the photosensitive drum, it is possible to directly move the process cartridge in the direction different from the axial direction of the photosensitive drum, but from the viewpoint of properties of the gear, there is a case where unevenness of rotation of the photosensitive drum is generated.

In the invention according to Patent Literature 2, it is possible to directly move the process cartridge in the direction (substantially orthogonal direction) which is different from the axial direction of the photosensitive drum, but a configuration which freely inclines the rotating force transmission component is necessary, and the structure becomes complicated. Accordingly, there is a case where it is difficult to match the axis of a driving transmission shaft and the axis of a driven transmission shaft to each other.

In the invention described in Patent Literature 3 and Patent Literature 4, the driving shaft is smoothly attached and detached in the direction in which the claw member is movable, but meanwhile, since the claw member is not movable in the attachment and detachment in the perpendicular direction, there is a case where the attachment and detachment are difficult. In addition, a failure likely occurs in assemblability, and reusability of configuration members is not considered.

In the invention according to Non-Patent Literature 1, there is also a case where the engagement between a groove of the rotating force transmission portion and the rotating force transmission portion on the driving shaft side is weak when the shaft member is movable only in the axial direction, a tapered part is provided and the transmission of the rotating force is not appropriately performed. In addition, when attaching and detaching the process cartridge, there is also a case where a hooked state is generated according to the posture in the rotational direction of the shaft member, and the attachment and detachment are difficult.

Here, in consideration of the above-described problems, an object of the present invention is to provide an end member which can transmit an appropriate rotating force and can be smoothly attached to and detached from an apparatus body. In addition, the present invention is to provide a photosensitive drum unit provided with the end member, a process cartridge, and a shaft member provided in the end member.

Hereinafter, examples of the present invention will be described.

The present invention provides an end member to be disposed in an end portion of a columnar rotating body mounted on an image forming apparatus body, the end member including: a tubular bearing member; and a shaft member held by the bearing member, wherein the shaft member includes a rotating shaft which is rotatable around an axis and movable in an axial direction, and a rotating force receiving member which is disposed in one end portion of the rotating shaft and includes an engaging member to be engaged with a driving shaft of the image forming apparatus body, wherein the engaging member is switchable between a posture of being engaged with the driving shaft and a posture of not being engaged with the driving shaft, and wherein a maximum static friction coefficient applied when the rotating shaft moves in a rotating axial direction with respect to the bearing member is equal to or less than 0.40 where a force that acts in a direction orthogonal to a frictional force direction is 2.5 to 10.5 N.

In an aspect of the end member according to the present invention, for example, the bearing member includes an intermediate member having a guiding groove, and the intermediate member holds the shaft member to be rotatable around the axis and movable in the axial direction.

In an aspect of the end member according to the present invention, for example, the intermediate member which holds the shaft member is attachable and detachable in a state of being mounted on a cartridge.

A photosensitive drum unit according to an aspect of the present invention includes the end member in the end portion of the columnar rotating body.

A process cartridge according to an aspect of the present invention includes the photosensitive drum unit.

In an aspect of the end member according to the present invention, for example, the intermediate member is made of a resin.

The present invention provides an end member to be disposed in an end portion of a columnar rotating body mounted on an image forming apparatus body, the end member including: a tubular bearing member; and a shaft member held by the bearing member, wherein the shaft member includes a resin intermediate member having a guiding groove, a metal rotating shaft which is rotatable around an axis and movable in an axial direction, and a rotating force receiving member which is disposed in one end portion of the metal rotating shaft and includes an engaging member to be engaged with a driving shaft of the image forming apparatus body, wherein the resin intermediate member holds the shaft member to be rotatable around the axis and movable in the axial direction, and wherein the engaging member is switchable between a posture of being engaged with the driving shaft and a posture of not being engaged with the driving shaft.

According to the present invention, it is possible to transmit a rotating force equivalent to that of the related art, and attachment to and detachment from the apparatus body can be more smoothly performed.

BRIEF DESCRIPTION OF THE DRAWINGS

In the accompanying drawings:

FIG. 2 is an enlarged view of a part of the image forming apparatus body;

FIG. 13A is a perspective view of a combination of the bearing member 40 and the rotating shaft 51, FIG. 13B is a plan view of a combination of the bearing member 40 and the rotating shaft 51, and FIG. 13C is a sectional view of a combination of the bearing member 40 and the rotating shaft 51;

FIG. 14A is an exploded perspective view of a shaft member 50, and FIG. 14B is a sectional view of the shaft member 50;

FIG. 33A is a perspective view of a bearing member 440, FIG. 33B is a front view of the bearing member 440, and FIG. 33C is a plan view of the bearing member 440;

FIGS. 45A to 45C are views illustrating one aspect of an attaching process of the intermediate member of the transmission apparatus and a transmission unit;

FIGS. 49A and 49B are views illustrating one aspect of the attaching process of the intermediate member of the transmission apparatus and the transmission unit;

DETAILED DESCRIPTION OF THE EXEMPLARY EMBODIMENTS

Figure 1:
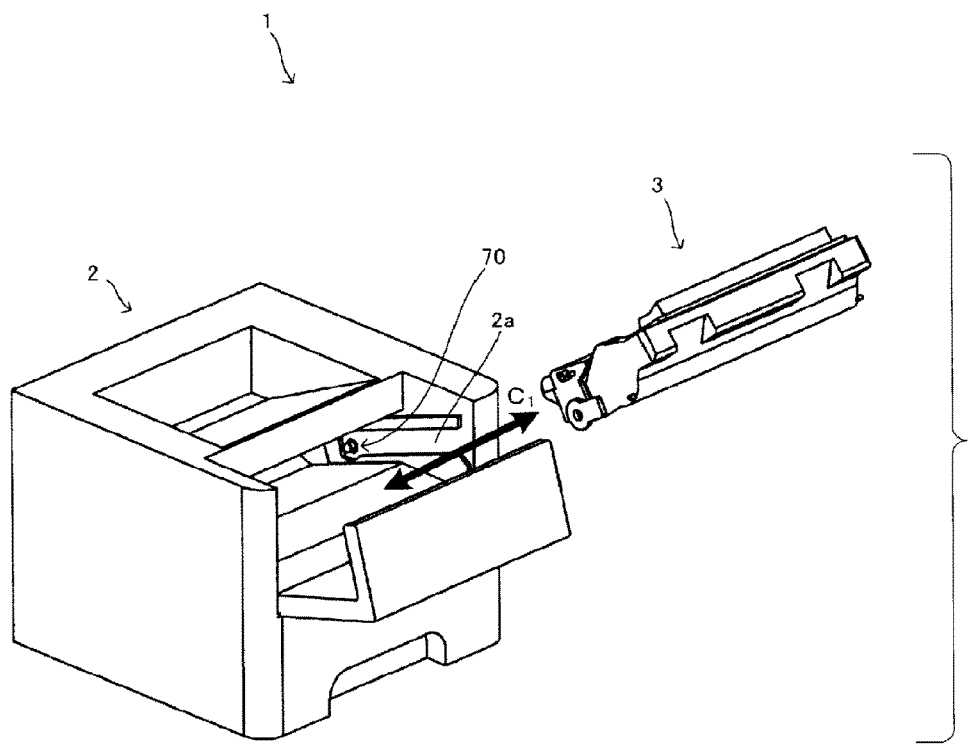
FIG. 1 is a schematic view of an image forming apparatus body and a process cartridge.

Hereinafter, the present invention will be described based on aspects illustrated in the drawings. However, the present invention is not limited to the aspects.

FIG. 1 illustrates a first aspect, and is an exploded perspective view schematically illustrating an image forming apparatus 1 including a process cartridge 3 and an image forming apparatus body 2 (hereinafter, there is a case of being written as "apparatus body 2") which is used having the process cartridge 3 mounted thereon. The process cartridge 3 can be mounted on and disengaged from the apparatus body 2 by moving as illustrated by an arrow $C_1$ in FIG. 1.

In FIG. 2, a diagram focusing on a part of a driving shaft 70 and a guide 2a in the apparatus body 2 illustrated in FIG. 1, is illustrated. As can be ascertained from FIGS. 1 and 2, in the apparatus body 2, the guide 2a which is a groove that guides attachment and detachment of the process cartridge 3 is provided, and the driving shaft 70 protrudes in an end portion on a far side thereof. An aspect of the driving shaft 70 will be described in detail later, but the driving shaft 70 protrudes in a depth direction of the guide 2a from a bottom surface of the guide 2a (protrudes to be orthogonal to a longitudinal direction of the guide 2a).

Figure 3A:
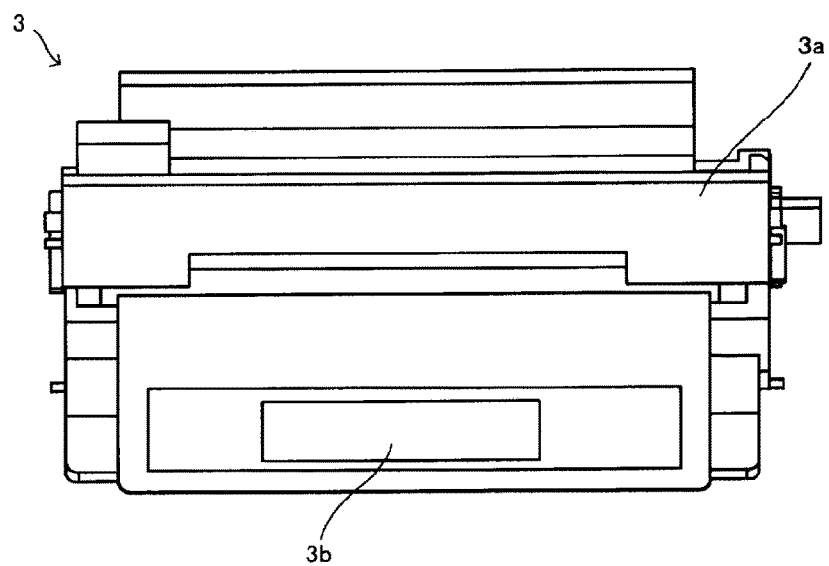
FIG. 3A is a plan view of a process cartridge.
Figure 3B:
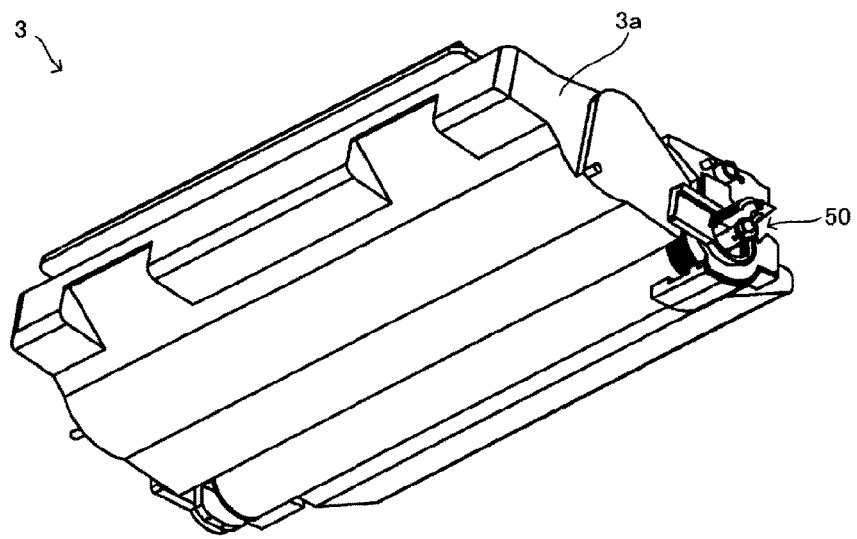
FIG. 3B is a perspective view of the process cartridge.

Meanwhile, in FIGS. 3A and 3B, an external appearance of the process cartridge 3 is illustrated. FIG. 3A is a view when the process cartridge 3 is viewed in a plan view (a view in which a surface that is an upper part when being mounted on the apparatus body 2 is illustrated), and FIG. 3B is a perspective view when the process cartridge 3 is viewed from a bottom surface (a side opposite to the side when viewed in a plan view). In particular, as can be ascertained from FIG. 3B, a shaft member 50 in an end member 30 is disposed to protrude from the side surface of the process cartridge 3. Accordingly, as will be described later, the driving shaft 70 and the shaft member 50 on the apparatus body 2 side are engaged with each other, and a rotating force is transmitted. This will be described in more detail later.

In addition, an operating portion 3b is provided in a housing 3a of the process cartridge 3, and particularly, is configured to be operated as a user grabs the operating portion 3b and hooks a plurality of fingers when disengaging the process cartridge 3 from the apparatus body 2. Therefore, the operating portion 3b may be formed in a projected shape, or on the contrary, the operating portion 3b may be formed in a recessed shape.

Figure 4:
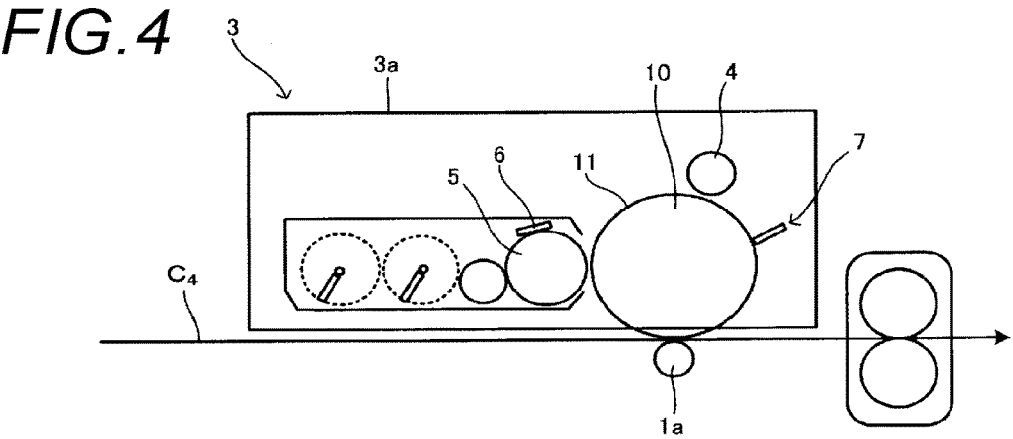
FIG. 4 is a perspective view illustrating a configuration of the process cartridge.

In FIG. 4, an inner structure of one example of the process cartridge 3 is schematically illustrated. As can be ascertained from FIG. 4, the process cartridge 3 includes a photosensitive drum unit 10 (refer to FIG. 5) on the inner side of the housing 3a, a charging roller unit 4, a developing roller unit 5, a regulating member 6, and a cleaning blade 7. In a posture in which the process cartridge 3 is mounted on the apparatus body 2, as a recording medium, such as a paper sheet, moves along line illustrated by $C_4$ in FIG. 4, an image is transferred to the recording medium.

The attachment and detachment of the process cartridge 3 to and from the apparatus body 2 is generally performed as follows. Since the photosensitive drum unit 10 provided in the process cartridge 3 receives a rotation driving force from the apparatus body 2, and rotates, it achieves a state where a driving shaft 70 of the apparatus body 2 and the shaft member 50 in the end member 30 of the photosensitive drum unit 10 are engaged with each other at least during the operation, and the rotating force can be transmitted (for example, refer to FIG. 19).

Meanwhile, when attaching and detaching the process cartridge 3 to and from the apparatus body 2, it is necessary that the driving shaft 70 and the end member 30 are promptly engaged and disengaged not to interrupt the movement each other regardless of the posture.

In this manner, the end member 30 of the photosensitive drum unit 10 is appropriately engaged with the driving shaft 70 of the apparatus body 2, and the rotation driving force is transmitted.

Hereinafter, each of the configurations will be described.

In the process cartridge 3, the charging roller unit 4, the developing roller unit 5, the regulating member 6, the cleaning blade 7, and the photosensitive drum unit 10 are provided, and these members are included on the inner side of the housing 3a. Each of these is as follows.

The charging roller unit 4 charges a photosensitive drum 11 of the photosensitive drum unit 10 by applying voltage from the apparatus body 2. The charging is performed as the charging roller unit 4 rotates following the photosensitive drum 11, and comes into contact with an outer circumferential surface of the photosensitive drum 11.

The developing roller unit 5 is provided with a developing roller which supplies a developer to the photosensitive drum 11. In addition, an electrostatic latent image formed on the photosensitive drum 11 is developed by the developing roller unit 5. In addition, in the developing roller unit 5, a fixed magnet is embedded.

The regulating member 6 is a member which adjusts an amount of developer that adheres onto the outer circumferential surface of the developing roller of the above-described developing roller unit 5, and imparts a frictional electrification charge to the developer itself.

The cleaning blade 7 is a blade which comes into contact with the outer circumferential surface of the photosensitive drum 11, and removes the developer remaining after the transfer by a tip end thereof.

Figure 5:
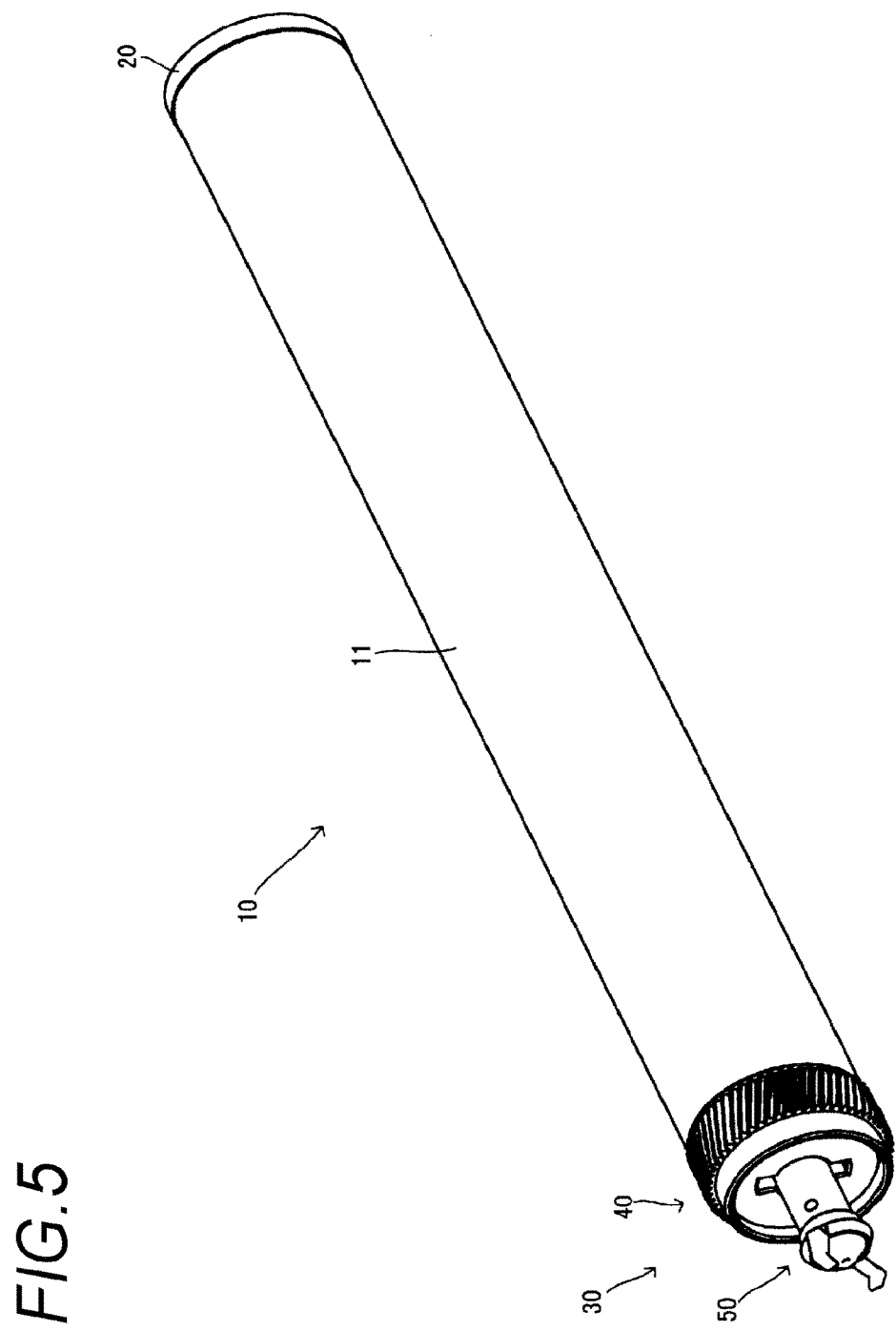
FIG. 5 is an external perspective view of a photosensitive drum unit 10.

The photosensitive drum unit 10 is provided with the photosensitive drum 11, and here, letters or figures to be transferred to the recording medium are formed. FIG. 5 is an appearance perspective view of the photosensitive drum unit 10. As can be ascertained from FIG. 5, the photosensitive drum unit 10 is provided with the photosensitive drum 11, a lid member 20, and the end member 30.

The photosensitive drum 11 is a member which covers a photosensitive layer on the outer circumferential surface of a base body which is a columnar rotating body. On the photosensitive layer, characters or figures to be transferred to the recording medium, such as a paper sheet, are formed.

The base body is a member in which a conductive material made of aluminum or aluminum alloy is formed in a cylindrical shape. A type of the aluminum alloy used in the base body is not particularly limited, but 6000 series, 5000 series, and 3000 series aluminum alloys which are defined by JIS standard (JIS H 4140) and are used as the base body of the photosensitive drum in many cases, are preferable.

In addition, the photosensitive layer formed on the outer circumferential surface of the base body is not particularly limited, and a known material can be employed according to the purpose.

It is possible to manufacture the base body by forming the cylindrical shape by a cutting process, an extrusion processing, or a drawing processing. In addition, it is possible to manufacture the photosensitive drum 11 by laminating by coating the outer circumferential surface of the base body with the photosensitive layer.

In order to rotate the photosensitive drum 11 around the axis as will be described later, at least two end members are attached to one end of the photosensitive drum 11. One end member is the lid member 20, and the other end member is the end member 30.

The lid member 20 is an end member which is disposed in an end portion on a side on which the driving shaft 70 of the apparatus body 2 is not engaged, among the end portions in the axial direction of the photosensitive drum 11. The lid member 20 is formed of a resin, and a fitting portion fitted to the cylindrical inner side of the photosensitive drum 11, and a bearing portion disposed to cover one end surface of the photosensitive drum 11 are coaxially formed. The bearing portion has a shape of a disk which covers the end surface of the photosensitive drum 11, and is provided at a part which receives a shaft provided in the housing 3a. In addition, in the lid member 20, an earth plate made of a conductive material is disposed, and accordingly, the photosensitive drum 11 and the apparatus body 2 are electrically connected to each other.

In addition, in the aspect, an example of the lid member is illustrated, but the invention is not limited thereto, and it is also possible to employ a lid member of another aspect which can be generally obtained. For example, a gear for transmitting the rotating force to the lid member may be disposed.

In addition, the above-described conductive material may be provided on the end member 30 side.

Figure 6:
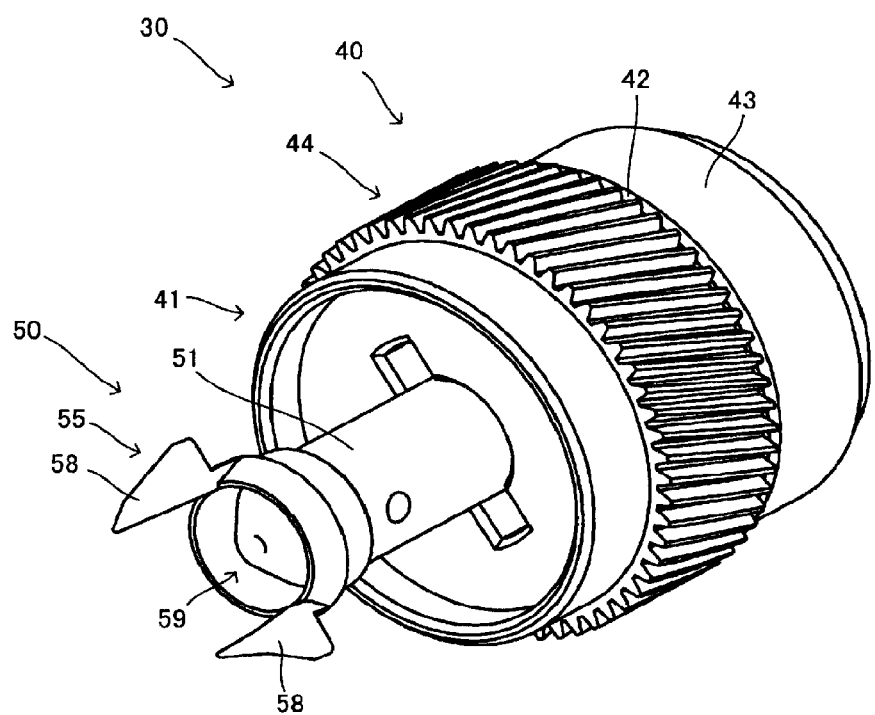
FIG. 6 is a perspective view of an end member 30.
Figure 7:
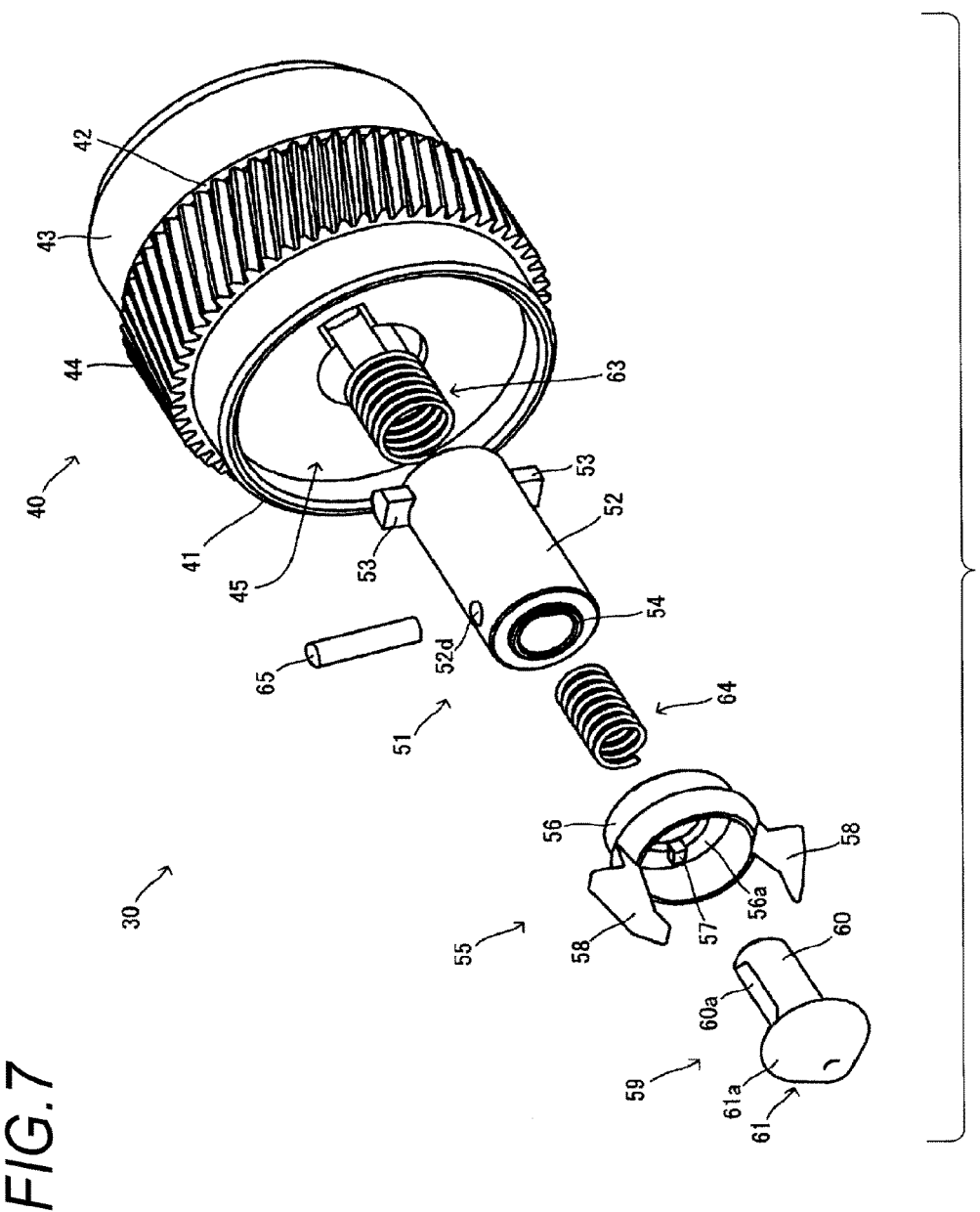
FIG. 7 is an exploded perspective view of the end member 30.

The end member 30 is a member which is attached to the end portion opposite to the lid member 20 among the end portions of the photosensitive drum 11, and is provided with a bearing member 40 and a shaft member 50. FIG. 6 is a perspective view of the end member 30, and FIG. 5 is an exploded perspective view of the end member 30.

Figure 8A:
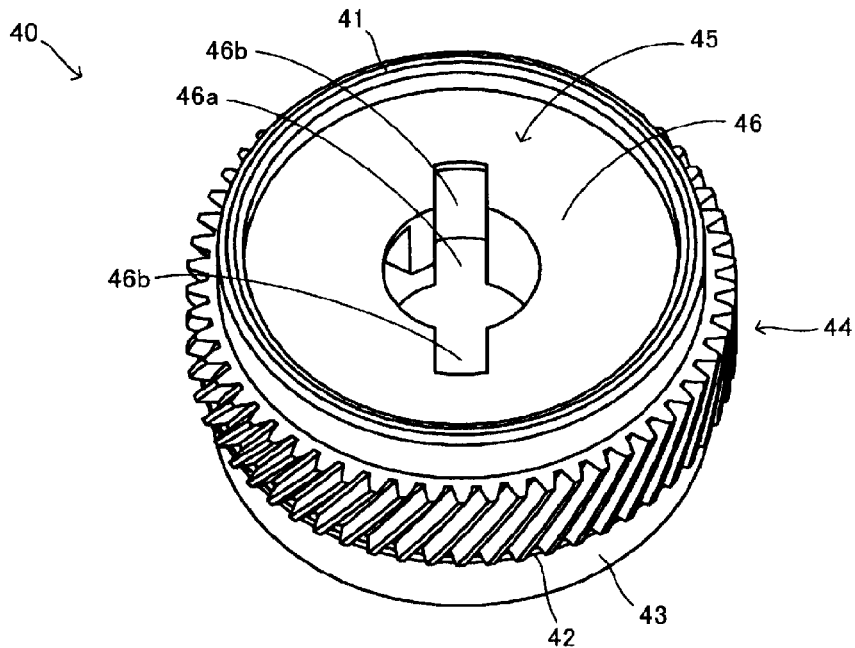
FIG. 8A is a perspective view of a bearing member 40.
Figure 8B:
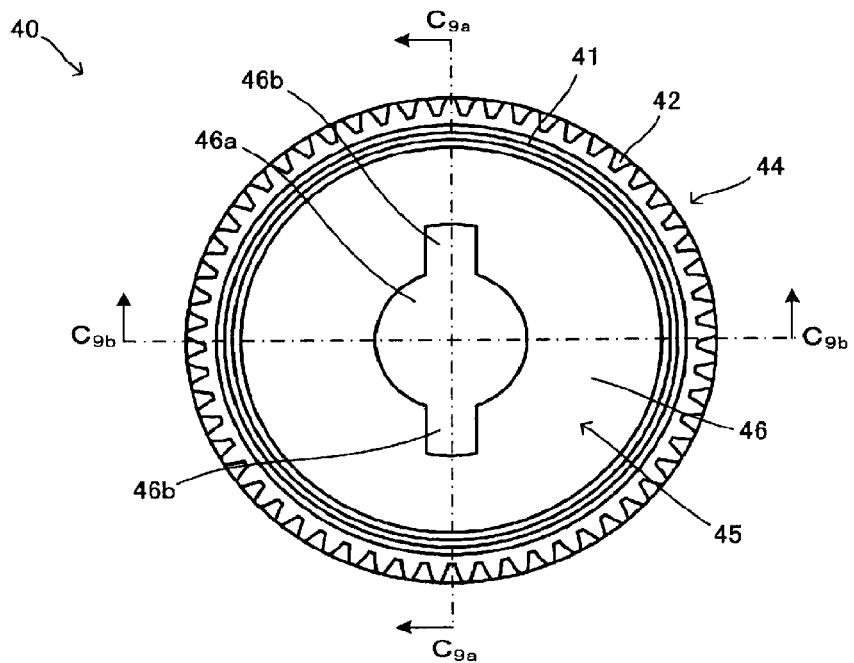
FIG. 8B is a plan view of the bearing member 40.
Figure 9A:
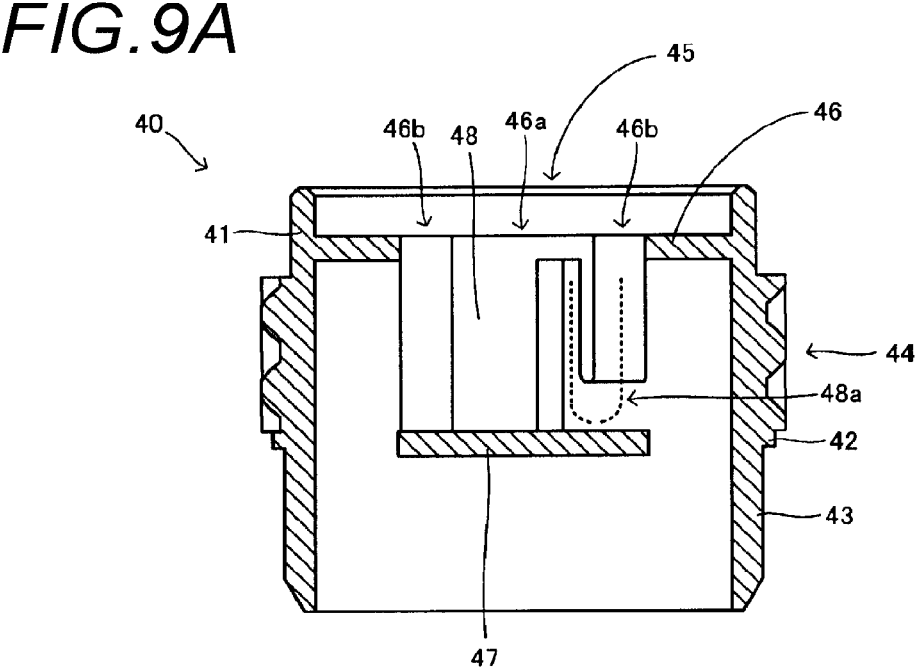
FIG. 9A is a sectional view of the bearing member 40.
Figure 9B:
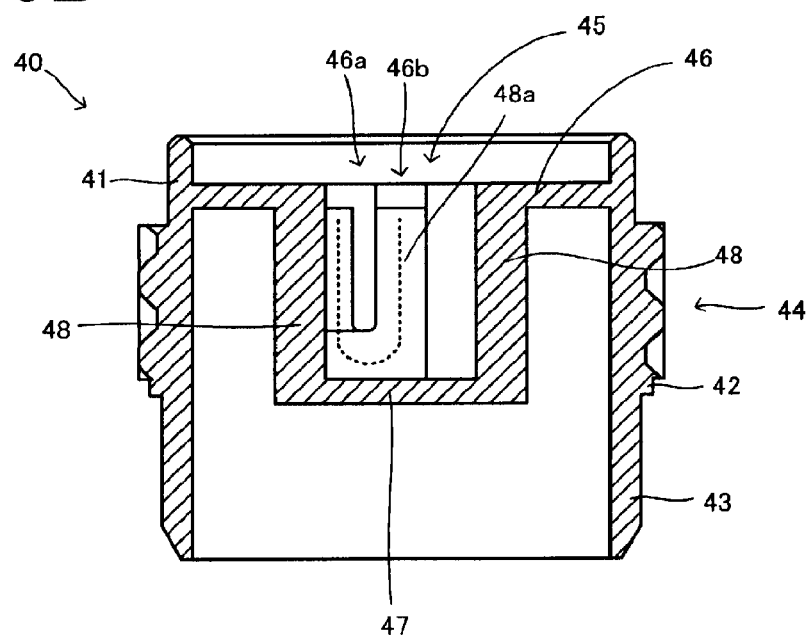
FIG. 9B is another sectional view of the bearing member 40.

The bearing member 40 is a member bonded to the end portion of the photosensitive drum 11 in the end member 30. FIG. 8A is a perspective view of the bearing member 40, and FIG. 8B is a plan view when viewed from a side on which the shaft member 50 is inserted in the bearing member 40. Furthermore, FIG. 9A is a sectional view along line illustrated by $C_{9a}$-$C_{9a}$ in FIG. 8B, and FIG. 9B is a sectional view along line illustrated by $C_{9b}$-$C_{9b}$ in FIG. 8B. In addition, in each of the drawings illustrated below, there is a case where the end surface (cut surface) is illustrated being hatched in the sectional views.

As can be ascertained from FIGS. 6 to 9, the bearing member 40 is configured to include a tubular body 41, a contact wall 42, a fitting portion 43, a gear portion 44, and a shaft member holding portion 45.

The tubular body 41 is a cylindrical member as a whole, the contact wall 42 and the gear portion 44 are disposed on the outer side thereof, and the shaft member holding portion 45 is formed on the inner side thereof.

The contact wall 42 which comes into contact with and is locked to the end surface of the photosensitive drum 11 stands from a part of the outer circumferential surface of the tubular body 41. Accordingly, in a posture in which the end member 30 is mounted on the photosensitive drum 11, the insertion depth of the end member 30 into the photosensitive drum 11 is regulated.

In addition, the fitting portion 43 of which one side is inserted into the inner side of the photosensitive drum 11 nipping the contact wall 42 of the tubular body 41, is achieved. The fitting portion 43 is inserted into the inner side of the photosensitive drum 11, and is fixed to the inner surface of the photosensitive drum 11 by an adhesive. Accordingly, the end member 30 is fixed to the end portion of the photosensitive drum 11. Therefore, the outer diameter of the fitting portion 43 is substantially the same as the inner diameter of the photosensitive drum 11 within a range that can be inserted into the inner side of the cylindrical shape of the photosensitive drum 11. A groove may be formed on the outer circumferential surface in the fitting portion 43. Accordingly, the groove is filled with the adhesive, and adhesiveness between the tubular body 41 (end member 30) and the photosensitive drum 11 is improved by an anchor effect or the like.

The gear portion 44 is formed on the outer circumferential surface of the tubular body 41 opposite to the fitting portion 43 nipping the contact wall 42. The gear portion 44 is a gear which transmits the rotating force to another member, such as the developing roller unit, and in the aspect, a helical gear is disposed. However, the type of the gear is not particularly limited, and a spur gear may be disposed, and both of the helical gear and the spur gear may be disposed to be aligned in the axial direction of the tubular body. In addition, it is not necessary to provide the gear.

The shaft member holding portion 45 is a part which is formed on the inner side of the tubular body 41, and which has a function of holding the shaft member 50 in the bearing member 40. The shaft member holding portion 45 includes a rotating shaft holding member 46, a support member 47, and a guide wall 48, as can be ascertained from FIGS. 8A to 9B.

The rotating shaft holding member 46 is a plate-like member formed to block the inner side of the tubular body 41, but a hole 46a is formed coaxially to an axis of the tubular body 41. As will be described later, since the rotating shaft 51 (refer to FIGS. 10A and 10B) penetrates the hole 46a, the hole 46a has a size and a shape by which the rotating shaft 51 penetrates. However, in order to prevent the rotating shaft 51 from falling out, the hole 46a is formed to be capable of penetrating only a body 52 of the rotating shaft 51, but not to penetrate a part at which a projection 53 is disposed. From the viewpoint of stable movement of the rotating shaft 51, it is preferable that the hole 46a has substantially the same shape and the size as those of the outer circumference of the body 52 of the rotating shaft 51 within a range that does not largely interrupt the movement of the rotating shaft 51 in the axial direction.

In addition, in the rotating shaft holding member 46, two slits 46b extend from the hole 46a. The two slits 46b are provided at a symmetric position nipping the axis of the hole 46a. In addition, the size and the shape of the slit 46b are formed such that the projection 53 of the rotating shaft 51 (refer to FIGS. 10A and 10B) can penetrate the slit 46b.

The support member 47 is a plate-like member which is provided further on the fitting portion 43 side than the rotating shaft holding member 46, and which is formed to block at least a part of the inner side of the tubular body 41. The support member 47 is formed to have a size which can support at least a rotating shaft elastic member 63 that will be described later.

The guide wall 48 is a tubular member which extends parallel to the axial direction of the tubular body 41 from an edge of the hole 46a of the rotating shaft holding member 46, and in which an end portion thereof is connected to the support member 47. In the aspect, the sectional shape of the inner side of the guide wall 48 is the same as that of the hole 46a. However, as will be described later, since the body 52 of the rotating shaft 51 is inserted into the inner side of the guide wall 48 and the rotating shaft 51 moves in the axial direction, the shape and the size by which the movement is possible are formed.

In addition, in the guide wall 48, a slit 48a is formed. In FIGS. 9A and 9B, in order to make it easy to understand, a direction in which the slit 48a extends is illustrated by a dotted line. After one end side of the slit 48a in the longitudinal direction passes through the slit 46b of the rotating shaft holding member 46, extends parallel to the axis of the tubular body 41, and reaches the support member 47, the slit 48a extends parallel to the axial direction to make a U-turn, and the end portion (the other end side) reaches the rotating shaft holding member 46. Therefore, the other end side is blocked by the rotating shaft holding member 46. The slit width of the slit 48a is formed such that the projection 53 of the rotating shaft 51 (refer to FIGS. 8A and 8B) can move in the slit 48a.

A material which configures the bearing member 40 is not particularly limited, but a resin, such as polyacetal, polycarbonate, or PPS, or metal can be used. Here, in order to improve the rigidity of the member in a case of using a resin, glass fibers or carbon fibers may be mixed into the resin in accordance with the load torque. In addition, in order to make the attachment or the movement of the shaft member smooth, sliding properties may be improved by containing at least one type of a fluororesin, polyethylene, and silicon rubber in the resin. In addition, the resin may be coated with fluororesin or lubricant.

In a case of making the member by metal, carving by cutting, aluminum die casting, zinc the casting, a metal powder injection molding method (so-called MIM method), or a metal powder sintering lamination method (so-called 3D printing), can be employed. In addition, regardless of the material of the metal, iron, stainless steel, aluminum, brass, copper, zinc, or an alloy of the materials, may be used. In addition, it is possible to improve functionality (lubrication properties or corrosion resistance) of the surface by performing various types of plating.

Returning to FIGS. 6 and 7, the shaft member 50 of the end member 30 will be described. As can be ascertained from FIG. 7, the shaft member 50 is provided with the rotating shaft 51, a rotating force receiving member 55, and a regulating member 59. Furthermore, the shaft member 50 is provided with the rotating shaft elastic member 63, a regulating member elastic member 64, and a pin 65. Any of the rotating shaft elastic member 63 and the regulating member elastic member 64 in the aspect is a coiled spring. Hereinafter, each of the members will be described.

Figure 10A:
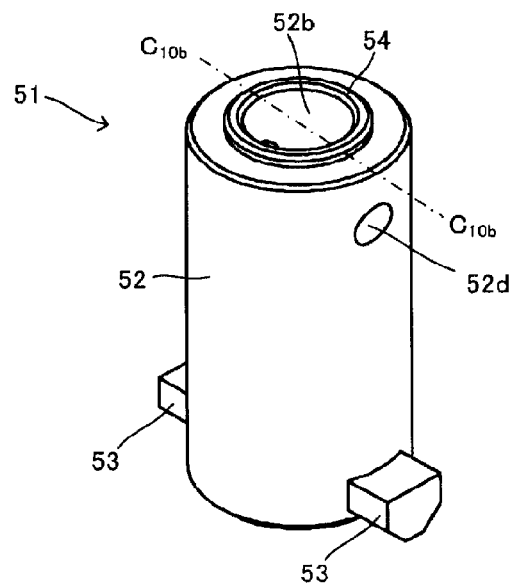
FIG. 10A is a perspective view of a rotating shaft 51.

The rotating shaft 51 is a shaft-like member which functions as a rotating force transmission portion which transmits the rotating force received by the rotating force receiving member 55 to the bearing member 40. FIG. 10A is a perspective view of the rotating shaft 51, and FIG. 10B is a sectional view in the axial direction including line illustrated by $C_{10b}$-$C_{10b}$ in FIG. 10A, respectively.

Figure 10B:
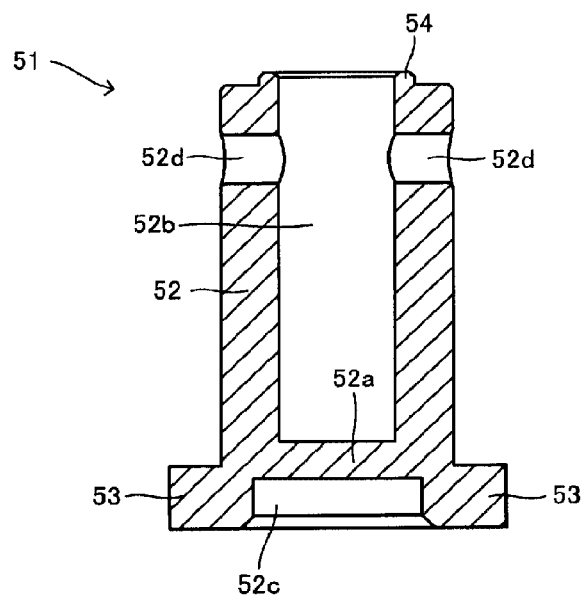
FIG. 10B is a sectional view of the rotating shaft 51.

As can be ascertained from FIGS. 10A and 10B, the rotating shaft 51 includes the cylindrical body 52, and a partition portion 52a is provided to close the inner portion on the inside of the cylinder. Therefore, recessed portions 52b and 52c are formed on one side and on the other side nipping the partition portion 52a on the inner side of the body 52.

Two projections 53 are disposed on the outer side in one end portion of the body 52. Two projections 53 are provided on the same line in one diameter direction of the cylinder of the body 52 to be on the opposite sides nipping the axis. The two projections 53 have a function of holding the rotating shaft 51 by the bearing member 40 and regulating the movement of the body 52, as will be described later.

In addition, in the rotating shaft 51, two holes 52d which are disposed in one diameter direction of the cylinder being orthogonal to the axis of the cylinder, and penetrate the inside and the outside, are formed. As will be described later, the pin 65 (refer to FIG. 7) passes through the hole 52d, and the pin 65 holds the regulating member 59 and regulates the movement of the regulating member 59.

Furthermore, on the end surface (end surface formed on the side opposite to the projection 53 side) on the recessed portion 52b side among the end surfaces of the body 52, an annular rail projection 54 which protrudes in the direction (direction parallel to the axis) in which the cylinder extends to frame an opening portion of the recessed portion 52b, is provided. As will be described later, the rail projection 54 functions as a rail that guides rotation of the rotating force receiving member 55.

Here, one example of the rotating shaft 51 is described, but the shape of the rotating shaft is not limited to the rotating shaft 51 as long as the rotating shaft acts and achieves the functions as will be described later. For example, the partition portion 52a of the rotating shaft 51 becomes unnecessary by forming the rotating shaft elastic member 63 and the regulating member elastic member 64 by a two-stepped spring. In addition, as will be described later, since rotation of the rotating force receiving member 55 around the axis is basically ensured by the regulating member 59, and the rail projection 54 is not necessarily provided.

Figure 11A:
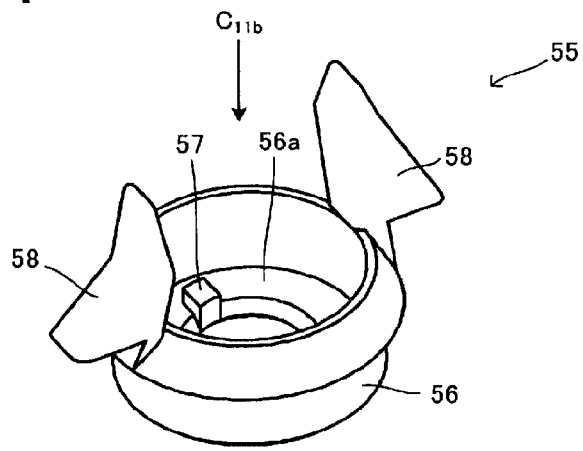
FIG. 11A is a perspective view of a rotating force receiving member 55.
Figure 11B:
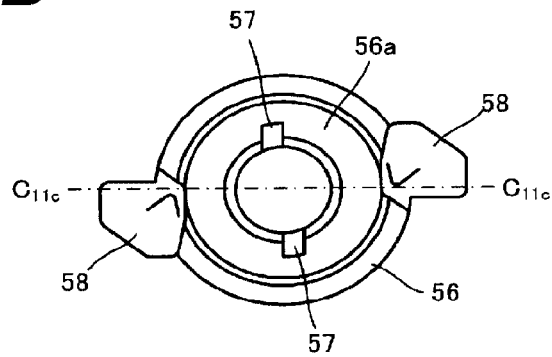
FIG. 11B is a plan view of the rotating force receiving member 55.
Figure 11C:
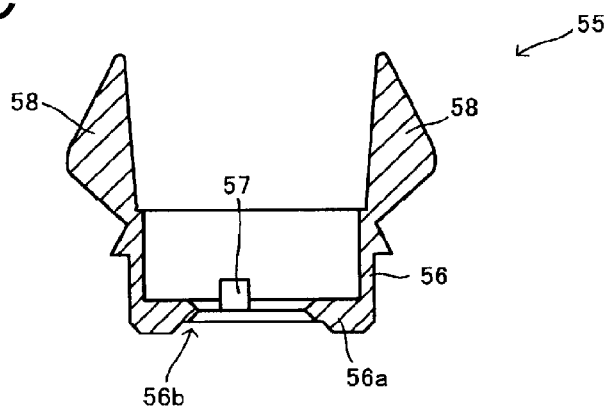
FIG. 11C is a sectional view of the rotating force receiving member 55.

The rotating force receiving member 55 is a member which receives the rotation driving force from the apparatus body 2 (refer to FIGS. 1 and 2) and transmits the driving force to the rotating shaft 51 when the end member 30 is in a predetermined posture. FIG. 11A is a perspective view of the rotating force receiving member 55, FIG. 11B is a plan view of the rotating force receiving member 55 when viewed from a direction illustrated by an arrow $C_{11b}$ in FIG. 11A, and FIG. 11C is a sectional view cut by line illustrated by $C_{11c}$-$C_{11c}$ in FIG. 11B, respectively.

As can be ascertained from FIGS. 6, 7, and 11A to 11C, the rotating force receiving member 55 is configured to include a cylindrical base portion 56 and two engaging members 58 which stand from one end portion of the base portion 56.

The base portion 56 is cylindrical, and an annular piece 56a is provided such that the opening portion is nipped in the opening portion on one end side. A guide 56b which is an annular cavity is formed on a surface opposite to the base portion 56 of the piece 56a. The guide 56b guides rotation of the base portion 56 being loaded on the rail projection 54 (refer to FIG. 10B) of the above-described rotating shaft 51.

In addition, two projections 57 are provided to oppose each other on a surface on the inner side of the base portion 56 of the piece 56a. Here, an example in which two projections 57 are provided is illustrated, but at least two projections may be provided, and three or more projections may be provided. In addition, it is preferable to provide the projections at an equivalent interval around the axis.

In addition, in the rail projection 54, the guide 56b is not necessarily provided as described.

Two engaging members 58 are disposed in an end portion on the side opposite to the side on which the piece 56a of the base portion 56 is provided, and are apart from the axis of the base portion 56 by the same distance, and both of the engaging members 58 are disposed at a symmetric position nipping the axis. An interval between two engaging members 58 is formed to be substantially the same as or to be slightly greater than the diameter of a shaft portion 71 of the driving shaft 70 (refer to FIG. 18A) which will be described later. The interval between two engaging members 58 is configured such that a tip end portion of a rotating force transmitting projection (pin) 72 is hooked to the engaging member 58 in a posture in which the shaft portion 71 of the driving shaft 70 is disposed between the two engaging members 58 as can be ascertained with reference to FIG. 19.

How the rotating force can be received from the driving shaft 70 will be described later.

The regulating member 59 is a member which switches a state where the engaging member 58 of the rotating force receiving member 55 can transmit the driving force from the driving shaft 70 to the bearing member 40 and a state where the engaging member 58 cannot transmit the driving force and freely rotates, to each other. In other words, a posture in which the engaging member 58 is engaged with the driving shaft 70 and can transmit the rotating force and a posture in which the engagement is regulated (not engaged) and the engaging member 58 cannot transmit the rotating force, are switched to each other.

Figure 12A:
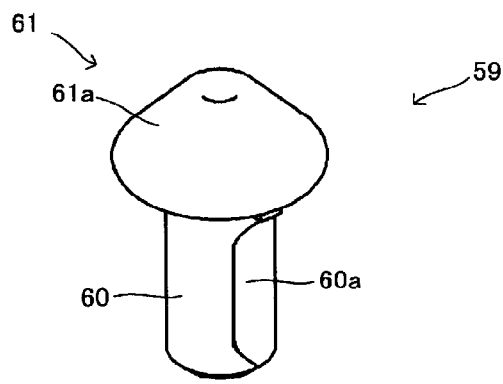
FIG. 12A is a perspective view of a regulating member 59.
Figure 12B:
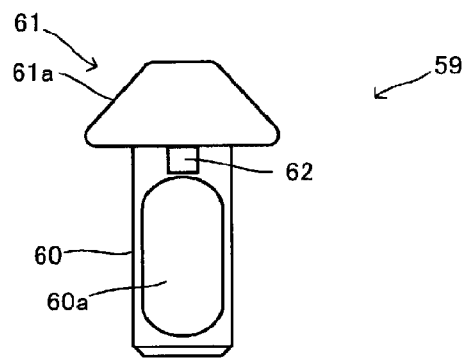
FIG. 12B is a front view of the regulating member 59.
Figure 12C:
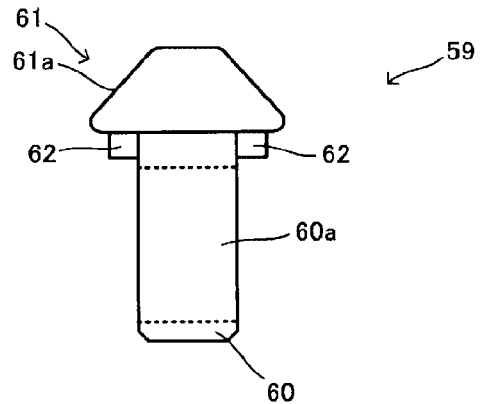
FIG. 12C is a side view of the regulating member 59.

FIG. 12A is a perspective view of the regulating member 59, FIG. 12B is a front view of the regulating member 59, and FIG. 12C is a side view of the regulating member 59, respectively.

As can be ascertained from FIGS. 12A to 12C, the regulating member 59 includes a columnar regulating shaft 60, in which a long hole 60a that penetrates in a direction orthogonal to the axis of the regulating shaft 60 and is a long hole in the axial direction, is provided.

In addition, a contact portion 61 formed to be thicker than the regulating shaft 60 is provided on one end side of the regulating shaft 60. As can be ascertained from FIGS. 12B and 12C, the contact portion 61 includes an inclined surface 61a which is the thickest on the regulating shaft 60 side and becomes thin as being apart from the regulating shaft 60.

Furthermore, in the end portion of the regulating shaft 60, two projections 62 are disposed on an outer circumferential portion on the side on which the contact portion 61 is disposed. The two projections 62 are disposed on the opposite sides nipping the axis in a column of the regulating shaft 60, and are provided on the same line in one diameter direction. Two projections 62 regulate the rotating force receiving member 55 as will be described later. In addition, in the aspect, two projections 62 are described as an example, but at least two projections may be provided, or three or more projections may be provided.

Returning to FIG. 7, other configuration elements provided in the shaft member 50 will be described. The rotating shaft elastic member 63 and the regulating member elastic member 64 are so-called elastic members, and are coiled springs in the aspect. In addition, the pin 65 is a rod-like member. The dispositions and the actions of each of the members will be described later.

A material which configures each member of the shaft member 50 is not particularly limited, but a resin, such as polyacetal, polycarbonate, or PPS can be used. However, in order to improve the rigidity of the member, glass fibers or carbon fibers may be mixed into the resin in accordance with the load torque. In addition, the rigidity may further be improved by inserting metal into the resin, or the entire body may be manufactured by metal. In a case of making the member by metal, carving by cutting, aluminum die casting, zinc die casting, a metal powder injection molding method (so-called MIM method), or a metal powder sintering lamination method (so-called 3D printing), can be employed. In addition, regardless of the material of the metal, iron, stainless steel, aluminum, brass, copper, zinc, or an alloy of the materials, may be used. In addition, it is possible to improve functionality (lubrication properties or corrosion resistance) of the surface by performing various types of plating.

In addition, from the viewpoint of having elasticity, the shaft member 50 and any member included in the shaft member 50, may be made by bending a metal plate, or may be made by making the metal, glass, or carbon fiber infiltrate into the resin.

By combining the bearing member 40 and the shaft member 50 with each other as described above, the end member 30 is made. In addition, by describing the combination, the size of each member and part, the structure, or the relationship of the sizes of the members and parts, are further understood.

First, a combination of the bearing member 40 and the rotating shaft 51 will be described. FIG. 13A is a perspective view in which the rotating shaft 51 is combined with the bearing member 40, FIG. 13B is a plan view thereof, and FIG. 13C is an arrow sectional view illustrated by $C_{13e}$-$C_{13e}$ in FIG. 13B.

As can be ascertained from FIGS. 13A to 13C, the rotating shaft 51 passes through the hole 46a of the rotating shaft holding member 46 of the bearing member 40, and the end portion on the side on which the projection 53 is disposed on the inner side of the shaft member holding portion 45 and the end portion on the side opposite thereto is disposed to protrude from the bearing member 40. At this time, as the projection 53 is disposed in the end portion on the side blocked by the rotating shaft holding member 46 among the end portions of the slit 48a provided in the guide wall 48, and is hooked to the rotating shaft holding member 46, the rotating shaft 51 is configured not to fall out from the bearing member 40.

In addition, as can be ascertained from FIG. 13C, the rotating shaft elastic member 63 is disposed between the rotating shaft 51 and the support member 47, and the rotating shaft 51 is biased in a direction in which the projection 53 is pressed to the rotating shaft holding member 46.

The attachment of the rotating shaft 51 to the bearing member 40 can be performed by inserting the projection 53 of the rotating shaft 51 into the slit 48a from the slit 46b, and by moving the projection 53 in the slit 48a along a dotted line illustrated in FIGS. 9A and 9B.

Next, combination of other members with the rotating shaft 51 in the shaft member 50 will be described. FIGS. 14A and 14B illustrate a view illustrating this. FIG. 14A is an exploded perspective view, and FIG. 14B is a sectional view of the shaft member 50 in a direction along the axis.

As can be ascertained from FIG. 14B, the regulating member elastic member 64 is disposed on the inner side of the recessed portion 52b of the body 52 of the rotating shaft 51. Therefore, one end portion of the regulating member elastic member 64 is supported by the partition portion 52a of the body 52.

Meanwhile, the end portion of the regulating member 59 on the side on which the contact portion 61 is not disposed in the regulating shaft 60 passes through the base portion 56 of the rotating force receiving member 55, and further, is inserted into the recessed portion 52b of the body 52 of the rotating shaft 51. Accordingly, the rotating force receiving member 55 is disposed on the end surface opposite to the projection 53 in the body 52 of the rotating shaft 51. At this time, the engaging member 58 of the rotating force receiving member 55 is disposed to protrude to the side opposite to the rotating shaft 51, and the guide 56b of the rotating force receiving member 55 is disposed to overlap the rail projection 54 disposed on the end surface of the body 52 of the rotating shaft 51.

In addition, one end of the regulating member 59 is inserted into the recessed portion 52b formed in the body 52 of the rotating shaft 51, and the end surface thereof comes into contact with the other end portion of the regulating member elastic member 64. Accordingly, the regulating member 59 is biased in a direction of protruding from the body 52. In addition, the other end (that is, end portion on a side on which the contact portion 61 is disposed) of the regulating member 59, and the contact portion 61, are disposed on the inner side of the base portion 56 of the rotating force receiving member 55 and between two engaging members 58.

Furthermore, the pin 65 passes through a long hole 59a provided in the regulating shaft 60 of the regulating member 59, and both ends of the pin 65 are disposed to cross over the two holes 52d of the rotating shaft 51. Accordingly, falling-out of the regulating member 59 from the body 52 of the rotating shaft 51 against the regulating member elastic member 64 is regulated.

By combining the members as described above, the axis of each of the bearing member 40 and the shaft member 50 are disposed to be identical to each other.

Figure 15:
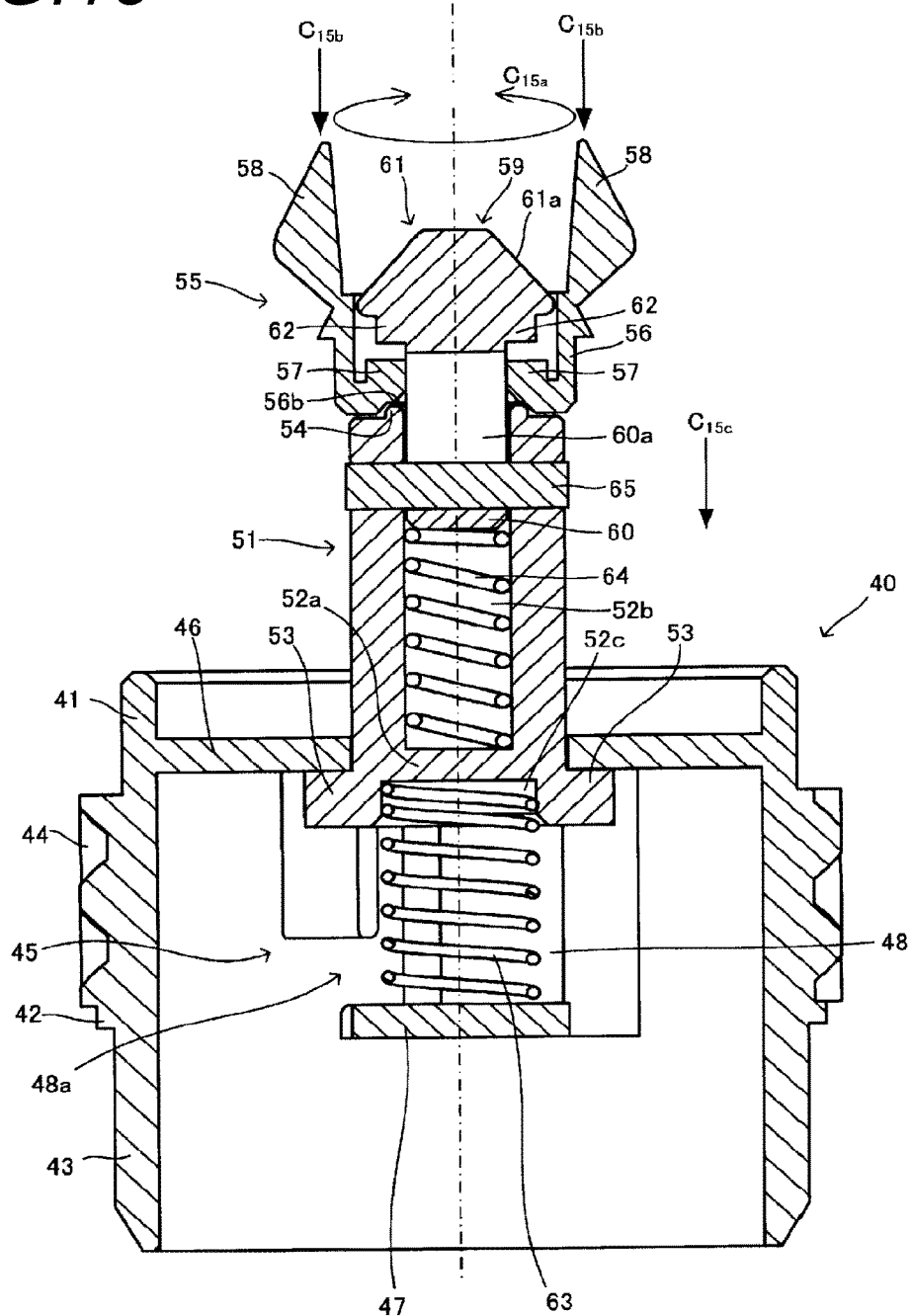
FIG. 15 is a sectional view of the end member 30.

Next, how the end member 30 combined as described above can be deformed, move, and rotate, will be described. FIG. 15 is a sectional view in a direction along the axis in one posture of the end member 30.

In the posture illustrated in FIG. 15, a posture in which the entire shaft member 50 protrudes from the bearing member 40 the most within a possible range by the rotating shaft elastic member 63, and a posture in which the regulating member 59 protrudes the most from the body 52 by the regulating member elastic member 64, are achieved. When no external force is applied to the shaft member 50, the end member 30 is in this posture.

From this posture, as can be ascertained from FIG. 15, the projection 57 of the rotating force receiving member 55 and the projection 62 of the regulating member 59 exist at positions different from each other being apart in the axial direction when viewed in a sectional direction of FIG. 15 (when viewed from a front surface). Therefore, in the posture, rotation of the engaging member 58 of the rotating force receiving member 55 is freely performed as illustrated by $C_{15a}$ in FIG. 15. In other words, in the posture, relative rotation of the engaging member 58 with respect to the bearing member 40 and the regulating member 59 is not regulated and is freely performed.

In addition, the rotation thereof is performed while the rail projection 54 of the rotating shaft 51 is guided by the guide 56b of the rotating force receiving member 55. Therefore, only by rotating the rotating force receiving member 55 even when a rotating force is applied to the rotating force receiving member 55 in this posture, the transmission of the rotating force to other members is not performed, and a posture in which the engaging member 58 is not engaged is achieved.

In addition, in the posture, as illustrated by an arrow $C_{15b}$ in FIG. 15, when the engaging member 58 of the rotating force receiving member 55 is pressed to the bearing member 40 side in the axial direction, a force is transmitted to the shaft member 50, and the shaft member 50 can be moved in the direction of being pressed to the bearing member 40 as illustrated by $C_{15c}$ in FIG. 15 against a biasing force of the rotating shaft elastic member 63.

Figure 16:
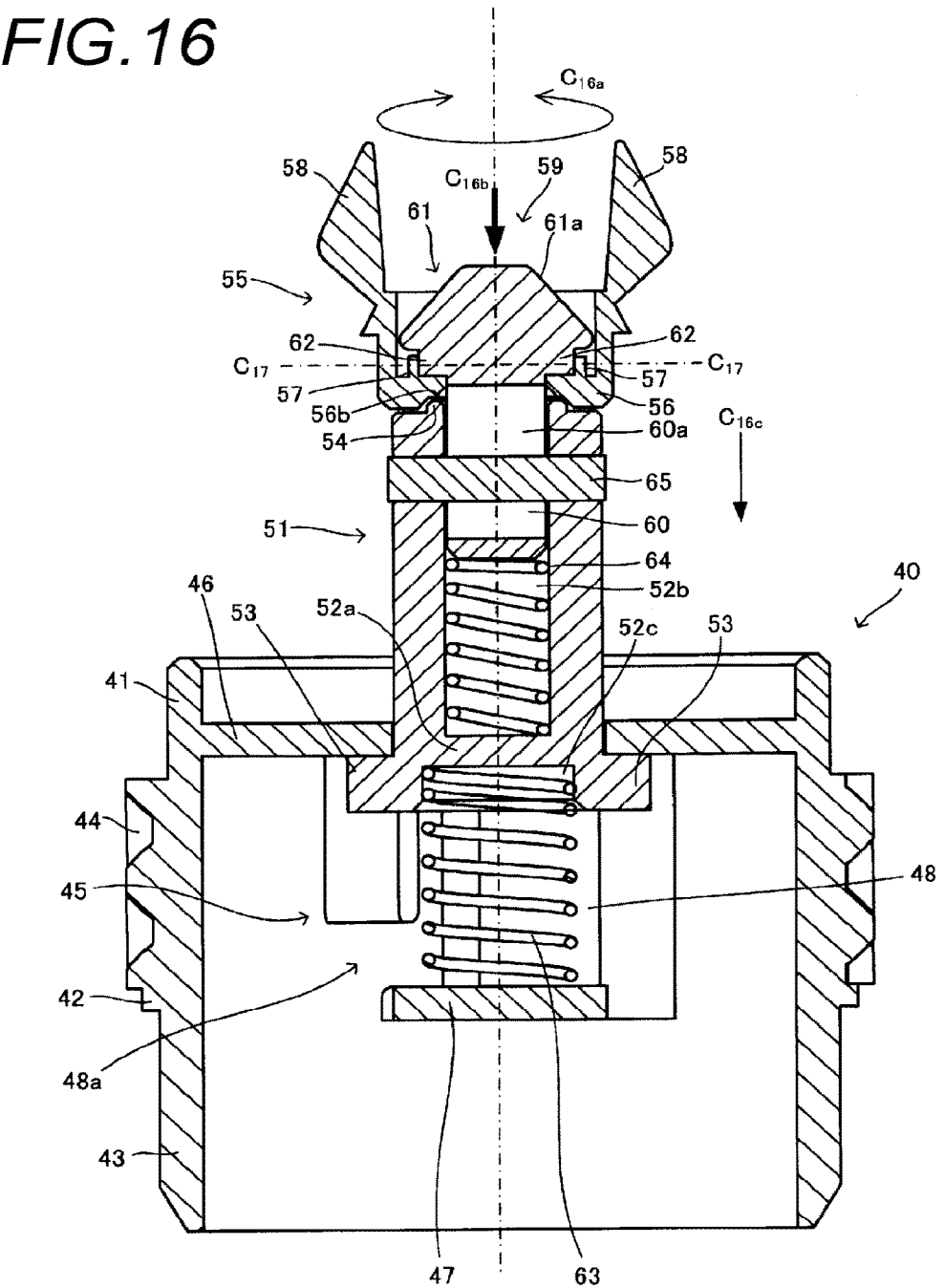
FIG. 16 is a sectional view of the end member 30.
Figure 17:
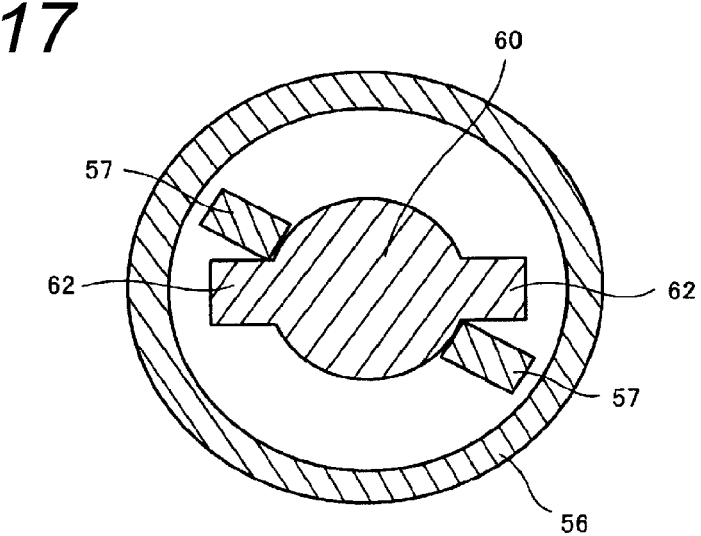
FIG. 17 is a sectional view of the end member 30.

Next, from the posture illustrated in FIG. 15, a posture in which the regulating member 59 is moved to be pressed to the body 52 side of the rotating shaft 51 will be described. FIG. 16 is a view from the same viewpoint as that of FIG. 15 in the posture, and FIG. 17 is an end surface of a part illustrated by $C_{17}$-$C_{17}$ in FIG. 16.

In the posture, as illustrated by $C_{16b}$ in FIG. 16, the regulating member 59 moves to be pressed to the body 52 of the rotating shaft 51 against the biasing force of the regulating member elastic member 64. Then, the projection 62 of the regulating member 59 is in a posture of going into a track of the rotation of the projection 57 of the rotating force receiving member 55. Accordingly, in the posture, relative rotation of the engaging member 58 of the rotating force receiving member 55 is regulated with respect to the bearing member 40 and the regulating member 59, and the engaging member 58 cannot freely rotate. For example, as illustrated in FIG. 17, when the rotating force receiving member 55 rotates and the projection 57 rotates following the rotation of the rotating force receiving member 55, the projection 57 is engaged with the projection 62 of the regulating member 59 at any part. Therefore, in the posture of being engaged in this manner, when the rotation driving force is applied to the regulating member 59 as illustrated by $C_{16a}$ in FIG. 16, the engaged regulating member 59, the rotating shaft 51 engaged with the regulating member 59 by the pin 65, and the bearing member 40 engaged by the projection 53 of the rotating shaft 51, rotate in the same manner. In other words, the rotation driving force applied to the rotating force receiving member 55 is transmitted to the entire end member 30.

In addition, from the posture, when the regulating member 59 is further pressed in a direction illustrated by an arrow $C_{16b}$ in FIG. 16, the force is transmitted to the rotating shaft 51, and the shaft member 50 can move in the axial direction of being pressed to the bearing member 40 as illustrated by $C_{16c}$ of FIG. 16 against the biasing force of the rotating shaft elastic member 63.

As illustrated in FIG. 5 (also referred to FIG. 19), the above-described end member 30 inserts and makes the fitting portion 43 of the end member 30 adhere to one end portion of the photosensitive drum 11. In addition, the lid member 20 can be disposed in the other end portion of the photosensitive drum 11 and this can be regarded as the photosensitive drum unit 10.

Next, the apparatus body 2 will be described. The apparatus body 2 in the aspect is a body of a laser printer. In the laser printer, as described above, the process cartridge 3 operates in a mounted posture, and when the image is formed, the photosensitive drum 11 is rotated, and charging is performed by the charging roller unit. In this state, the photosensitive drum 11 is irradiated with the laser light which corresponds to image information by using various optical members provided here, and the electrostatic latent image which is based on the image information is obtained. The latent image is developed by the developing roller unit.

Meanwhile, the recording medium, such as a paper sheet, is set in the apparatus body 2, and is conveyed to a transfer position by a sending roller or a conveying roller, which is provided in the apparatus body 2. A transfer roller 1a (refer to FIG. 4) is disposed at the transfer position, voltage is applied to the transfer roller 1a following the passage of the recording medium, and the image is transferred to the recording medium from the photosensitive drum 11. After this, the image is fixed to the recording medium as heat and voltage are applied to the recording medium. In addition, the recording medium on which the image from the apparatus body 2 is formed is discharged by a discharge roller.

In this manner, in a posture in which the process cartridge 3 is mounted, the apparatus body 2 applies the rotation driving force to the photosensitive drum unit 10. Here, how the rotation driving force is applied to the photosensitive drum unit 10 from the apparatus body 2 in a posture in which the process cartridge 3 is mounted, will be described.

Figure 18A:
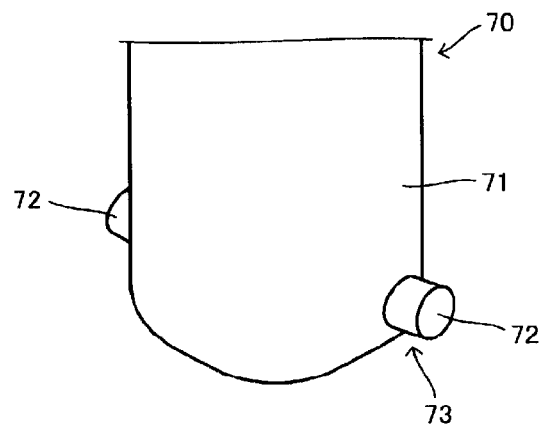
FIG. 18A is a perspective view of a driving shaft 70.
Figure 18B:
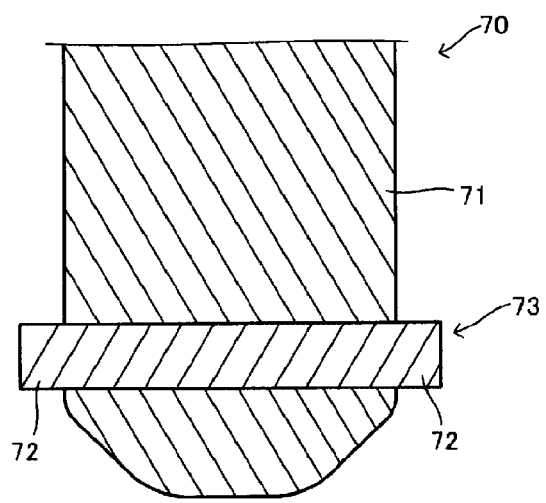
FIG. 18B is a sectional view of the driving shaft 70.

The rotation driving force to the process cartridge 3 is applied by the driving shaft 70 which serves as a rotating force imparting portion of the apparatus body 2. As can be ascertained from FIGS. 1 and 2, the driving shaft 70 is disposed to protrude from a bottom portion of the end portion on a far side of the guide 2a. FIG. 18A is a perspective view of the shape of the tip end portion of the driving shaft 70. In addition, FIG. 18B is a sectional view along the axial direction of the driving shaft 70. As can be ascertained from the drawings, the driving shaft 70 is configured to include the shaft portion 71 and the rotating force transmitting projection 72.

The shaft portion 71 is a shaft member which rotates around the axis. In addition, the tip end portion of the shaft portion 71 has a size to be capable of being disposed between two engaging members 58 (for example, refer to FIG. 6) of the rotating force receiving member 55 of the above-described shaft member 50.

In addition, the tip end portion of the shaft portion 71 in which angle portions are removed, that is, so-called chamfering is performed, is preferable. Accordingly, the engagement between the driving shaft 70 and the shaft member 50 is more smoothly performed.

On the side opposite to the tip end side illustrated in FIG. 18A of the shaft portion 71, a gear train is formed to be capable of rotating the shaft portion 71 around the axis, and is connected to a motor which is a driving source via the gear train.

The rotating force transmitting projections 72 are two columnar members which are provided to be close to the tip end of the shaft portion 71, and to protrude from the shaft portion 71 in the direction orthogonal to the axis of the shaft portion 71. In the aspect, with respect to the longitudinal direction, one pin 73 is formed to be longer than the diameter of the shaft portion 71, and the both ends thereof are formed to protrude from the side surface of the shaft portion 71 across the axis of the shaft portion 71.

Here, the shaft portion 71 of the driving shaft 70 is disposed to protrude from the bottom portion of the guide 2a substantially perpendicularly to the moving direction (a direction in which the guide 2a extends) for attaching and detaching the process cartridge 3 to and from the apparatus body 2 illustrated by $C_1$ in FIG. 1. In addition to this, the shaft portion 71 only rotates without moving in the axial direction. Therefore, in attaching and detaching the process cartridge 3, it is necessary to mount and disengage the shaft member 50 to and from the driving shaft 70. In addition, according to the above-described end member 30, it becomes easy to mount and disengage the shaft member 50 to and from the driving shaft 70. A specific aspect of the attachment and detachment will be described later.

Figure 19:
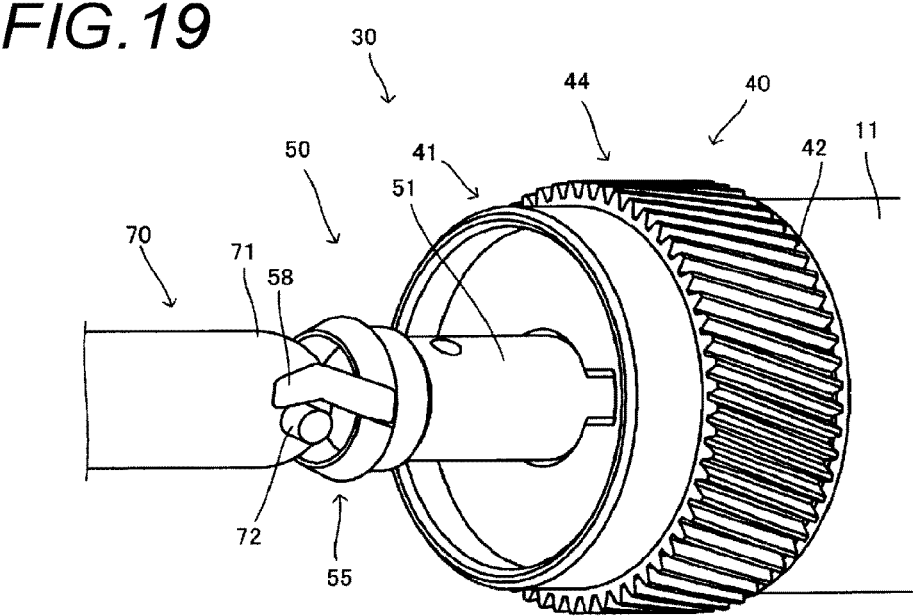
FIG. 19 is a perspective view illustrating a situation in which the driving shaft 70 and the end member 30 are engaged with each other.

In a posture in which the process cartridge 3 is mounted on the apparatus body 2, the driving shaft 70 and the rotating force receiving member 55 provided in the shaft member 50 of the end member 30 are engaged with each other, and the rotating force is transmitted. FIG. 19 illustrates a situation in which the rotating force receiving member 55 of the end member 30 is engaged with the driving shaft 70.

As can be ascertained from FIG. 19, in a posture in which the driving shaft 70 and the rotating force receiving member 55 are engaged with each other, the axis of the driving shaft 70 and the axis of the shaft member 50 are disposed to abut against each other to be identical to each other. At this time, the tip end of the shaft portion 71 of the driving shaft 70 goes into between two engaging members 58 of the rotating force receiving member 55, and the rotating force transmitting projection 72 of the driving shaft 70 is engaged to be hooked to the engaging member 58 from the side surface.

In addition, at this time, the tip end of the shaft portion 71 of the driving shaft 70 presses the contact portion 61 of the regulating member 59, and the end member 30 is in a posture illustrated in FIG. 16. Accordingly, the rotating force receiving member 55 rotates following the rotation of the driving shaft 70, and the end member 30 and the photosensitive drum 11, that is, the photosensitive drum unit 10 rotates.

Figure 20A:
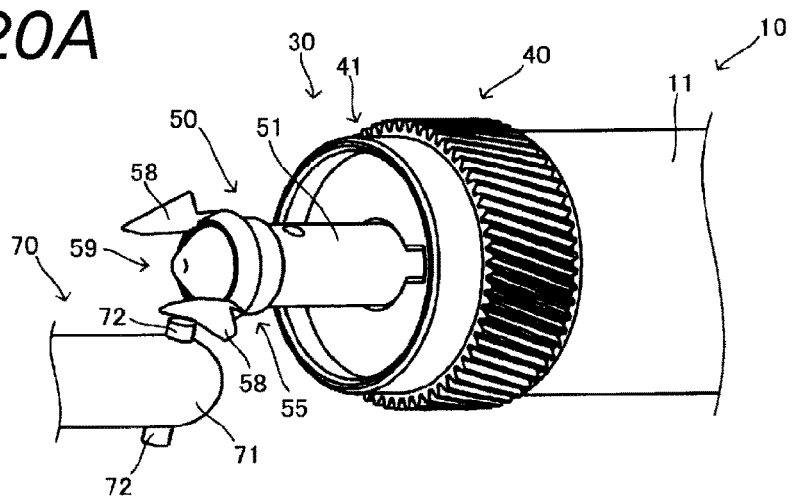
FIG. 20A is a perspective view illustrating a situation in which the driving shaft 70 and the photosensitive drum unit 10 are engaged with each other.
Figure 20B:
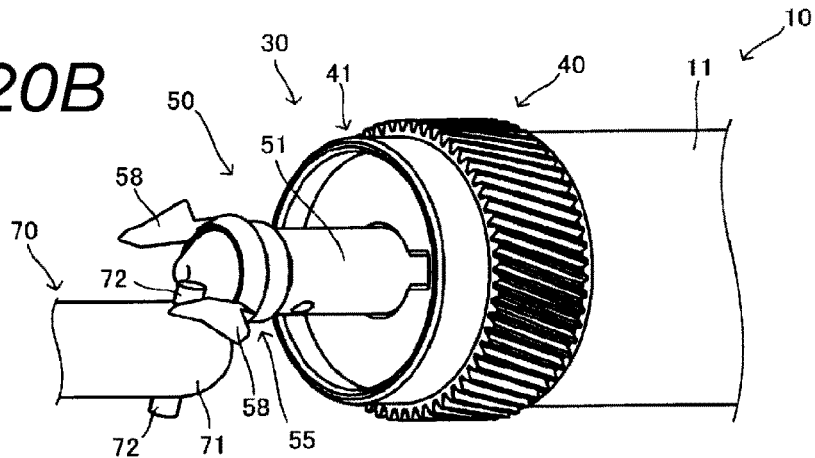
FIG. 20B is a perspective view illustrating another situation in which the driving shaft 70 and the photosensitive drum unit 10 are engaged with each other.
Figure 20C:
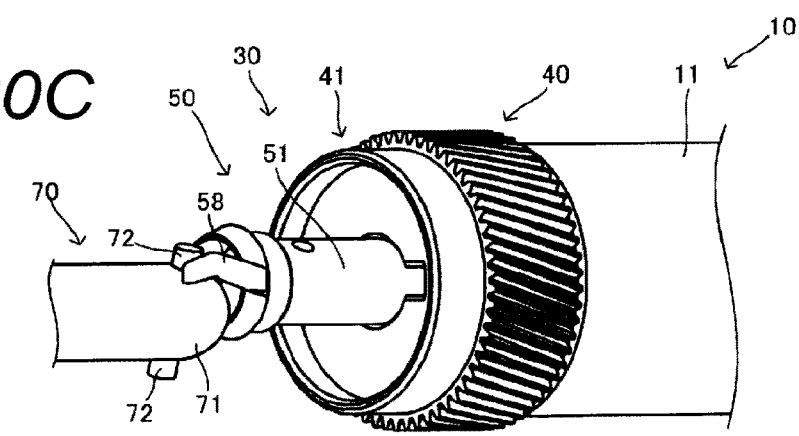
FIG. 20C is a perspective view illustrating still another situation in which the driving shaft 70 and the photosensitive drum unit 10 are engaged with each other.
Figure 21:
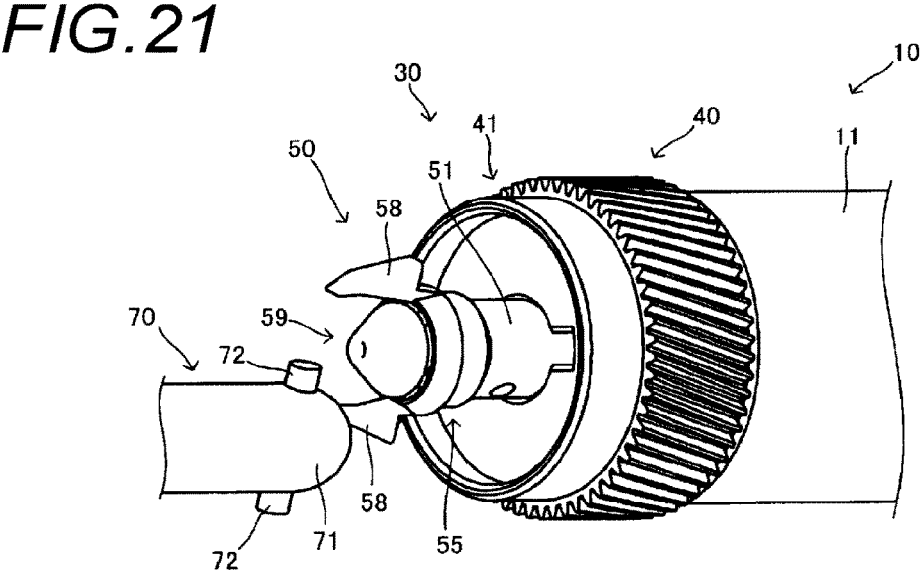
FIG. 21 is a perspective view illustrating a situation in which the driving shaft 70 and the photosensitive drum unit are engaged with each other.

Next, an example of operations of the driving shaft 70 and the photosensitive drum unit 10 when the process cartridge 3 is mounted on the apparatus body 2 and is in a posture illustrated in FIG. 19, will be described. FIGS. 20A to 20C and 21 are views for the description. FIGS. 20A to 20C illustrate perspective views following an order of a process in which the driving shaft 70 is engaged with the rotating force receiving member 55. FIG. 21 is a perspective view illustrating one situation of engagement according to an example different from FIGS. 20A to 20C.

First, from the direction orthogonal to the axial direction of the driving shaft 70 as illustrated in FIG. 20B from the state illustrated in FIG. 20A, the photosensitive drum unit 10 approaches. At this time, the end member 30 is oriented toward the driving shaft 70 side, the axis thereof has an orientation parallel to the axis of the driving shaft 70, and the photosensitive drum unit 10 approaches the driving shaft 70 while moving in the direction orthogonal to the axis. At this time, the shaft member 50 is in a posture illustrated in FIG. 15.

In a situation illustrated in FIG. 20B, the driving shaft 70 comes into contact with the engaging member 58 of the rotating force receiving member 55. However, at this time, since the shaft member 50 is in a posture illustrated in FIG. 15, the rotating force receiving member 55 freely rotates, and thus, the driving shaft 70 rotates by pressing the rotating force receiving member 55. Accordingly, the driving shaft 70 does not interrupt the engaging member 58 of the rotating force receiving member 55, and can enter between the two engaging members 58 as illustrated in FIG. 20C.

As illustrated in FIG. 20C, when the driving shaft 70 enters between the two engaging members 58, the tip end of the driving shaft 70 presses the contact portion 61 of the regulating member 59. Here, since the contact portion 61 is configured to have the inclined surface 61a, the entering is smoothly performed. Accordingly, finally, a posture (posture illustrated in FIG. 16) illustrated in FIG. 19 is achieved, and the rotation driving force from the driving shaft 70 can be transmitted to the photosensitive drum 11.

Meanwhile, rarely, but in a positional relationship between the driving shaft 70 and the engaging member 58 of the rotating force receiving member 55, a case where the rotating force receiving member 55 is in a posture illustrated in FIG. 15 or a case where the rotating force receiving member 55 does not appropriately rotate, is also regarded. However, in the case, as illustrated in FIG. 21, since the driving shaft 70 imparts a force illustrated by $C_{15b}$ illustrated in FIG. 15 to the shaft member 50, the entire shaft member 50 is pushed to the bearing member 40 side, the driving shaft 70 climbs over the engaging member 58 and goes into between two engaging members 58, and as illustrated in FIG. 19, a posture in which the rotating force can be transmitted is achieved.

As described above, it is possible to mount the process cartridge 3 onto the apparatus body 2 to be pressed from the direction different from the axial direction of the driving shaft 70 of the apparatus body 2. A behavior also varies regarding the disengagement, but similarly, the movement and the rotation of the shaft member 50 are more smoothly performed.

In addition, according to the end member 30, by the rotation in the axial direction and the movement in the direction orthogonal to the axial direction without necessity of oscillation (inclination) of the shaft member 50, it is possible to more smoothly attach and detach the driving shaft 70 to and from the shaft member 50. In addition, since it is possible to set a tolerance with respect to a dimension with respect to the shaft member which is necessary for the oscillation (inclination) to be large, it can be said that productivity is high from the related viewpoint.

In addition, since the state where the engaging member 58 is not engaged with the driving shaft 70 as necessary by the regulating member 59, and the state where the engaging member 58 is engaged with the driving shaft 70, are switched to each other, interruption of the attachment and detachment caused by the member in the middle of the attachment and detachment of the process cartridge is unlikely to be generated, and the attachment and detachment are smoothly performed.

Figure 22A:
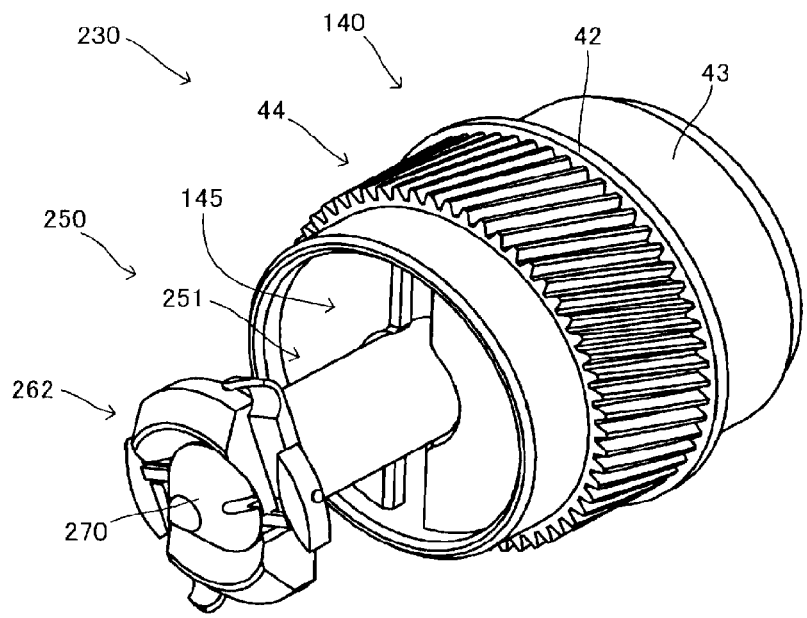
FIG. 22A is a perspective view of an end member 230.
Figure 22B:
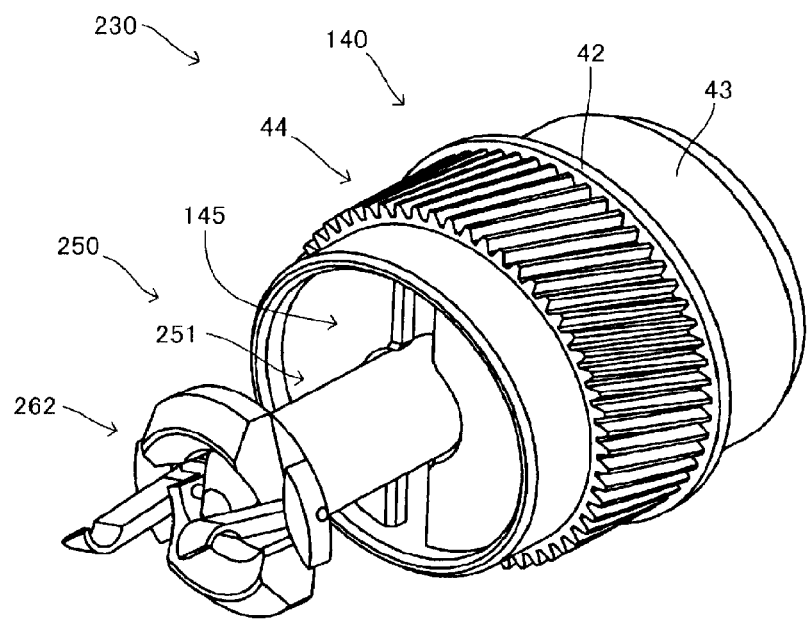
FIG. 22B is another perspective view of the end member 230.
Figure 23:
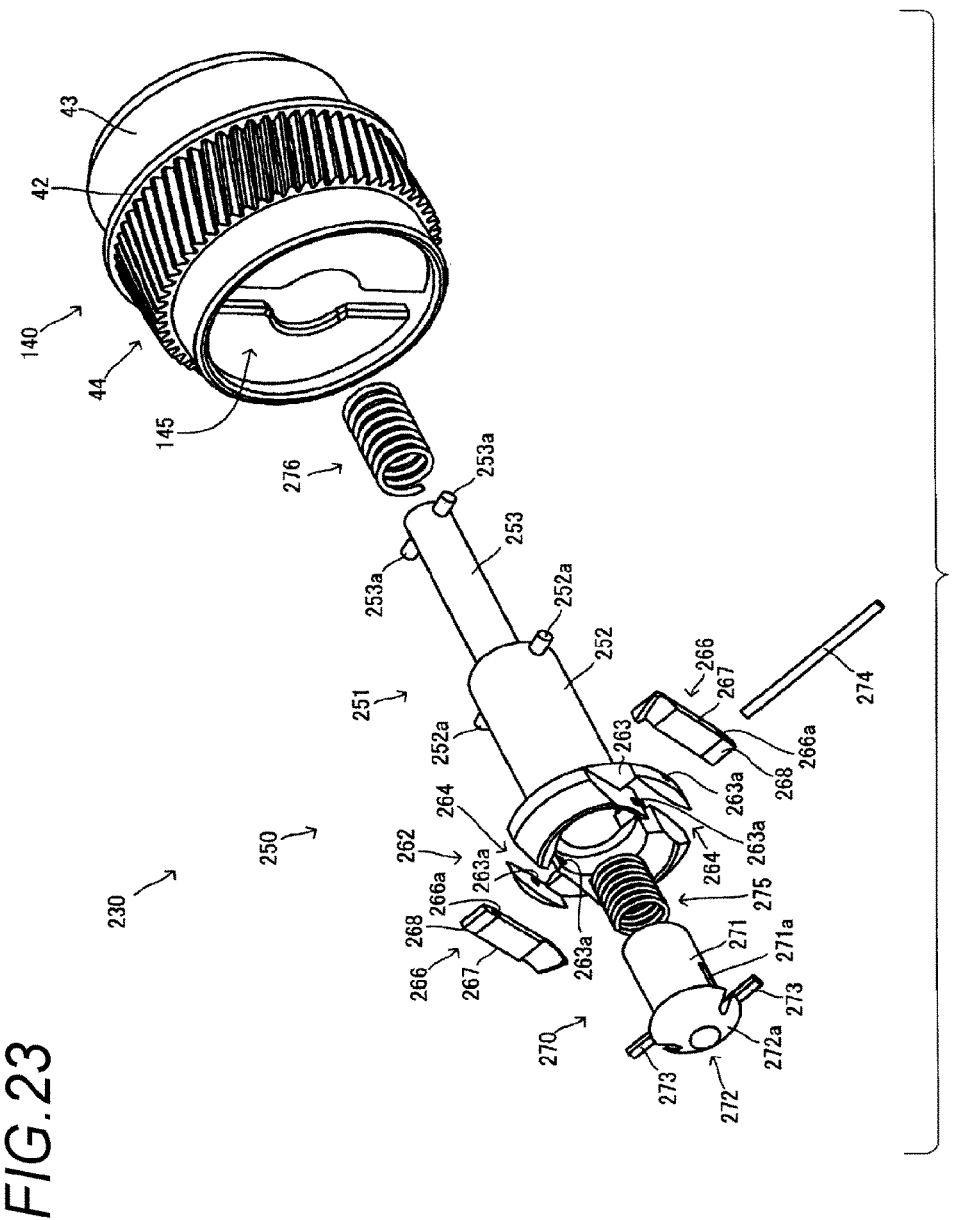
FIG. 23 is an exploded perspective view of the end member 230.

Next, a second aspect will be described. FIG. 22A is a perspective view in one posture of an end member 230 in the second aspect, and FIG. 22B is a perspective view in another posture of the end member 230. In addition, FIG. 23 illustrates an exploded perspective view of the end member 230. The second aspect is the same as the first aspect except for the end member 230, and the description thereof will be omitted here. In addition, regarding the end member 230, the same parts as those of the above-described end member 30 will be given the same reference numbers, and the description thereof will be omitted.

The end member 230 is also a member attached to the end portion opposite to the lid member 20 among the end portions of the photosensitive drum 11, and includes a bearing member 140 and a shaft member 250. Here, as the bearing member 140, it is possible to employ a member having the same configuration as that of the bearing member 140, and thus, here, the same reference numbers are given and the description thereof will be omitted.

Figure 24:
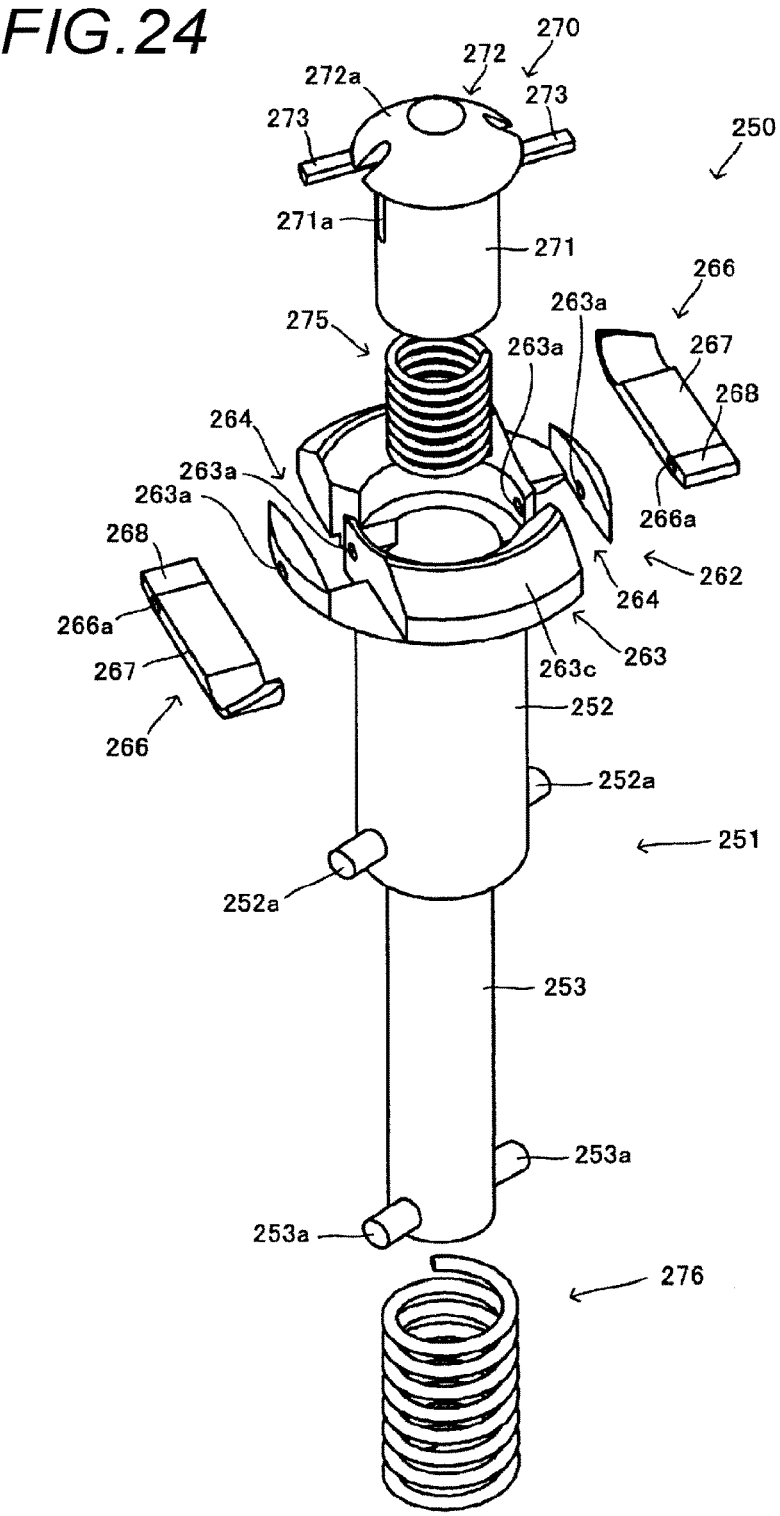
FIG. 24 is an exploded perspective view of a shaft member 250.

As can be ascertained from FIG. 24, the shaft member 250 is configured to include a rotating shaft 251, a rotating force receiving member 262, a regulating member 270, a pin 274, a regulating member elastic member 275, and a rotating shaft elastic member 276. Here, the pin 274 is a rod-like member. In addition, the regulating member elastic member 275 and the rotating shaft elastic member 276 of the aspect are coiled springs.

FIG. 24 illustrates an enlarged exploded perspective view of a member other than the pin 274. Each of the members will be described with reference to FIGS. 23 and 24.

The rotating shaft 251 is a member which transmits a rotating force from the rotating force receiving member 262 to the bearing member 140, and as can be ascertained from FIGS. 23 and 34, the rotating shaft 251 includes a cylindrical first rotating shaft 252 and a columnar second rotating shaft 253 of which an outer diameter is smaller than that of the first rotating shaft 252, and has a structure in which the two rotating shafts are coaxially aligned and one ends thereof are linked to each other.

In the first rotating shaft 252, on a side surface in the end portion on a side linked to the second rotating shaft 253, two projections 252a are disposed. The two projections 252a are provided on the same line in one diameter direction of the cylinder of the first rotating shaft 252.

In addition, in the second rotating shaft 253, on a side surface in the end portion on a side opposite to the side linked to the first rotating shaft 252, two projections 253a are disposed. The two projections 253a are provided on the same line in one diameter direction of the column of the second rotating shaft 253.

The rotating force receiving member 262 is a member which receives the rotation driving force from the apparatus body 2 (refer to FIG. 1) and transmits the driving force to the rotating shaft 251 when the end member 230 is in a predetermined posture. The rotating force receiving member 262 in the aspect is configured to be disposed in the end portion on the side opposite to the second rotating shaft 253 in the first rotating shaft 252 of the rotating shaft 251, and to include a cylindrical base portion 263 and a plate-like engaging member 266.

The base portion 263 is a cylindrical member, and is coaxially disposed in the end portion on one side in the first rotating shaft 252 of the rotating shaft 251. Both of an outer circumference and an inner circumference of the base portion 263 are formed to be greater than the outer circumference and the inner circumference of the first rotating shaft 252 of the rotating shaft 251. In addition, an outer circumferential portion of the base portion 263 includes an inclined surface 263c in which a diameter decreases as being separated from the first rotating shaft 252.

In the base portion 263, two engaging member accommodation grooves 264 which are grooves formed to be substantially parallel nipping the axis, are provided. In the aspect, two engaging member accommodation grooves 264 are provided to be parallel at positions having the same distance from the axis nipping the axis, and extend to be at a position of twist with respect to the axis.

In addition, the base portion 263 is provided with a hole 263a to penetrate in the direction orthogonal to the direction in which two engaging member accommodation grooves 264 extend, along the diameter of the base portion. In the aspect, four holes 263a are formed.

The entire engaging member 266 has a shape of a plate, and is formed to have a size that is accommodated in the groove of the above engaging member accommodation groove 264. In the engaging member, a hole 266a is provided, and one side becomes an engaging portion 267 and the other side becomes an operated portion 268 nipping the hole 266a. Although not particularly limited, the engaging portion 267 is preferably longer compared to the operated portion 268. In addition, a tip end of the engaging portion 267 may be curved. Accordingly, stable engagement with the rotating force transmitting projection 72 of the driving shaft 70 is possible.

The regulating member 270 is configured to include a regulating shaft 271, a contact portion 272, and an operating portion 273.

The regulating shaft 271 is a columnar member, and an appearance thereof has a size that can be inserted into the inner side of the cylinder of the first rotating shaft 252. In addition, a slit 271a which penetrates in the diameter direction and extends by a predetermined size in the axial direction is formed in the regulating shaft 271.

The contact portion 272 is a member of a conical part (truncated conical) provided coaxially to the side that is not inserted into the first rotating shaft 252 on the end surface of the regulating shaft 271, and the diameter thereof becomes greater than that of the regulating shaft 271 on a bottom portion thereof. Therefore, a side surface of the contact portion 272 becomes an inclined surface 272a.

The operating portion 273 is a rod-like member which extends in the direction of separating from the axis, and two operating portions 273 are disposed similarly to the engaging member 266. As will be described later, the operating portion 273 is formed to have a position and a length by which the operated portion 268 of the engaging member 266 can be pressed in the direction parallel to the axial direction.

By combining each of the above-described members with each other as follows, the end member 230 is made. In addition, by describing the combination, the size of each member and part, the structure, or the relationship of the sizes of the members and parts, are further understood.

Figure 25:
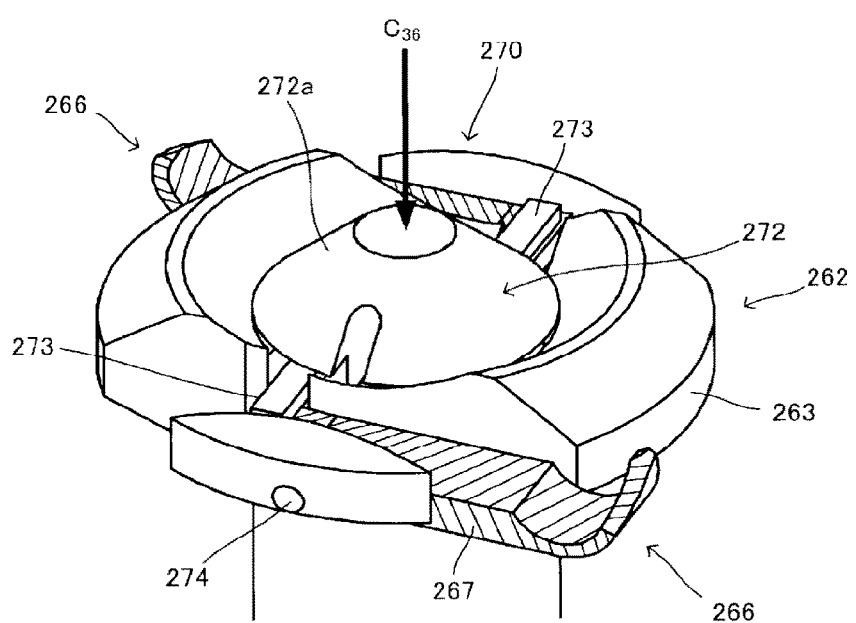
FIG. 25 is an enlarged perspective view of a part of the shaft member 250.

First, the shaft member 250 will be described. FIG. 25 is an enlarged appearance perspective view of a part of the rotating force receiving member 262 and the regulating member 270 in one posture in a situation in which each of the members is combined. In addition, in FIG. 25, and in FIG. 26 which will be used later, only the engaging member 266 is illustrated being hatched for making it easy to see.

As can be ascertained from FIGS. 22 to 25, the regulating member elastic member 275 is inserted into the inner side which is a cylinder of the first rotating shaft 252 of the rotating shaft 251, and further, an end portion on a side on which the contact portion 272 is not disposed in the regulating shaft 271 of the regulating member 270 is also inserted. Accordingly, the regulating member 270 is biased in a direction of falling out from the rotating shaft 251 by a biasing force of the regulating member elastic member 275.

Meanwhile, the engaging member 266 is disposed in the engaging member accommodation groove 264 provided in the base portion 263 of the rotating force receiving member 262. At this time, the hole 263a provided in the base portion 263 and the hole 266a provided in the engaging member 266 are aligned on one straight line. In addition, the slit 271a provided in the regulating shaft 271 of the regulating member 270 is also disposed to be included in the one straight line. In addition, the hole 263a, the hole 266a, and the slit 271a which are arranged on one straight line in this manner are inserted to pass through the pin 274. Accordingly, a posture illustrated in FIG. 25 is possible.

In addition, at this time, the operating portion 273 of the regulating member 270 is disposed to overlap the operated portion 268 formed in the engaging member 266 of the rotating force receiving member 262.

In addition, the attachment of the shaft member 250 to the bearing member 140 can be performed according to an example of an end member 130 described above (for example, also refer to FIG. 27).

In the end member 230 combined in this manner, the rotating shaft 251 and a rotating force receiving member 255 disposed here are biased in a falling-out direction from the bearing member 140 by the rotating shaft elastic member 276, and are held without falling out as the projection 252a is engaged with the shaft member holding portion 145 of the bearing member 140. In addition, the rotating shaft 251 and the rotating force receiving member 262 are against the biasing force of the rotating shaft elastic member 276, and can move in the axial direction by the biasing force.

By the combination as described above, the axes of each of the portions of the bearing member 140 and the shaft member 250 are disposed to be identical to each other.

The end member 230 combined as described above can obtain an aspect illustrated in FIG. 25 as one posture. In other words, the engaging member 266 is in a posture of being disposed to go across along the inner side of the engaging member accommodation groove 264.

Figure 26:
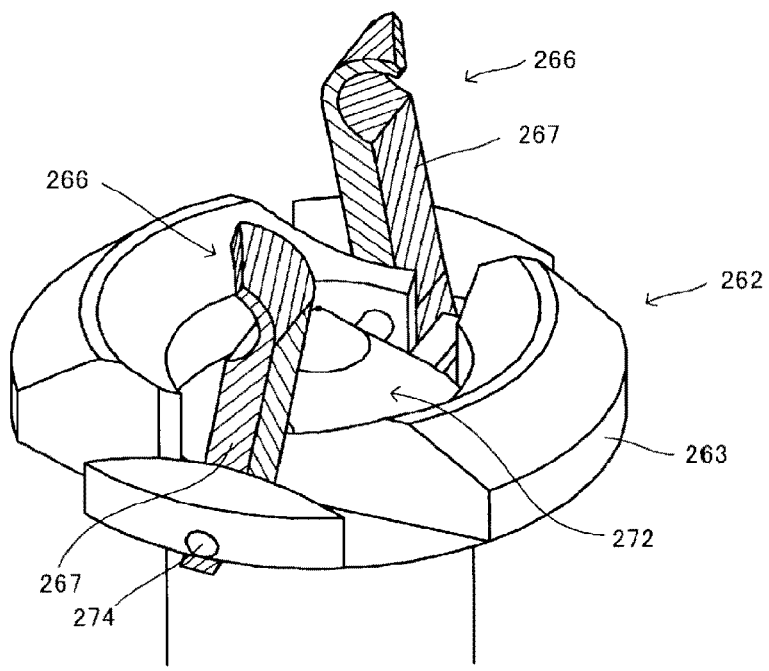
FIG. 26 is an enlarged perspective view of a part of the shaft member 250.

Meanwhile, as illustrated by $C_{36}$ in FIG. 25, when pressing the regulating member 270 to the bearing member 140 side (lower part of the paper surface of FIG. 25), the operating portion 273 also moves downward, and the operated portion 268 of the engaging member 266 is moved downward. Then, since the engaging member 266 rotates around the pin 274, as illustrated in FIG. 26, the engaging member 266 rises up to be close to be parallel to the axial direction.

In other words, the end member 230 can switch a posture (protruding posture) in which the engaging member 266 stands and a posture (caved posture) in which the engaging member 266 is tilted.

Figure 27:
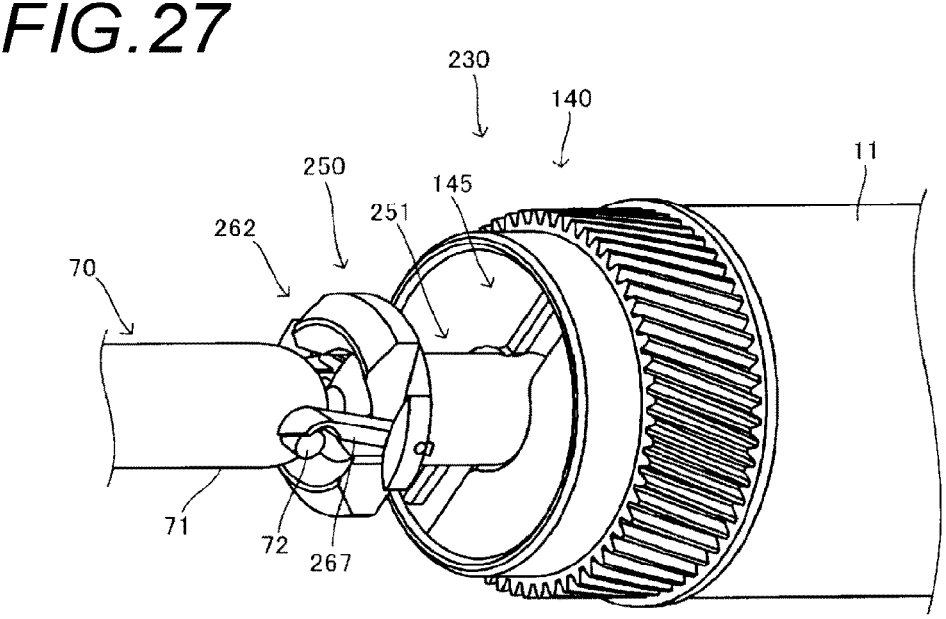
FIG. 27 is a perspective view of a situation in which the driving shaft 70 and the end member 230 are engaged with each other.

In the posture in which the process cartridge provided with the above-described end member 230 is mounted on the apparatus body, the driving shaft 70 and the rotating force receiving member 262 provided in the shaft member 250 of the end member 230 are engaged with each other, and the rotating force is transmitted. FIG. 27 illustrates a situation in which the rotating force receiving member 262 of the end member 230 is engaged with the driving shaft 70.

As can be ascertained from FIG. 27, in a posture in which the driving shaft 70 and the rotating force receiving member 262 are engaged with each other, the axis of the driving shaft 70 and the axis of the shaft member 250 are disposed to abut against each other to be identical to each other. At this time, the tip end of the shaft portion 71 of the driving shaft 70 goes into between two engaging members 266 of the rotating force receiving member 262, and the rotating force transmitting projection 72 of the driving shaft 70 is engaged to be hooked to the engaging member 266 from the side surface.

In other words, at this time, the tip end of the shaft portion 71 of the driving shaft 70 presses the contact portion 272 of the regulating member 270, and the end member 230 is in a posture illustrated in FIG. 26 in which the engaging member 266 stands. Accordingly, the rotating force receiving member 262 rotates following the rotation of the driving shaft 70, and the end member 230 and the photosensitive drum 11, that is, the photosensitive drum unit rotates.

Figure 28A:
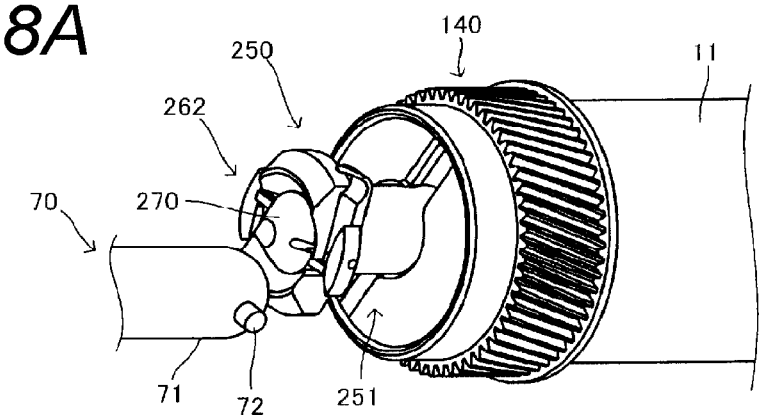
FIG. 28A is a perspective view illustrating a situation in which the driving shaft 70 and the photosensitive drum unit are engaged with each other.
Figure 28B:
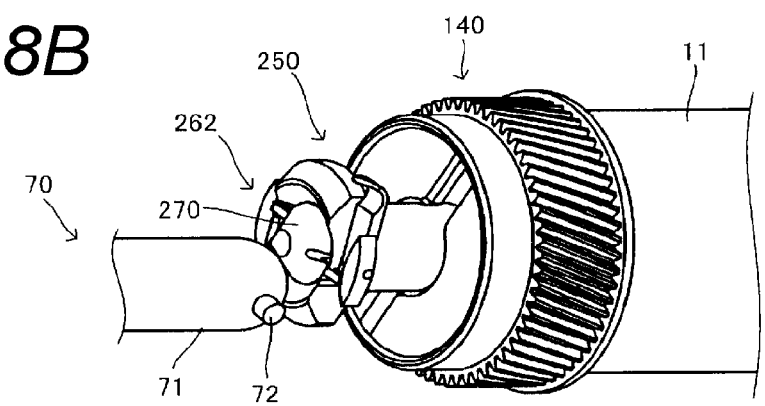
FIG. 28B is a perspective view illustrating another situation in which the driving shaft 70 and the photosensitive drum unit are engaged with each other.
Figure 28C:
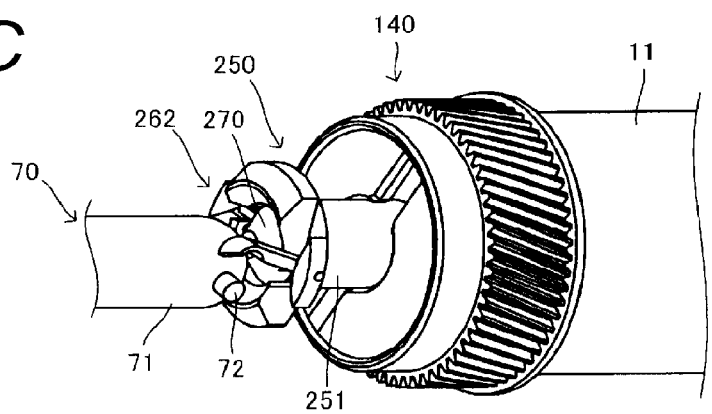
FIG. 28C is a perspective view illustrating still another situation in which the driving shaft 70 and the photosensitive drum unit are engaged with each other.

Next, an example of operations of the driving shaft 70 and the photosensitive drum unit when the process cartridge 3 is mounted on the apparatus body 2 and is in a posture illustrated in FIG. 27, will be described. FIGS. 28A to 28C are a view for the description. FIGS. 28A to 28C illustrate perspective views following an order of a process in which the driving shaft 70 is engaged with the rotating force receiving member 262.

First, from the direction orthogonal to the axial direction of the driving shaft 70 as illustrated in FIG. 28B from the state illustrated in FIG. 28A, the photosensitive drum unit approaches. At this time, the end member 230 is oriented toward the driving shaft 70 side, the axis thereof has an orientation parallel to the axis of the driving shaft 70, and the photosensitive drum unit approaches the driving shaft 70 while moving in the direction orthogonal to the axis. At this time, the shaft member 250 is in a posture illustrated in FIG. 25.

In a situation illustrated in FIG. 28B, the tip end of the driving shaft 70 comes into contact with the base portion 263 of the rotating force receiving member 262. However, in the state, since the engaging member 266 of the shaft member 250 is in a posture illustrated in FIG. 25 and is tilted, the driving shaft 70 does not interrupt the engaging member 266 of the rotating force receiving member 262, and can enter between the two engaging members 266 as illustrated in FIG. 28C. At this time, as the driving shaft 70 moves to slide on the inclined surface 263c of the base portion 263, the rotating shaft 251 is pressed in the axial direction, and the rotating shaft 251 and the rotating force receiving member 262 move in the axial direction against the biasing force of the rotating shaft elastic member 276. Accordingly, the operation is more smoothly performed.

As illustrated in FIG. 28C, when the driving shaft 70 enters until reaching a position of pressing the regulating member 270, the engaging member 266 rises up as described above, and the posture is deformed to a posture illustrated in FIG. 26. Accordingly, finally, a posture illustrated in FIG. 27 is achieved, and the rotation driving force from the driving shaft 70 can be transmitted to the photosensitive drum 11.

As described above, according to the end member 230, by the rotation in the axial direction and the movement in the direction orthogonal to the axial direction without necessity of oscillation of the shaft member, it is possible to more smoothly attach and detach the driving shaft 70 to and from the shaft member. In addition, since it is possible to set a tolerance with respect to a dimension with respect to the shaft member which is necessary for the oscillation to be large, it can be said that productivity is also high from the related viewpoint.

In addition, since the state where the engaging member 266 is not engaged with the driving shaft 70 as necessary by the regulating member 270, and the state where the engaging member 266 is engaged with the driving shaft 70, are switched to each other, interruption of the attachment and detachment caused by the member in the middle of the attachment and detachment of the process cartridge is unlikely to be generated, and the attachment and detachment are smoothly performed.

Figure 29:
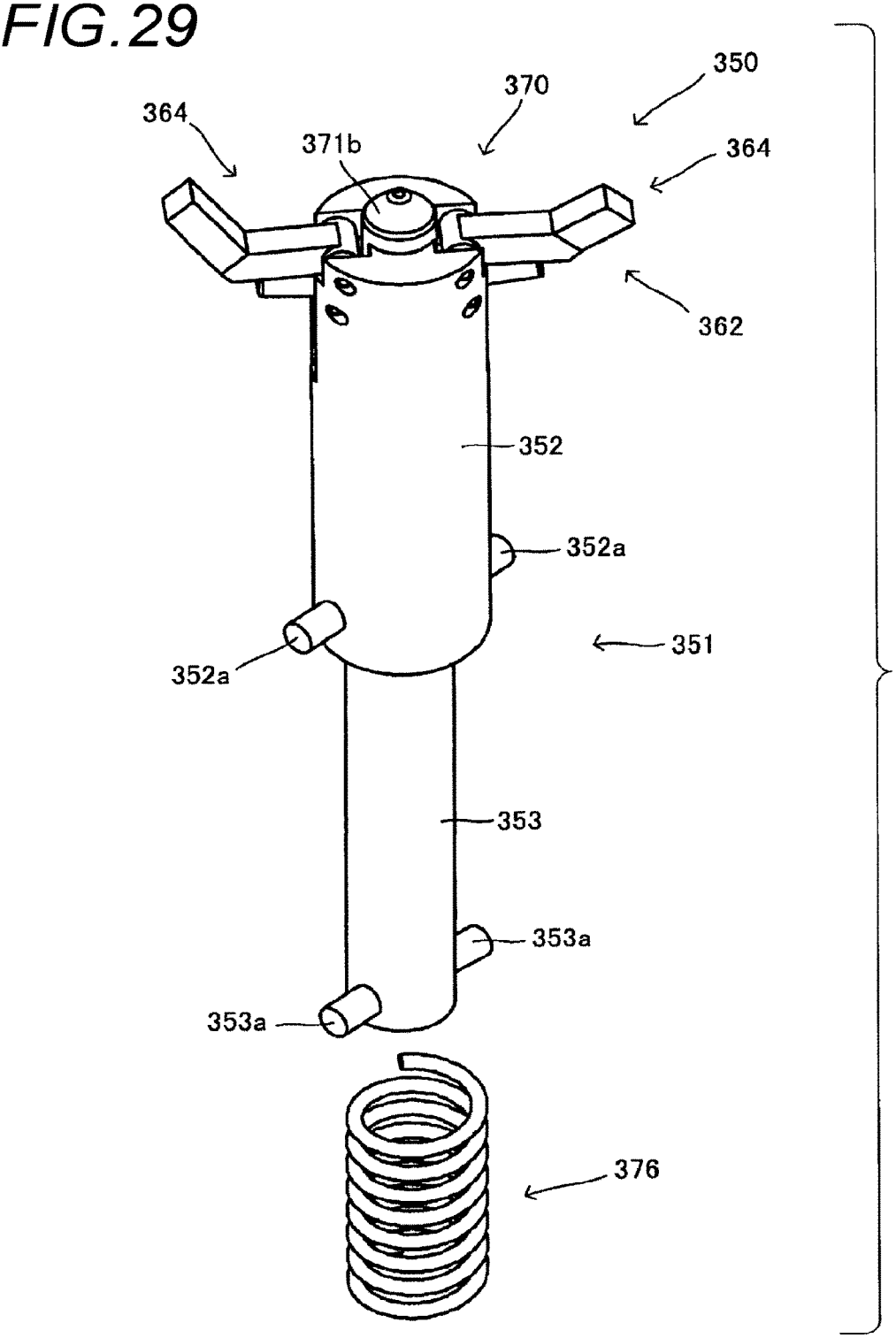
FIG. 29 is an exploded perspective view of a shaft member 350.
Figure 30:
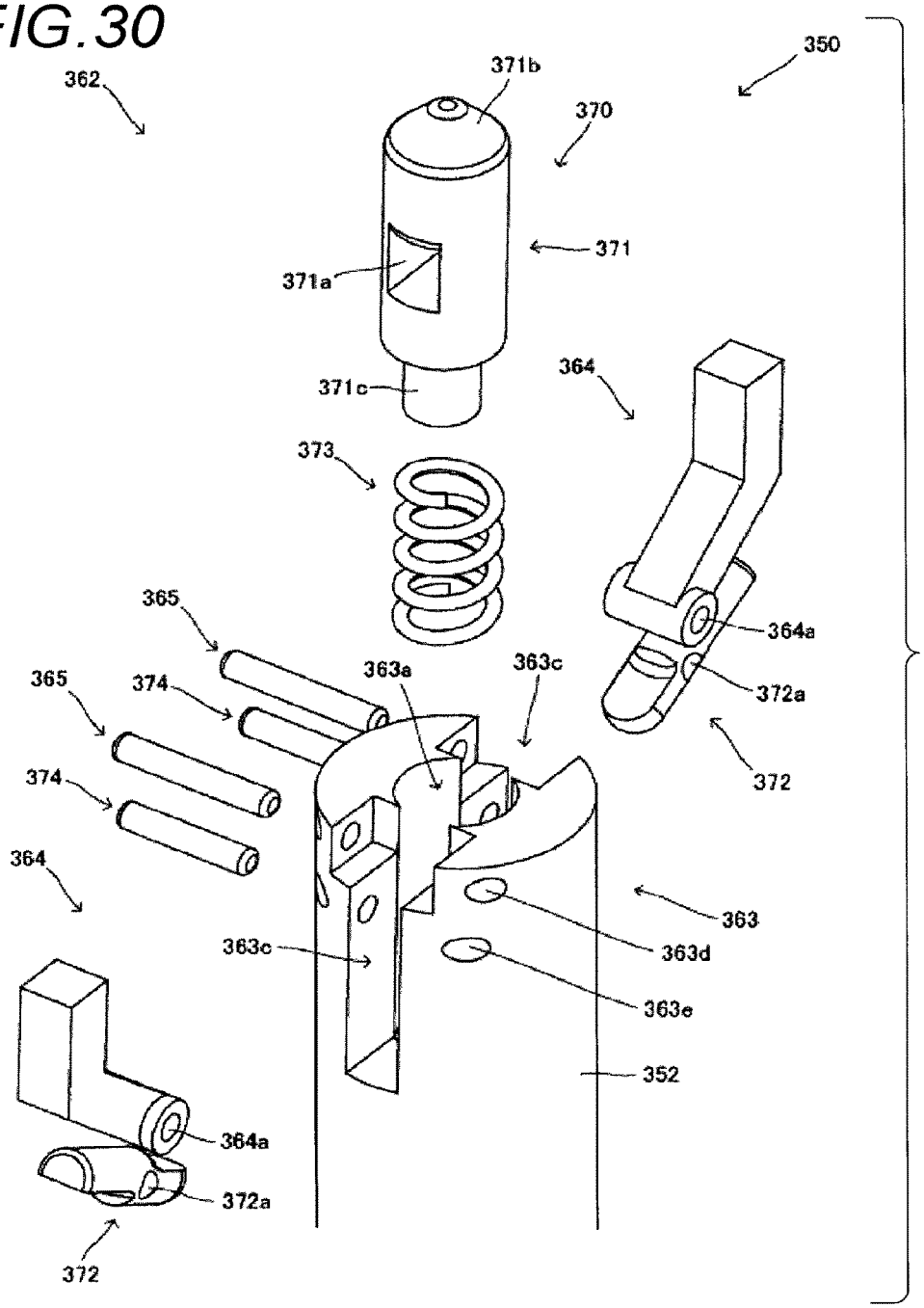
FIG. 30 is an enlarged exploded perspective view of a part of the shaft member 350.
Figure 31A:
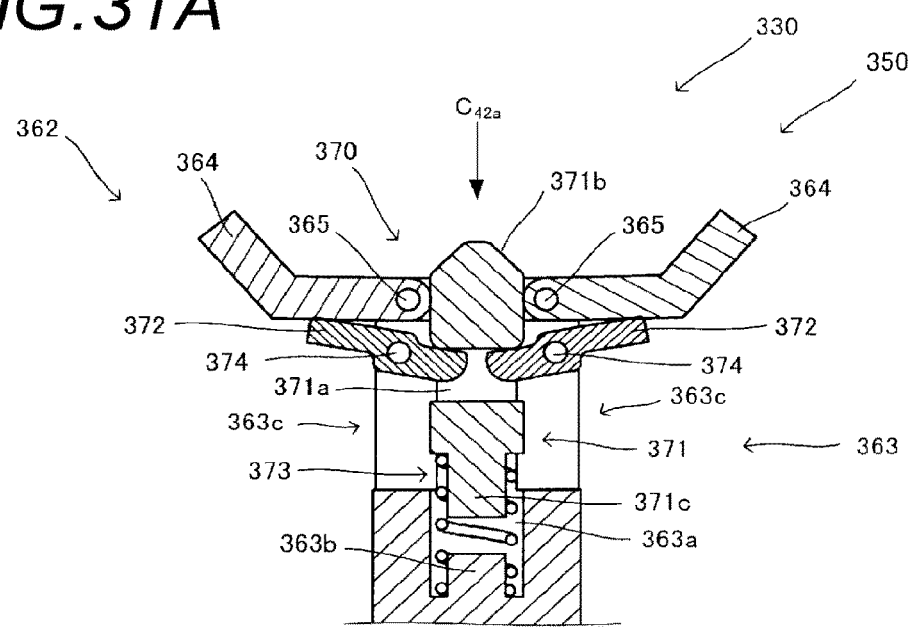
FIG. 31A is a sectional view of an end member 330.
Figure 31B:
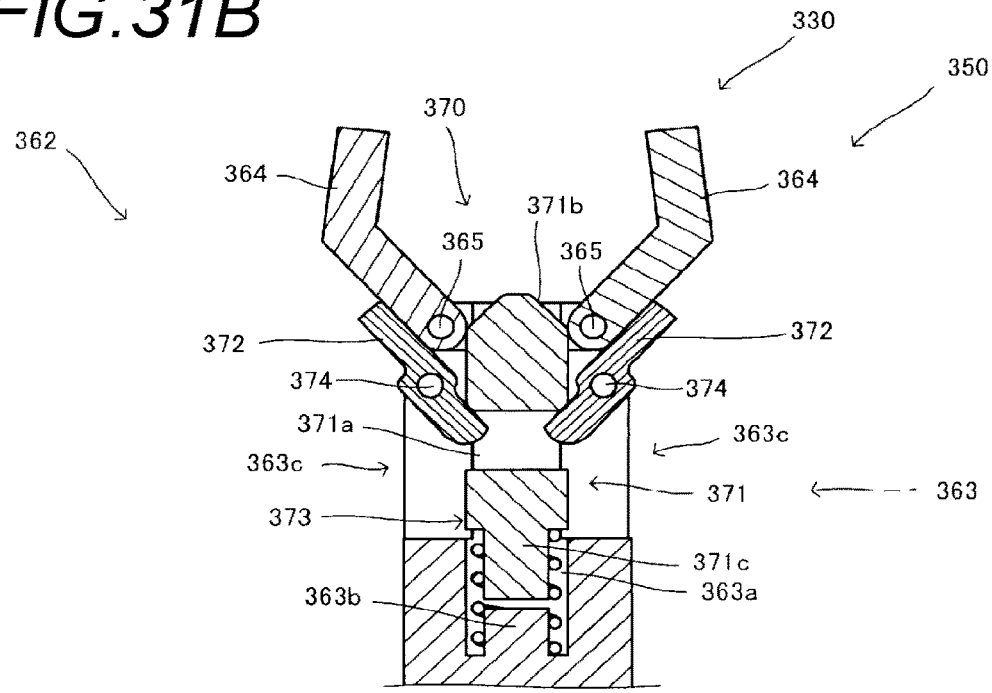
FIG. 31B is a sectional view of a posture in which the end member 330 is deformed.

Next, a third aspect will be described. FIG. 29 is a perspective view of a shaft member 350 in the end member of the aspect, and FIG. 30 is an exploded perspective view of a tip end part at which a regulating member 370 in the shaft member 350 is disposed. FIGS. 31A and 31B illustrate a tip end part at which the regulating member 370 is disposed on a section taken along the axis of the shaft member 350. FIG. 31A illustrates one posture of the regulating member 370, and FIG. 31B illustrates another posture of the regulating member 370. The end member of the aspect is provided with the bearing member 140 which is the same aspect as the above-described end member 230, and the shaft member 350 is held by the bearing member 140. Here, the shaft member 350 will be described.

As can be ascertained from FIG. 29, the shaft member 350 is configured to include a rotating shaft 351, a rotating force receiving member 362, a regulating member 370, and a rotating shaft elastic member 376. Here, the rotating shaft elastic member 376 of the aspect is a helical spring.

The rotating shaft 351 is a member which transmits the rotating force from the rotating force receiving member 362 to the bearing member 140, and as can be ascertained from FIG. 29, the rotating shaft 351 includes a cylindrical first rotating shaft 352 and a columnar second rotating shaft 353 of which an outer diameter is smaller than that of the first rotating shaft 352, and has a structure in which the two rotating shafts are coaxially aligned and one ends thereof are linked to each other.

In the first rotating shaft 352, on a side surface in the end portion on a side linked to the second rotating shaft 353, two projections 352a are disposed. The two projections 352a are provided on the same line in one diameter direction of the cylinder of the first rotating shaft 352.

In addition, in the second rotating shaft 353, on a side surface in the end portion on a side opposite to the side linked to the first rotating shaft 352, two projections 353a are disposed. The two projections 353a are provided on the same line in one diameter direction of the column of the second rotating shaft 353.

The rotating force receiving member 362 is a member which receives the rotation driving force from the apparatus body 2 (refer to FIG. 1) and transmits the driving force to the rotating shaft 351 when the end member of the aspect is in a predetermined posture. The rotating force receiving member 362 in the aspect is configured to be disposed in the end portion on one side (a side opposite to a side to which the second rotating shaft 353 is linked) in the first rotating shaft 352 of the rotating shaft 351, and to include a base portion 363, an engaging member 364, and a pin 365.

The base portion 363 is a part linking the engaging member 364 to the first rotating shaft 352 of the rotating shaft 351 via the pin 365, and is formed in the end portion on one side of the first rotating shaft 352 in the aspect, and a part (tip end portion) of the first rotating shaft 352 functions as the base portion 363.

In the base portion 363, a through-hole 363a is formed along the axis from the end surface on one side of the first rotating shaft 352, and as can be ascertained from FIGS. 31A and 31B, a projection 363b is provided in a bottom portion thereof. In addition, in the base portion 363, two slits 363c which regard a direction along the axial direction from the end surface on one side of the first rotating shaft 352 as a length direction, and have a depth by which the side surface of the first rotating shaft 352 and the through-hole 363a communicate with each other, are formed. The two slits 363c in the aspect are disposed at a position of 180° around the axis to be on one diameter of the first rotating shaft 352.

Furthermore, in the base portion 363, holes 363d and 363e which extend in a width direction of the slit 363c and penetrate the base portion 363 are formed. The hole 363d and the hole 363e are disposed to be aligned in the length direction of the slit 363c, and the hole 363d is on a side close to the end portion on one side of the first rotating shaft 352.

The engaging member 364 is a rod-like member, and is bent at one location in the aspect. In addition, in the one end portion, a through-hole 364a orthogonal in a direction in which the engaging member 364 extends is provided.

The pin 365 is a round rod-like member.

The regulating member 370 is configured to include a regulating shaft 371, an operating portion 372, a regulating member elastic member 373, and a pin 374.

The regulating shaft 371 is a columnar member, and an outer shape thereof has a size that can be inserted into the inner side of the through-hole 363a provided in the base portion 363. In addition, a slit 371a which penetrates the regulating shaft 371 in the diameter direction and extends by a predetermined size in the axial direction is formed in the regulating shaft 371. Among the end portions of the regulating shaft 371, the end portion on the side that is not inserted into the base portion 363 is a conical part (truncated conical), and an inclined surface 371b is formed. In addition, among the end portions of the regulating shaft 371, a projection 371c is provided on a side opposite to the inclined surface 371b.

The operating portion 372 is a rod-like member, and two operating portions 372 are disposed similarly to the engaging member 364. The operating portion 372 is provided with a through-hole 372a orthogonal to the length direction in the vicinity of the center in the length direction.

In the aspect, the regulating member elastic member 373 is formed by a coiled spring. In addition, the pin 374 is a round rod-like member.

By combining each of the above-described members with each other as follows, the end member of the aspect is made. In addition, by describing the combination, the size of each member and part, the structure, or the relationship of the sizes of the members and parts, are further understood.

The regulating member elastic member 373 is inserted into the inner side of the through-hole 363a formed in the base portion 363, and further, the end portion on a side on which the projection 371c is provided in the regulating shaft 371 of the regulating member 370, is also inserted. One end of the regulating member elastic member 373 is inserted and fixed to the projection 363b in the recessed portion, and the other end of the regulating member elastic member 373 is inserted and fixed to the projection 371c of the regulating shaft 371. Accordingly, the regulating shaft 371 is biased in the direction of falling out from the rotating shaft 351 by the biasing force of the regulating member elastic member 373.

As can be ascertained from FIG. 31A, one end side of the operating portion 372 is inserted into the slit 371a of the regulating shaft 371 from the slit 363c. In addition, the pin 374 is disposed to pass through the hole 363e and the through-hole 372a. Accordingly, the operating portion 372 can rotate around the pin 374. At this time, in a posture in which no external force is applied, the operating portion 372 is disposed to extend in the direction orthogonal to the axis of the regulating shaft 371.

Meanwhile, one end side of the engaging member 364 is disposed in the slit 371a, and the pin 365 is disposed to pass through the hole 363d and the through-hole 364a. Accordingly, the engaging member 364 can rotate around the pin 365. At this time, in a posture in which no external force is applied, the engaging member 364 extends in the direction orthogonal to the axis of the regulating shaft 371, and is positioned to overlap further the tip end side of the regulating shaft 371 than the operating portion 372. In addition, the engaging member 364 is disposed to come into contact with the tip end on the side that is not inserted into the slit 371a in the operating portion 372.

In addition, the attachment of the shaft member 350 to the bearing member 140 can be performed similarly to an end member 330. Accordingly, the shaft member 350 can move in the axial direction of the bearing member 140.

The end member 330 combined as described above can obtain an aspect illustrated in FIG. 31A as one posture. In other words, the engaging member 364 is in a posture in which the engaging member 356 is disposed to go across extending in the radial direction of the rotating shaft 351.

Meanwhile, as illustrated by $C_{42a}$ in FIG. 31A, when pressing the regulating shaft 371 of the regulating member 370 to the bearing member 140 side (lower part of the paper surface of FIG. 29), the regulating shaft 371 moves to the bearing member 140 side, and the end portion inserted into the slit 371a of the regulating shaft 371 in the operating portion 372 is also pressed in the same direction. Then, since the operating portion 372 rotates around the pin 374, and the end portion on the opposite side moves to the side opposite to the bearing member 140. Accordingly, since the end portion on the opposite side presses the engaging member 364, and the engaging member 364 rotates around a pin 355, as illustrated in FIG. 31B, the engaging member 364 rises up to be close to be parallel to the axial direction.

In other words, the end member 330 can also switch a posture (protruding posture) in which the engaging member 364 stands and a posture (caved posture) in which the engaging member 364 is tilted. Accordingly, the end member 330 can also similarly act similar to the example of the end member 230.

In the aspect, an example in which one type of operating portion directly presses the engaging member is illustrated, but not being limited thereto, an aspect in which the members are interlocked with each other via plural types of operating portions, and finally, the operating portion which is the closest to the engaging member presses the engaging member, may be employed. In addition, the operating portion and the engaging member may be integrated with each other without being distinguished.

Figure 32:
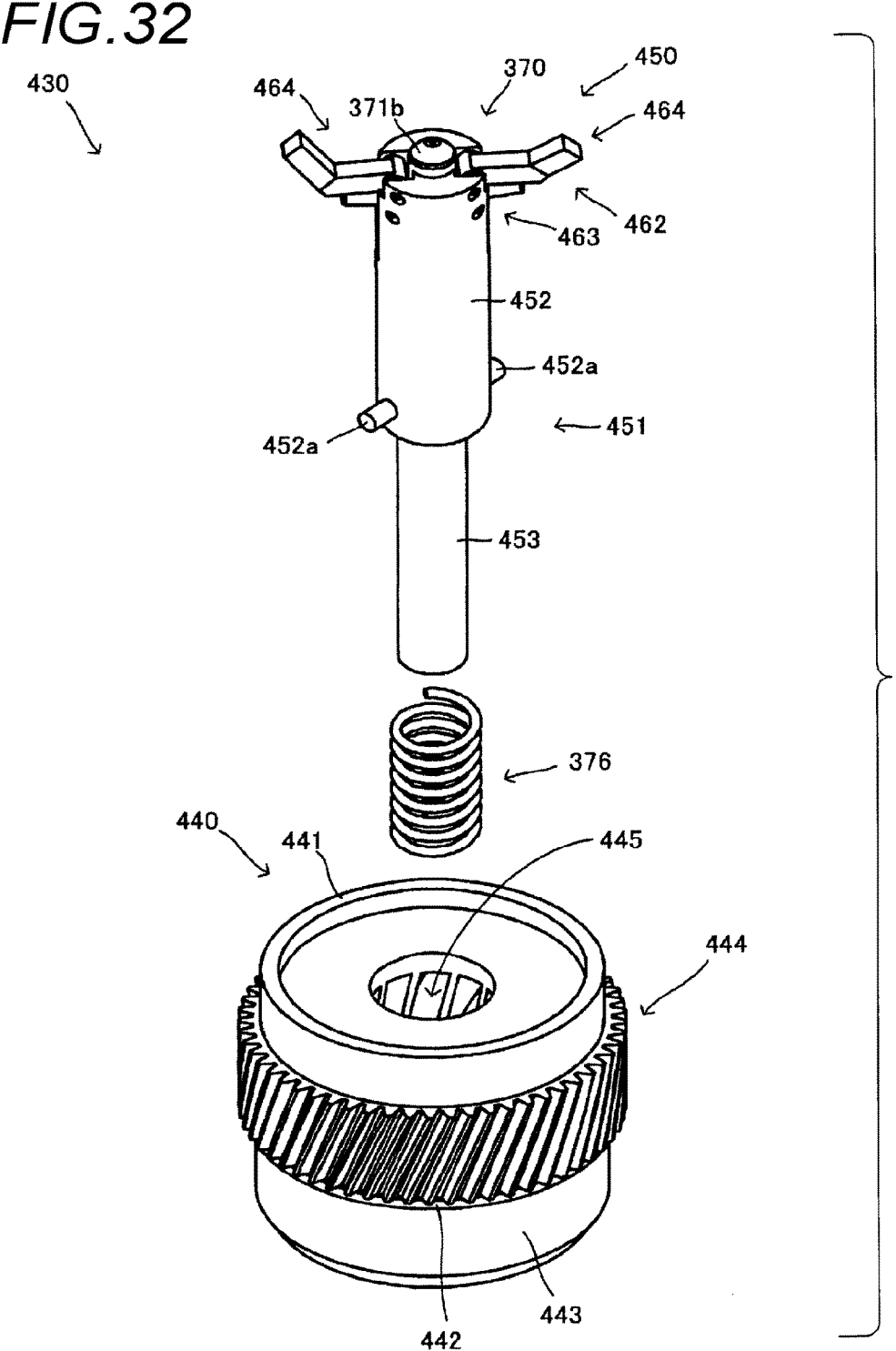
FIG. 32 is an exploded perspective view of an end member 430.

Next, a fourth aspect will be described. FIG. 32 is an exploded perspective view of an end member 430 included in the fourth aspect. Since the fourth aspect is similar to the first aspect except for the end member 430, the description thereof will be omitted here. The end member 430 is also configured to include a bearing member 440 and a shaft member 450.

Figure 34A:
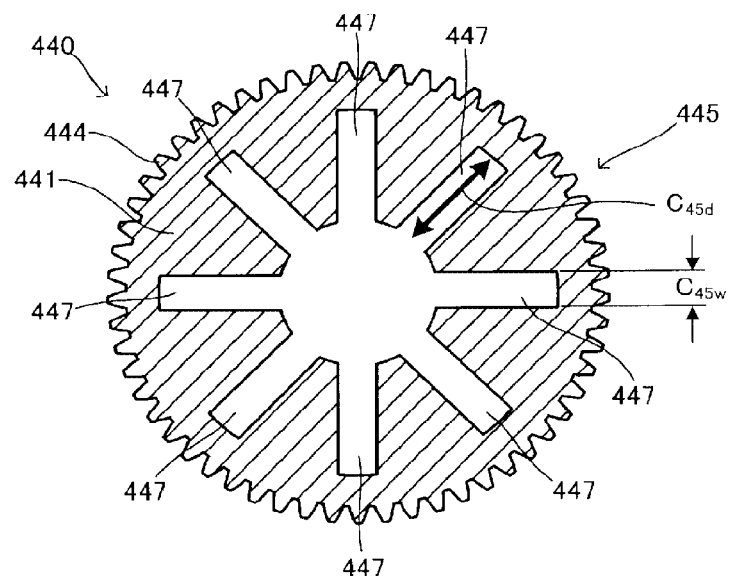
FIG. 34A is a sectional view in a direction perpendicular to an axis of the bearing member 440.
Figure 34B:
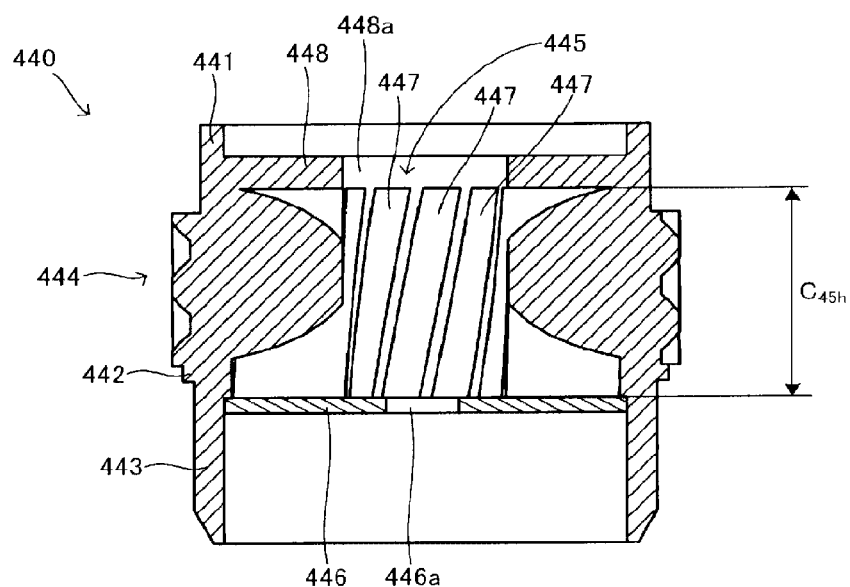
FIG. 34B is a sectional view in a direction along the axis of the bearing member 440.

The bearing member 440 is a member which is bonded to the end portion of the photosensitive drum 11 in the end member 430. FIG. 33A is a perspective view of the bearing member 440, FIG. 33B is a front view of the bearing member 440, and FIG. 33C is a plan view when viewed from a side on which the shaft member 450 is disposed, in the bearing member 440. Furthermore, FIG. 34A is an end surface view along line illustrated by $C_{45a}$-$C_{45a}$ in FIG. 33B. In other words, FIG. 34A illustrates a surface orthogonal to the axis of the bearing member 440, and an end surface when cutting the bearing member 440. FIG. 34B is a sectional view along line illustrated by $C_{45b}$-$C_{45b}$ in FIG. 33C. In other words, FIG. 34B is a sectional view of the bearing member 440 in the direction along the axis including the axis of the bearing member 440.

The bearing member 440 is configured to include a tubular body 441, a contact wall 442, a fitting portion 443, a gear portion 444, and a shaft member holding portion 445.

The tubular body 441 is a cylindrical member as a whole, the contact wall 442 and the gear portion 444 are disposed on the outer side thereof, and the shaft member holding portion 445 is formed on the inner side thereof. In addition, regarding a part provided with at least the shaft member holding portion 445 on the inner side of the tubular body 441, an inner diameter of the tubular body 441 is formed to be substantially the same as an outer diameter of a first rotating shaft 452 to the extent that the first rotating shaft 452 of a rotating shaft 451 of the shaft member 450 which will be described later can smoothly move in the axial direction and can rotate around the axis.

The contact wall 442 which comes into contact with and is locked to the end surface of the photosensitive drum 11 stands from a part of the outer circumferential surface of the tubular body 441. Accordingly, in a posture in which the end member 430 is mounted on the photosensitive drum 11, the insertion depth of the end member 430 into the photosensitive drum 11 is regulated.

In addition, the fitting portion 443 of which one side is inserted into the inner side of the photosensitive drum 11 nipping the contact wall 442 of the tubular body 441, is achieved. The fitting portion 443 is inserted into the inner side of the photosensitive drum 11, and is fixed to the inner surface of the photosensitive drum 11 by an adhesive. Accordingly, the end member 430 is fixed to the end portion of the photosensitive drum 11. Therefore, the outer diameter of the fitting portion 443 is substantially the same as the inner diameter of the photosensitive drum 11 within a range that can be inserted into the inner side of the cylindrical shape of the photosensitive drum 11. A groove may be formed on the outer circumferential surface in the fitting portion 443. Accordingly, the groove is filled with the adhesive, and adhesiveness between the tubular body 441 (end member 430) and the photosensitive drum 11 is improved by an anchor effect or the like.

The gear portion 444 is formed on the outer circumferential surface of the tubular body 441 opposite to the fitting portion 443 nipping the contact wall 442. The gear portion 444 is a gear which transmits the rotating force to another member, such as the developing roller unit, and in the aspect, a helical gear is disposed. However, the type of the gear is not particularly limited, and a spur gear may be disposed, and both of the helical gear and the spur gear may be disposed to be aligned in the axial direction of the tubular body. In addition, it is not necessary to provide the gear.

The shaft member holding portion 445 is a part which is formed on the inner side of the tubular body 441, and has a function of holding the shaft member 450 in the bearing member 440 while ensuring a predetermined operation of the shaft member 450, and functions as one of means for moving and rotating a rotating force receiving member 462. The shaft member holding portion 445 includes a bottom plate 446, a spiral groove 447, and a lid 448.

As illustrated in FIG. 34B, the bottom plate 446 is an annular member and is disposed to block and partition the inner side of the tubular body 441. Therefore, a through-hole 446a is provided at the center thereof. A second rotating shaft 453 in the rotating shaft 451 is inserted into the through-hole 446a. The attachment of the bottom plate 446 to the tubular body 441 can be performed by adhering or welding. In addition, the tubular body 441 and the bottom plate 446 may be integrally formed.

As illustrated in FIG. 34B, the lid 448 is an annular member disposed at a predetermined interval in the axial direction with respect to the bottom plate 446, and is disposed to block and partition the inner side of the tubular body 441. Therefore, a through-hole 448a is provided at the center thereof. The first rotating shaft 452 in the rotating shaft 451 is inserted into the through-hole 448a. The spiral groove 447 is disposed between the bottom plate 446 and the lid 448. The attachment of the lid 448 to the tubular body 441 may be performed by being attachable and detachable by a claw or the like, or by fixing by adhering or welding. In addition, the tubular body 441 and the lid 448 may be integrally formed.

The spiral grooves 447 are a plurality of spiral grooves formed on the inner surface of the tubular body 441 and between the bottom plate 446 and the lid 448, and as illustrated by $C_{45d}$ in FIG. 34A, the depth direction is formed in a radial shape (radial direction) around the axis of the tubular body 441. Meanwhile, the longitudinal direction of the spiral groove 447 is the direction along the axis of the tubular body 41 as illustrated in FIG. 34B, and one end side and the other end side are twisted to be deviated in the direction along the inner circumference of the tubular body 41, and are formed in a spiral shape. In addition, as illustrated by $C_{45w}$ in FIG. 34A, the width direction of the spiral groove 447 is formed to be substantially the same as the diameter of a projection 452a to the extent that the end portion of the projection 452a of the shaft member 450 which will be described later is inserted, and the end portion of the projection 452a can smoothly move in the groove.

In addition, one end of the spiral groove 447 in the longitudinal direction is blocked by the bottom plate 446, and the other end in the longitudinal direction is blocked by the lid 448.

In addition, as a standard which illustrates the extent of twisting of the spiral groove 447, "torsion ratio" can be defined. In other words, the "torsion ratio" is defined from the distance (size illustrated by $C_{45h}$ in FIG. 34B) between the spiral grooves in the axial direction, and a total torsion angle which is an angle by which the spiral groove is twisted in the circumferential direction around the axis in the distance, and is expressed by the following equation.

Torsion ratio(°/mm)=total torsion angle(°)/distance between spiral grooves in axial direction(mm)

Furthermore, at least one group in which plural spiral grooves 447 face each other nipping the axis of the tubular body 41 is provided. In the aspect, an example in which four groups, that is, a total of eight spiral grooves 447 are formed, is employed, but one group, that is, two spiral grooves may be formed. Meanwhile, two, three, five or more groups of spiral grooves may be provided. When the spiral groove is injection-molded, the injection molding is performed by the releasing while rotating the mold after the injection of the material.

The material which configures the bearing member 440 is not particularly limited, but a resin, such as polyacetal, polycarbonate, or PPS, or metal can be used. Here, in order to improve the rigidity of the member in a case of using a resin, glass fibers or carbon fibers may be mixed into the resin in accordance with the load torque. In addition, in order to make the attachment or the movement of the shaft member smooth, sliding properties may be improved by containing at least one type of a fluororesin, polyethylene, and silicon rubber in the resin. In addition, the resin may be coated with fluororesin or lubricant.

In a case of making the member by metal, carving by cutting, aluminum die casting, zinc the casting, a metal powder injection molding method (so-called MIM method), or a metal powder sintering lamination method (so-called 3D printing), can be employed. In addition, regardless of the material of the metal, iron, stainless steel, aluminum, brass, copper, zinc, or an alloy of the materials, may be used. In addition, it is possible to improve functionality (lubrication properties or corrosion resistance) of the surface by performing various types of plating.

Returning to FIG. 32, the shaft member 450 will be described. As can be ascertained from FIG. 32, the shaft member 450 is configured to include the rotating shaft 451, the rotating force receiving member 462, the regulating member 370, and the rotating shaft elastic member 376. Here, the rotating shaft elastic member 376 of the aspect is a coiled spring. Here, since the regulating member 370 and the rotating shaft elastic member 376 are the same as that of the description above, the same reference numbers are given, and the description thereof will be omitted.

Similar to the above-described rotating force receiving member 362, the rotating force receiving member 462 is a member which receives the rotation driving force from the apparatus body 2 (refer to FIG. 1) and transmits the driving force to the rotating shaft 451 when the end member of the aspect is in a predetermined posture. The rotating force receiving member 462 in the aspect is configured to be disposed in the end portion on one side (a side opposite to a side to which the second rotating shaft 453 is linked) in the first rotating shaft 452 of the rotating shaft 451, and to include a base portion 463, an engaging member 464, and a pin 465. Here, since the base portion 463 and the pin 465 are the same as the base portion 363 and the pin 365 of the above-described aspect, the description thereof will be omitted here.

The engaging member 464 is a rod-like member, and is bent at one location in the aspect, and a tapered part is provided to have a shape of a hook. In addition, in one end portion, a through-hole 464a orthogonal to a direction in which the engaging member 464 extends is provided. The through-hole 464a is similar to the through-hole 363a in the above-described aspect.

By providing a hook-like tapered part in the engaging member 464, as will be described later with reference to FIG. 38, it is possible to generate a pulling force (pulling-in force P) to move the shaft member 450 in the direction illustrated by an arrow $C_{49c}$ in FIG. 38, and to achieve stable rotation.

The rotating shaft 451 is a member which transmits the rotating force from the rotating force receiving member 462 to the bearing member 440, and as can be ascertained from FIG. 32, the rotating shaft 451 includes the cylindrical first rotating shaft 452 and the columnar second rotating shaft 453 having a smaller outer diameter than that of the first rotating shaft 452, and has a structure in which the two rotating shafts are coaxially aligned and one ends are linked to each other.

In the first rotating shaft 452, on the side surface of the end portion on a side linked to the second rotating shaft 453, two projections 452a are disposed. Two projections 452a are provided on the same line in one diameter direction of the cylinder of the first rotating shaft 452.

Figure 35:
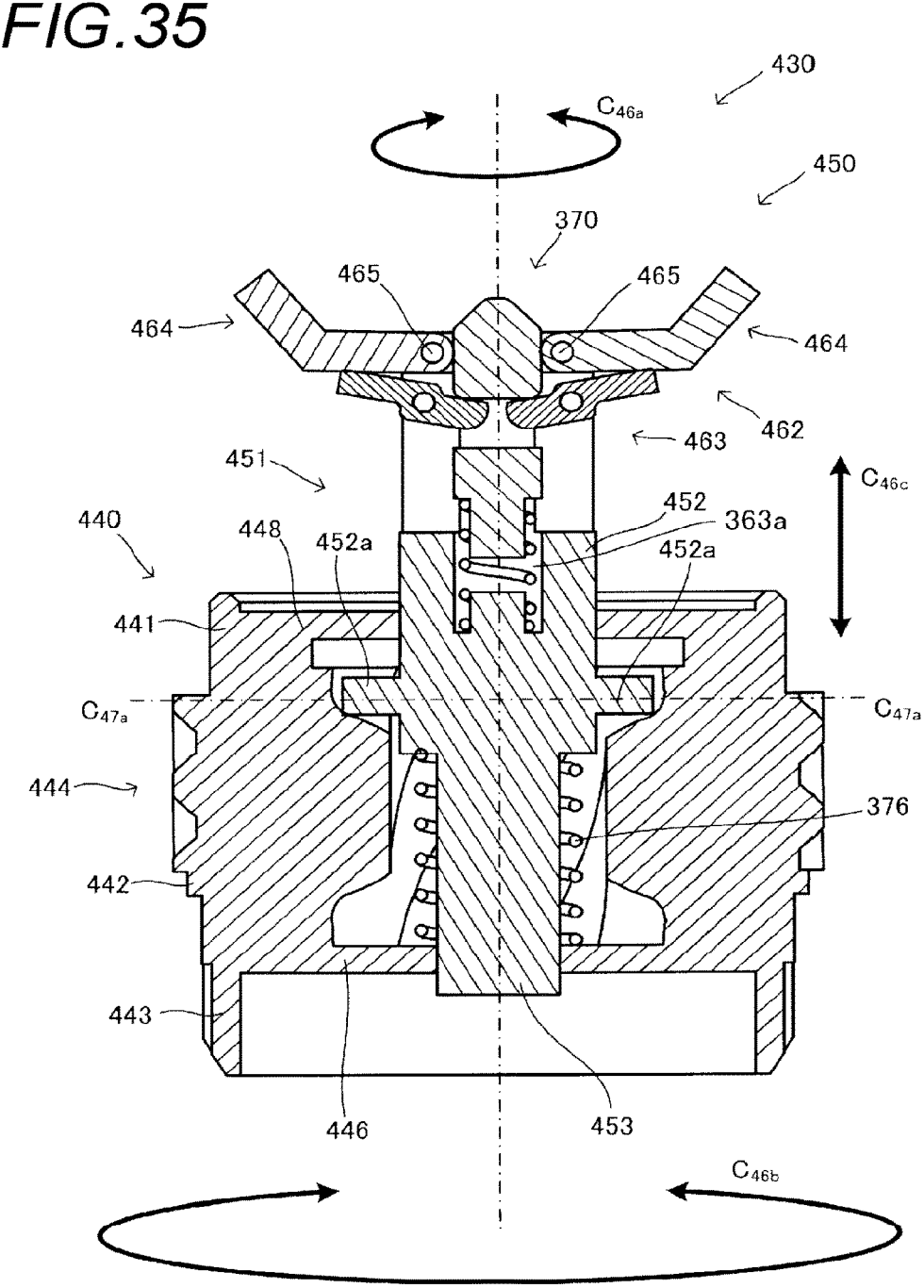
FIG. 35 is a sectional view of the end member 430.
Figure 36A:
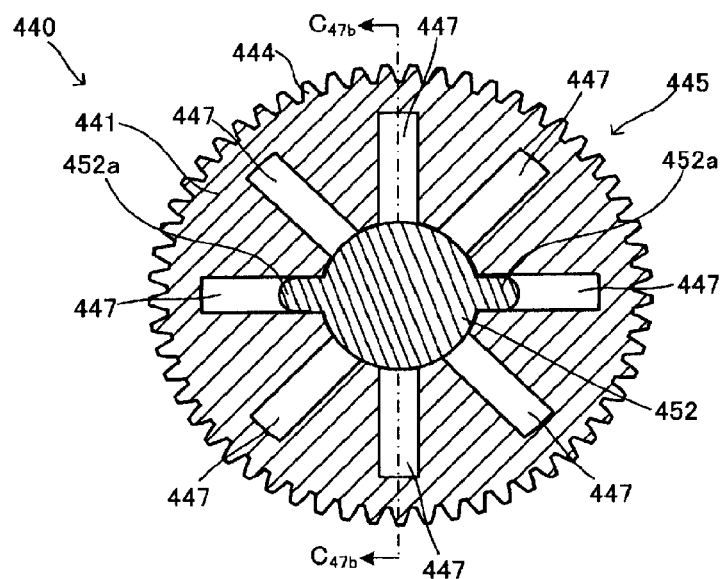
FIG. 36A is a sectional view in a direction perpendicular to the axis of the end member 430.
Figure 36B:
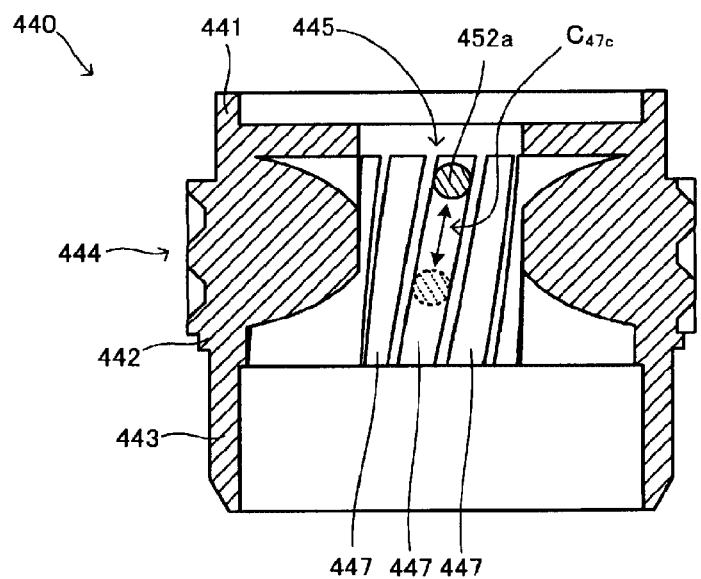
FIG. 36B is a sectional view in a direction along the axis of the end member 430.

By combining the bearing member 440 and the shaft member 450 with each other as follows, the end member 430 is made. In addition, by describing the combination, the size of each member and part, the structure, or the relationship of the sizes of the members and parts, are further understood. FIG. 35 is a sectional view along the axial direction of the end member 430. FIG. 36A is an end surface view of the end member 430 along line illustrated by $C_{47a}$-$C_{47a}$ in FIG. 35, and FIG. 36B is a sectional view of the end member 430 along line illustrated by $C_{47b}$-$C_{47b}$ in FIG. 36A. However, in FIG. 47B, only the projection 452a is illustrated regarding the shaft member 450 for making it easy to understand.

As can be ascertained from FIG. 35, in the rotating shaft 451, the second rotating shaft 453 is inserted toward the bottom plate 446 side of the shaft member holding portion 445 formed on the inner side of the bearing member 440, and passes through the through-hole 446a. In addition, the first rotating shaft 452 passes through the through-hole 448a of the lid 448. At this time, as illustrated in FIGS. 36A and 36B, the projection 452a which protrudes from the side surface of the rotating shaft 451 is inserted into the spiral groove 447 formed in the shaft member holding portion 445 of the bearing member 440.

In addition, as can be ascertained from FIG. 35, on the inner side of the bearing member 440, the second rotating shaft 453 passes through the inner side of the rotating shaft elastic member 376, and the rotating shaft elastic member 376 is disposed between the bottom plate 446 and the first rotating shaft 452. Therefore, one side of the rotating shaft elastic member 376 comes into contact with the first rotating shaft 452, and the other side comes into contact with the bottom plate 446. Accordingly, the rotating shaft elastic member 376 biases the rotating shaft 451, and the rotating shaft 451 is biased in the direction in which the rotating shaft 451 protrudes from the bearing member 440. However, since the projection 452a is inserted into the spiral groove 447 of the bearing member 440, and both ends of the spiral groove 447 are blocked by the bottom plate 446 and the lid 448, the rotating shaft 451 is held in a state of being biased without being shifted from the bearing member 440.

Above, in a posture in which each of the members is combined, the axes of the bearing member 440 and the rotating shaft 451 are identical to each other.

Figure 37:
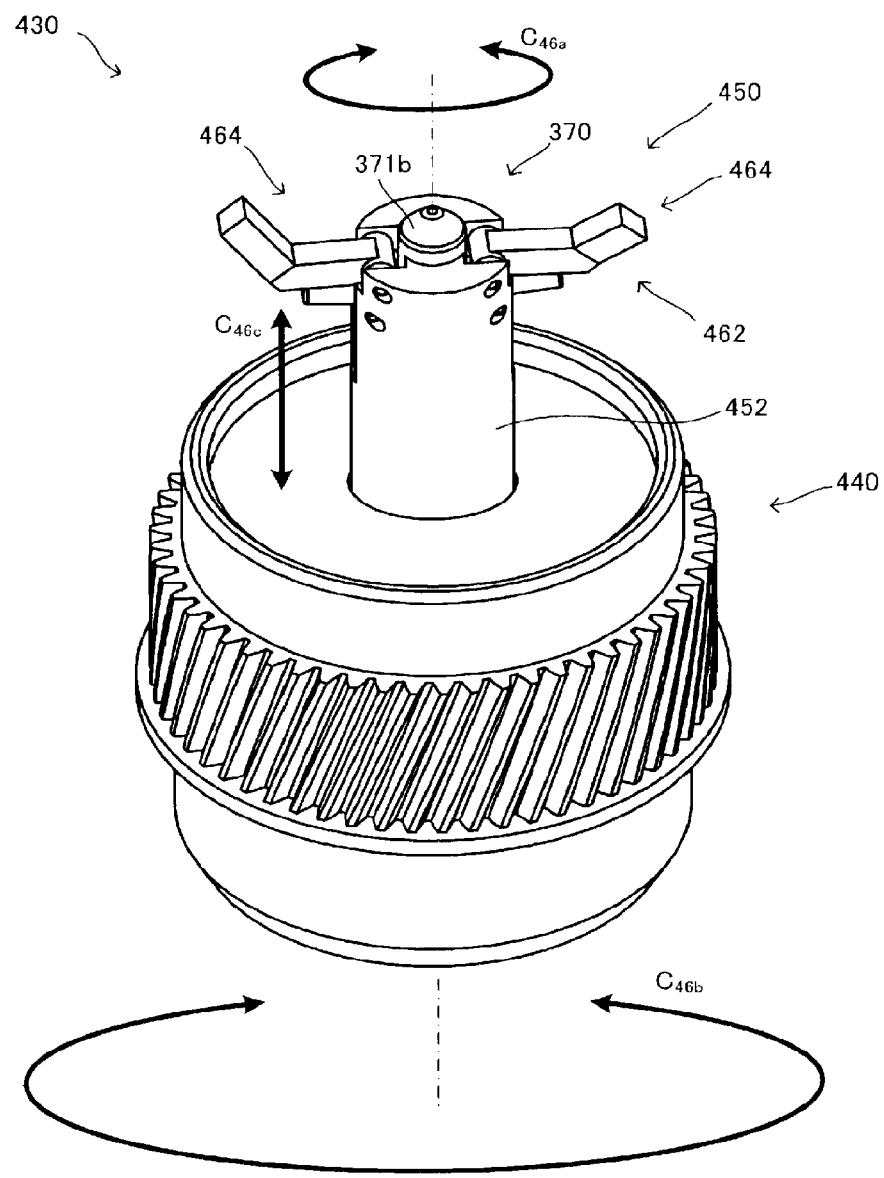
FIG. 37 is a perspective view of the end member 430.

Next, how the end member 430 can be deformed, move, and rotate, will be described. FIG. 37 illustrates a perspective view in one posture of the end member 430.

In postures illustrated in FIGS. 35 to 37, the entire shaft member 450 is in a posture of protruding the most from the bearing member 440 within a possible range, by the rotating shaft elastic member 376. When no external force is applied to the shaft member 450, the end member 430 is in this posture.

In addition, since the rotating force receiving member 462 and the regulating member 370 are operated as described above with reference to FIGS. 31A and 31B, the description thereof will be omitted. In addition, here, a case where the rotating force receiving member 462 and the regulating member 370 are in a posture of FIG. 31A is described as an example, but a case where the rotating force receiving member 462 and the regulating member 370 are in a posture of FIG. 31B also similarly acts.

In postures (the rotating force receiving member 462 and the regulating member 370 are in a posture of FIG. 31A) illustrated in FIGS. 35 and 37, when the rotating force around the axis is applied to the rotating shaft 451 via the rotating force receiving member 462 as illustrated by an arrow $C_{46a}$ in FIGS. 35 and 37, the projection 452a also rotates in accordance with the rotating force. Then, first, the projection 452a presses the side wall of the spiral groove 447, the rotation is transmitted to the bearing member 440, and as illustrated by an arrow $C_{46b}$ in FIGS. 35 and 37, the bearing member 440 rotates. Accordingly, the photosensitive drum 11 attached to the bearing member 440 also rotates around the axis. Secondly, since the projection 452a is inserted into the spiral groove 447, when the rotating shaft 451 rotates, the projection 452a also moves in the axial direction as illustrated by an arrow $C_{47c}$ in FIG. 36B. Accordingly, the rotating shaft 451 to which the projection 452a is attached and the rotating force receiving member 462 and the regulating member 370 which are attached thereto also move against the biasing force of the rotating shaft elastic member 376 as illustrated by an arrow $C_{46c}$ in FIGS. 35 and 37 or in the biasing direction.

Therefore, in the end member 430, by the rotation of the rotating force receiving member 462, the rotation around the axis of the end member 430 and the movement in the direction along the axis of the rotating shaft 451 are also possible.

In a posture in which the process cartridge 3 is mounted on the apparatus body 2, the driving shaft 70 and the rotating force receiving member 462 provided in the shaft member 450 of the end member 430 are engaged with each other, and the rotating force is transmitted. FIG. 38 illustrates a perspective view in a situation in which the rotating force receiving member 462 of the end member 430 is engaged with the driving shaft 70.

Figure 38:
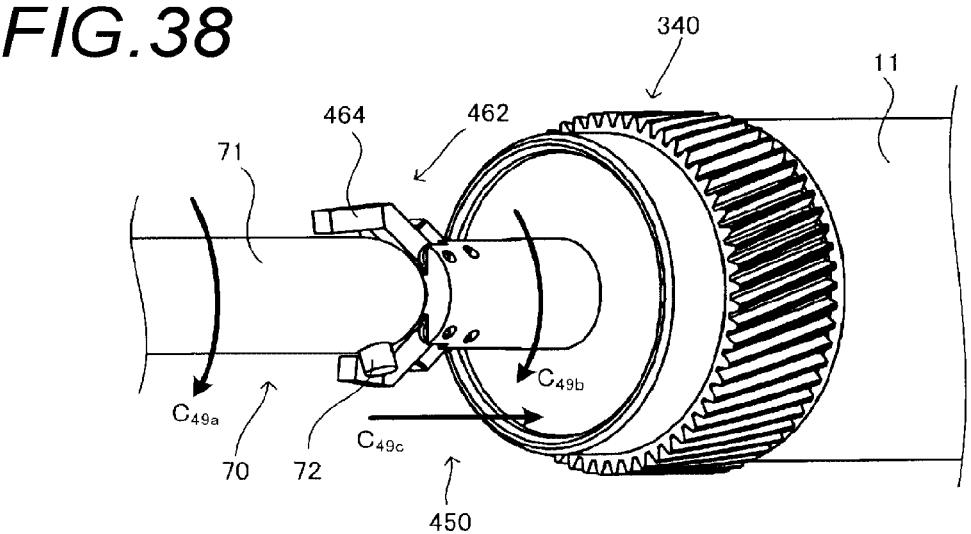
FIG. 38 is a perspective view illustrating a situation in which the end member 430 and the driving shaft 70 are engaged with each other.

As can be ascertained from FIG. 38, in a posture in which the driving shaft 70 and the rotating force receiving member 462 are engaged with each other, the axis of the driving shaft 70 and the axis of the shaft member 450 are disposed to abut against each other to be identical to each other. At this time, the rotating force transmitting projection 72 of the driving shaft 70 is engaged to be hooked from the side surface of two engaging members 464 of the rotating force receiving member 462.

In the posture, as illustrated by an arrow $C_{49a}$ in FIG. 38, when the driving shaft 70 rotates in the rotating force transmitting direction, the rotating force transmitting projection 72 is hooked to the engaging member 464, and as illustrated by an arrow $C_{49b}$ in FIG. 38, the rotating force is transmitted to the rotating shaft 451. At this time, the rotating shaft 451 moves in the direction illustrated by an arrow $C_{49c}$ in FIG. 38 by an action of the spiral groove 447 and the projection 452a of the bearing member 440. However, since the rotating force transmitting projection 72 of the driving shaft 70 is engaged with the engaging member 464 of the rotating force receiving member 462, the engagement of both of the members is not released and stable linking is maintained. A force which moves in the direction illustrated by an arrow $C_{49c}$ becomes a force of pulling in the driving shaft 70, and the force acts to achieve more stable rotation.

However, at this time, the pulling-in force by the spiral groove 447 is weaker than the force by which the engaging member 464 is engaged with the driving shaft 70. More specifically, it is preferable to configure as follows. In other words, it is preferable that the following established expression in a pulling-in force P by the engaging member, a biasing force Q of the rotating shaft elastic member, and a force R in the axial direction by the spiral groove, is the condition of the rotation driving.

$$R \leq P + Q$$

Here, P is a force which moves in the direction of approaching the driving shaft of the apparatus body during the driving rotation by the shape of the engaging member of the tip end member, Q is a force which is generated by the rotating shaft elastic member, and moves in the direction of approaching the driving shaft of the apparatus body, and R is a force which is generated by the spiral groove of the body during the rotation driving, and is moved in the direction of separating the rotating shaft from the driving shaft of the apparatus body.

Next, an example of operations of the driving shaft 70 and the photosensitive drum unit when the process cartridge including the end member 430 is mounted on the apparatus body 2 and is in a posture of FIG. 38, will be described. Description of a first example is illustrated in FIGS. 39A to 39C.

Figure 39A:
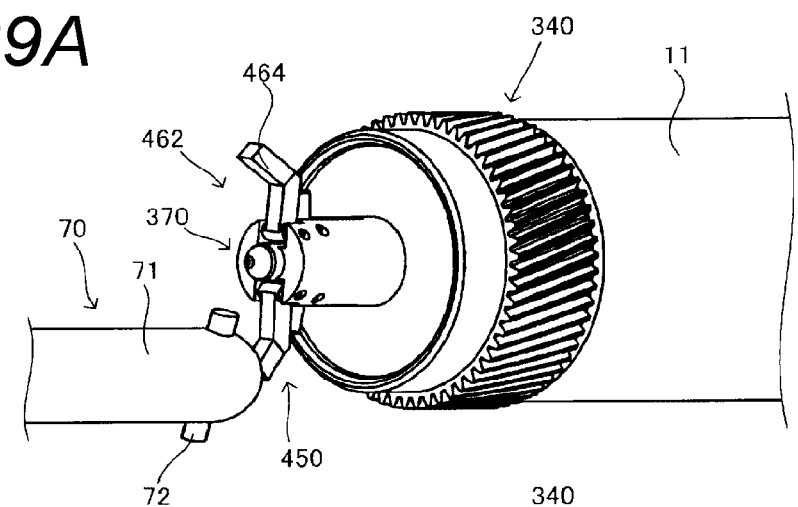
FIG. 39A is a perspective view illustrating a situation in which the driving shaft 70 and the photosensitive drum unit are engaged with each other.
Figure 39B:
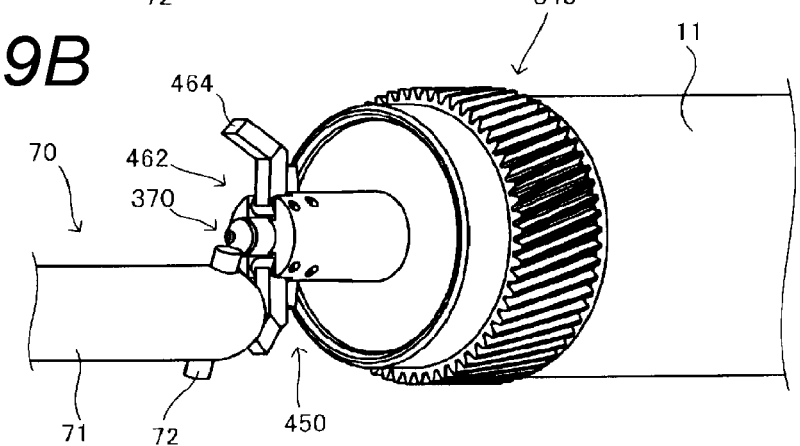
FIG. 39B is a perspective view illustrating another situation in which the driving shaft 70 and the photosensitive drum unit are engaged with each other.
Figure 39C:
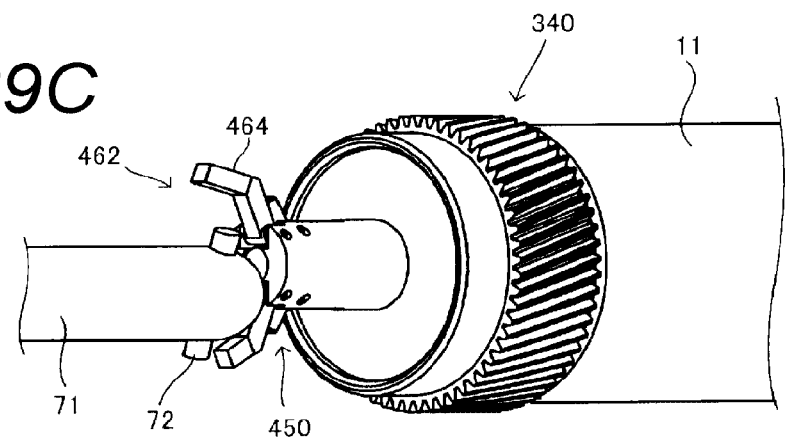
FIG. 39C is a perspective view illustrating still another situation in which the driving shaft 70 and the photosensitive drum unit are engaged with each other.

Regarding the first example, FIGS. 39A to 39C are perspective views following the order of a process in which the driving shaft 70 is engaged with the rotating force receiving member 462. In the example, an example in which the driving shaft 70 comes into contact with the engaging member 464 before the driving shaft 70 presses the regulating shaft 371 of the regulating member 370, is described.

First, from the direction orthogonal to the axial direction of the driving shaft 70 as illustrated in FIG. 39B from the state illustrated in FIG. 39A, the photosensitive drum unit approaches. At this time, the end member 430 is oriented toward the driving shaft 70 side, the axis thereof has an orientation parallel to the axis of the driving shaft 70, and the photosensitive drum unit approaches the driving shaft 70 while moving in the direction orthogonal to the axis. At this time, the shaft member 450 is in a posture illustrated in FIG. 35.

In the example, as illustrated in FIG. 39B, the driving shaft 70 presses the engaging member 464 of the rotating force receiving member 462. Accordingly, the shaft member 450 moves to the bearing member 440 side. The rotation around the axis is also generated by an action of the spiral groove 447 by the movement. In addition, as can be ascertained from FIG. 39C, as the driving shaft 70 climbs over the one engaging member 464, a posture of FIG. 38 can be achieved.

In a case of the example, the engagement and disengagement of the driving shaft 70 and the rotating force receiving member 462 can be performed by tracing back the description.

In the above-described example, since an example in which the driving shaft 70 comes into contact with the engaging member 464 before the driving shaft 70 presses the regulating shaft 371 of the regulating member 370, is described, it is necessary that the driving shaft 70 climbs over the engaging member 464. Meanwhile, as a second example, an example in which the driving shaft 70 does not come into contact with the engaging member 464 (including a slight contact to the extent that does not interrupt the engagement) and the regulating shaft 371 is pressed, is described. In the case, as the driving shaft 70 presses the regulating shaft 371, the engaging member 464 rises up and is smoothly engaged with the rotating force transmitting projection 72 of the driving shaft 70.

Figure 40A:
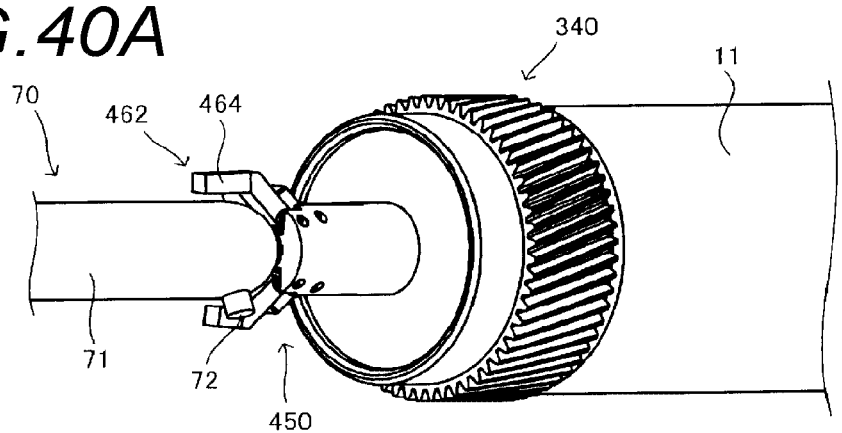
FIG. 40A is a perspective view illustrating a situation in which the driving shaft 70 and the photosensitive drum unit are engaged with each other.
Figure 40B:
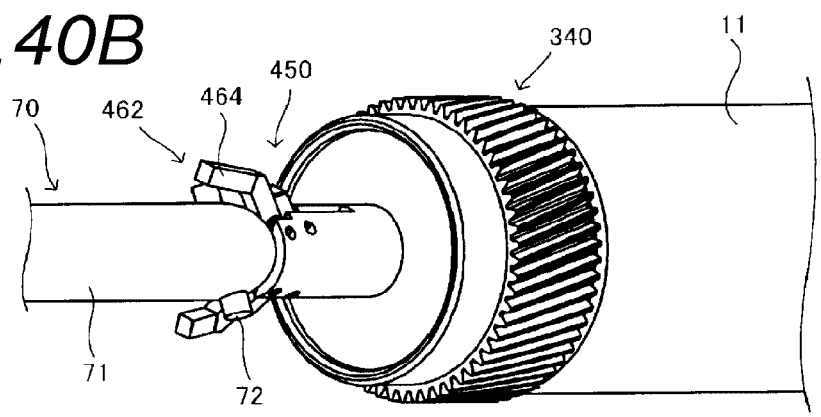
FIG. 40B is a perspective view illustrating another situation in which the driving shaft 70 and the photosensitive drum unit are engaged with each other.
Figure 40C:
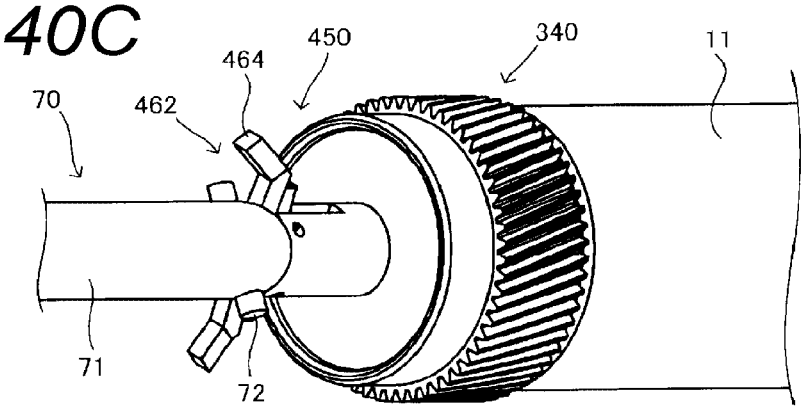
FIG. 40C is a perspective view illustrating still another situation in which the driving shaft 70 and the photosensitive drum unit are engaged with each other.

Meanwhile, when both of the driving shaft 70 and the rotating force receiving member 462 are disengaged from the posture in which the driving shaft 70 and the rotating force receiving member 462 are engaged with each other illustrated in FIG. 38, there is also a case where the disengagement is performed in the direction different from that of the first example. At this time, for example, the disengagement proceeds as follows. FIG. 40 is a view for the description. FIGS. 40A to 40C illustrate perspective views following an order of a process in which the rotating force receiving member 462 is disengaged from the driving shaft 70.

In the example, when the photosensitive drum unit is disengaged from the driving shaft from the posture illustrated in FIG. 38, as illustrated in FIG. 40A, the rotating force transmitting projection 72 of the driving shaft 70 is hooked to the engaging member 464. In this case, as illustrated in FIG. 40B, the rotating shaft 451 rotates around the axis by the hooked state. Then, the rotating shaft 451 moves along the axial direction to the bearing member 440 side by the action of the spiral groove 447. In addition, as the regulating member 370 is disengaged from the shaft portion 71 of the driving shaft 70, the force of pressing the regulating shaft 371 of the regulating member 370 is also released, and the engaging member 464 is deformed to a posture illustrated in FIG. 35. Accordingly, the engagement of the rotating force transmitting projection 72 and the engaging member 364 is released, and as illustrated in FIG. 40C, both of the rotating force transmitting projection 72 and the engaging member 364 can be disengaged from each other.

As described above, according to the aspect, the engagement and disengagement of the driving shaft and the photosensitive drum unit are more smoothly performed.

Figure 41A:
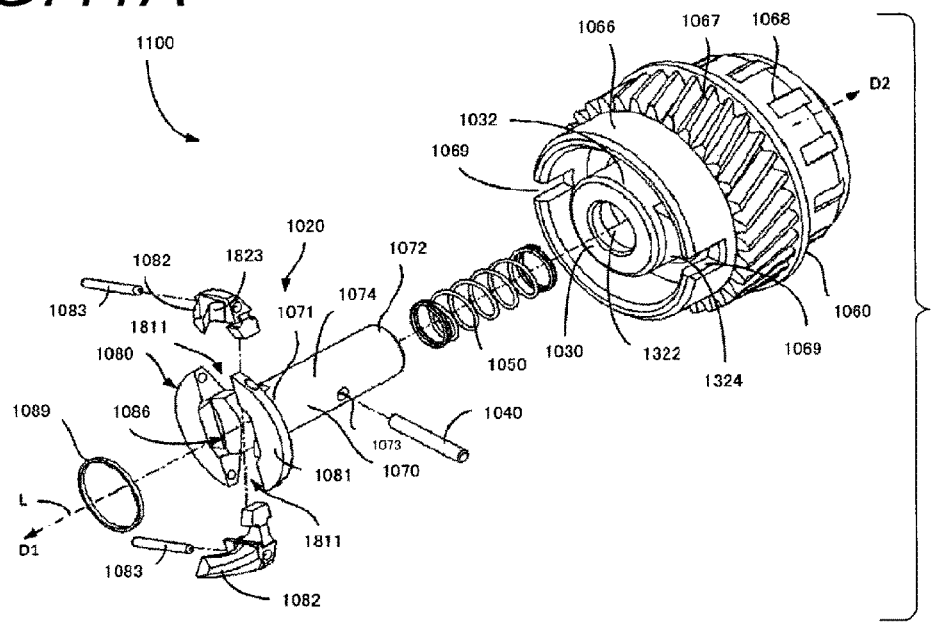
FIG. 41A is an exploded perspective view illustrating one aspect of a transmission apparatus (end member) used in the photosensitive drum unit.
Figure 41B:
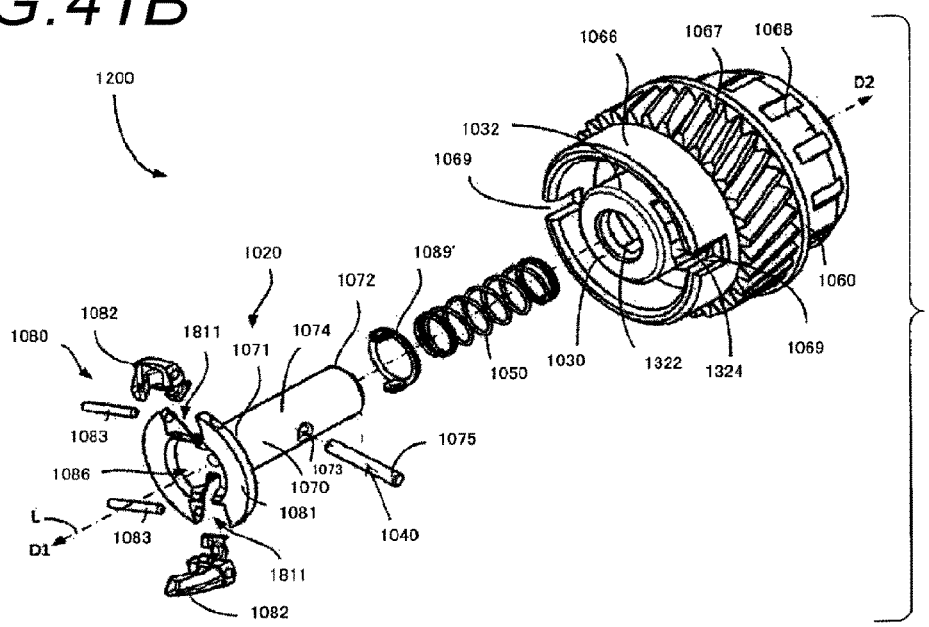
FIG. 41B is an exploded perspective view illustrating another aspect of the transmission apparatus used in the photosensitive drum unit.

FIG. 41A illustrates one aspect of a transmission apparatus 1100 which functions as an end member. The transmission apparatus 1100 includes a transmission unit 1020 which functions as a shaft member, an intermediate member 1030, a gear member (outline) 1060 which functions as a bearing member, a shaft 1070 which functions as a rotating shaft, an engaging structure 1080 which functions as a rotating force receiving member, and an engaging block 1082 which functions as an engaging member. FIG. 41B illustrates a transmission apparatus 1200 which is another aspect of the transmission apparatus. The transmission apparatus 1200 is basically the same as the transmission apparatus 1100 of FIG. 41A, but the shape of an elastic ring (an elastic member and a holding member) 1089 used in the transmission apparatus 1100 and the shape of an elastic ring (an elastic member and a holding member) 1089' which is used in the transmission apparatus 1200 are different from each other.

The transmission unit 1020 includes the shaft 1070 and the engaging structure 1080. The shaft 1070 includes a cylindrical shaft body 1074 and at least one projection 1075 which extends along the radial direction of the cylindrical shaft body 1074. The shaft body 1074 is a long component which extends along a drum axis L, and includes a first end portion 1071 which faces a first direction D1, a second end portion 1072 which faces a second direction D2 opposite to the first direction D1, and an opening 1073 which penetrates the body portion of the shaft body 1074 along the radial direction of the shaft body 1074. In one aspect, a pin 1040 is inserted into the opening 1073 during the assembly. The projection 1075 which is a part of the pin 1040 protrudes from the opening 1073.

The engaging structure 1080 includes a base portion 1081 which is integrated with the first end portion 1071 of the shaft 1070 and extends from the first end portion 1071, and a receiving portion 1811 which is cut out in the base portion 1081.

The engaging structure 1080 also includes two engaging blocks 1082 which function as engaging members. In the aspect, the engaging block 1082 has an L shape. The engaging blocks (for example, a linear shape, a U shape, a C shape, or a J shape) having other types or shapes can also be employed in embedding the present invention. The engaging block 1082 includes an engaging recessed surface 1823, is received by the cut-out receiving portion 1811, and is fixed to the base portion 1081 to be rotatable by the two pins 1083. In addition, by the two engaging blocks 1082, a receiving space 1086 for receiving a driving member (driving mechanism) of the image forming apparatus therebetween is formed.

The transmission apparatuses 1100 and 1200 including the transmission unit 1020 further include the intermediate member 1030, the gear member (outline) 1060, and an elastic member 1050.

The intermediate member 1030 includes a body 1032, a shaft hole 1322 which penetrates the body 1032 along the drum axis L, and two guiding grooves 1324 which communicate with the shaft hole 1322 formed in the body 1032. In the drawing, only one of the guiding grooves 1324 is illustrated, and one more guiding groove 1324 is disposed on a side opposite to the guiding groove 1324 which is illustrated.

The gear member 1060 is configured to be engaged with the photosensitive drum, and includes an upper portion 1066, a gear portion 1067 which extends in the second direction D2 from the upper portion 1066 along the drum axis L, and a bottom portion 1068 which extends in the second direction D2 from the gear portion 1067 along the drum axis L, in the gear member 1060. In addition, the upper portion 1066 of the gear member 1060 may include at least one cutout portion 1069.

Figures 42A, 42B, 42C:
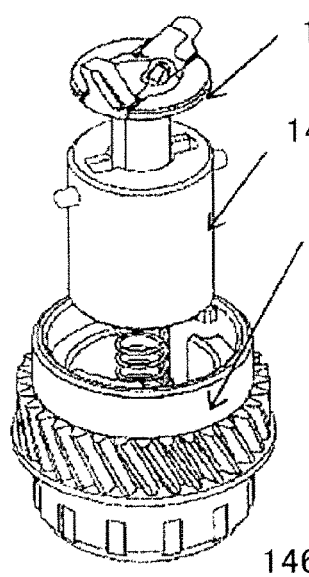
FIGS. 42A to 42C are views illustrating one aspect of the transmission apparatus and an assembly process thereof.
Figure 43A:
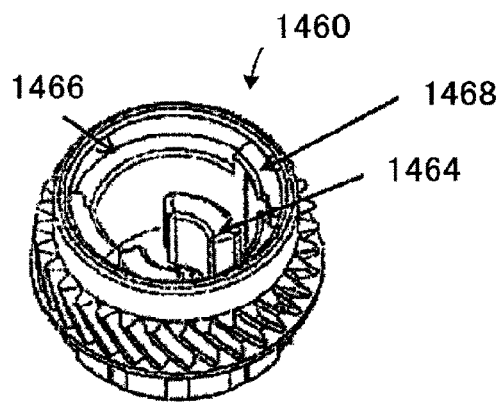
FIGS. 43A to 43D are views illustrating one aspect of a gear member used in the transmission apparatus.
Figure 43B:
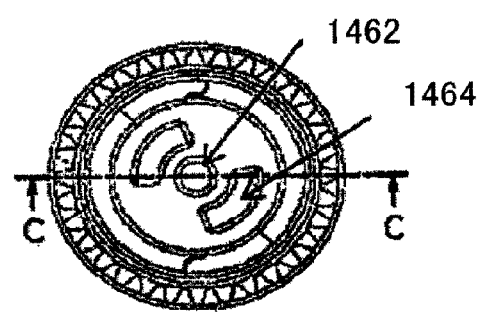
Figure 43C:
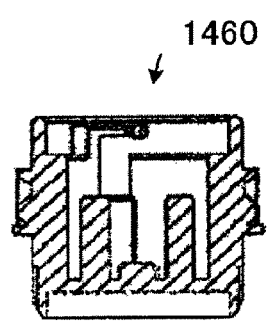
Figure 43D:
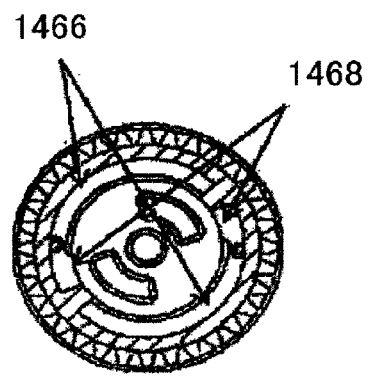

FIGS. 42A to 42C illustrate a transmission apparatus 1400 which functions as an end member that is another aspect. The transmission apparatus 1400 includes a gear member (outline) 1460 which functions as a bearing member, an intermediate member 1430, and a transmission unit 1420 which functions as a shaft member.

As can be ascertained from FIGS. 43A to 43D, the gear member 1460 includes a center protruding portion 1462 which extends upward in the shaft direction from a bottom wall of the gear member 1460, and one or more peripheral protruding portions 1464 which are positioned on the outer side in the radial direction of the center protruding portion 1462. In the aspect illustrated in FIGS. 43A to 43D, two peripheral protruding portions 1464 are provided. However, the number of peripheral protruding portions 1464 may be one, or may be three or more.

The gear member 1460 further includes an inner wall surface projection 1466 on an inner surface thereof, and one or more receiving members 1468 which are on the inner wall surface projection 1466 or are adjacent to the inner wall surface projection 1466. The inner wall surface projection 1466 may continuously extend at a circumference of the inner surface of the gear member 1460, and may include one or more receiving members 1468 on the inner wall surface projection 1466. Otherwise, the inner wall surface projection 1466 may include one or more pieces which do not continuously extend at the circumference on the inner surface of the gear member 1460, or one or more receiving members 1468 may be disposed to be adjacent to the piece of the inner wall surface projection 1466.

As illustrated in FIGS. 44A to 44D, the intermediate member 1430 includes a cylindrical body 1432. From the cylindrical body 1432, one or more projections 1434 extend to the outer side in the radial direction. The intermediate member 1430 includes a guiding groove 1436 on a top surface thereof. In one aspect, the guiding groove has a size by which the projection of the shaft 1070 of the transmission unit 1420 can pass through the guiding groove 1436. Therefore, instead of the separated pin 1040, it is possible to use a projection integrated with the transmission unit, for example, a molded part of the shaft, together with the intermediate member. In another aspect, the guiding groove is smaller than the projection, and thus, it is necessary that the projection is inserted into the shaft of the transmission unit after being disposed in the intermediate member.

Figure 44A:
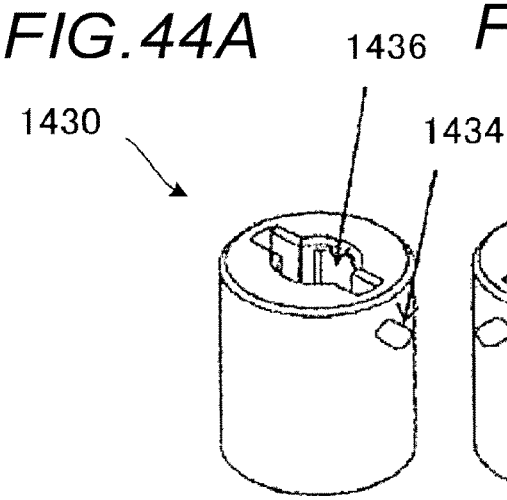
FIGS. 44A to 44D are views illustrating one aspect of an intermediate member used in the transmission apparatus.
Figure 44B:
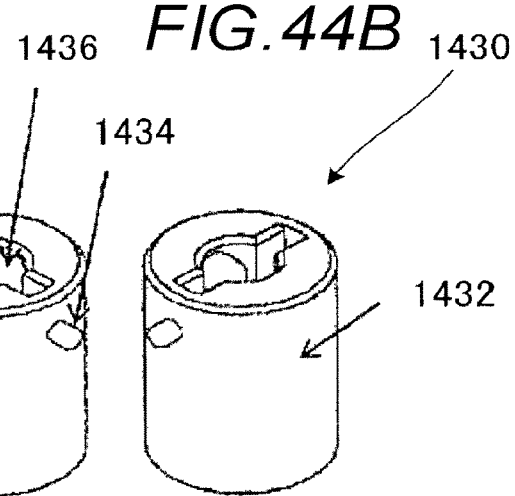
Figure 44C:
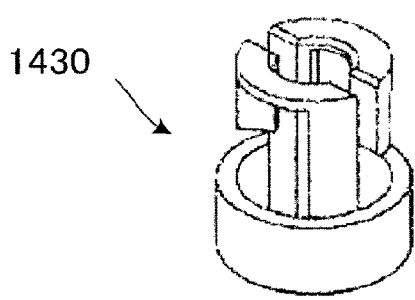
Figure 44D:
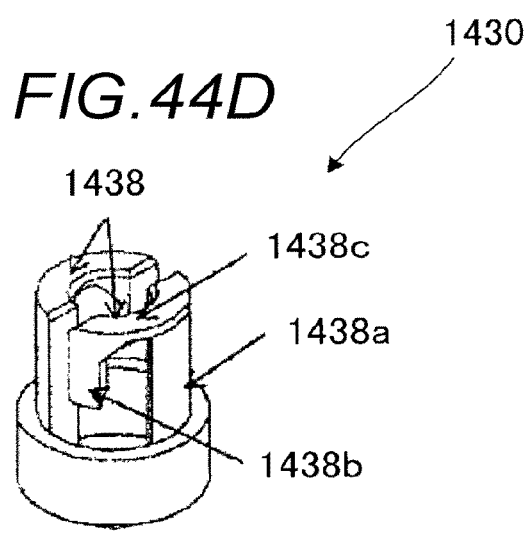

FIGS. 44C and 44D illustrate the intermediate member 1430 together with a top surface removed to expose a part of a cylindrical body 1432, that is, a transmission unit holding member 1438 of the intermediate member 1430. An aspect of the intermediate member 1430 which is illustrated includes the two holding members (transmission unit holding members) 1438 which extend upward in the shaft direction from the bottom of the intermediate member 1430 in the same manner to each other. Otherwise, the holding member 1438 may be formed or attached to the inner surface of the cylindrical body 1432 to extend to the inner side in the radial direction toward the center of the intermediate member 1430.

The holding members 1438 respectively include two shaft baffles 1438a and 1438b of which upper portions are linked to each other by a linking piece 1438c. The shaft baffle 1438a further extends toward the bottom surface of the cylindrical body 1432 from the shaft baffle 1438b. The transmission unit holding members 1438 are disposed to be separated from each other, and have a void.

Figure 46A:
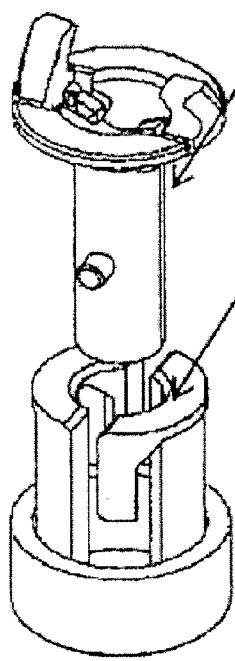
FIGS. 46A to 46D are views illustrating one aspect of the attaching process of the intermediate member of the transmission apparatus and the transmission unit.
Figure 46B:
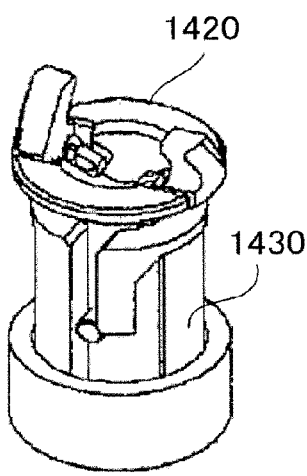
Figure 46C:
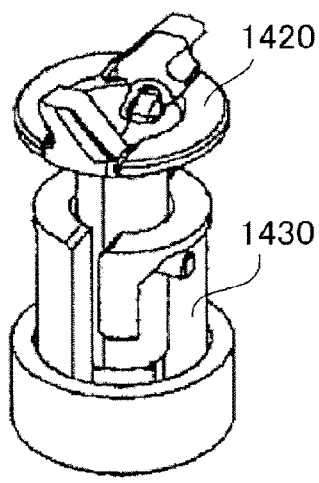

An attaching process of the transmission unit 1420 to the intermediate member 1430 will be described with reference to FIGS. 45A to 45C illustrating the intermediate member 1430 and the entire cylindrical body 1432, and FIGS. 46A to 46C illustrating the intermediate member 1430 and the cylindrical body 1432 of which a part is removed. The transmission unit 1420 is similar to a transmission unit 1020' configured of the two members described above. However, another transmission unit can also be used together with the intermediate member 1430 and the gear member 1060. For example, the number and the shape of the engaging blocks 1082 can be changed as described in the specification.

The shaft 1070 of the transmission unit 1420 is inserted in the shaft direction to be on one straight line with the guiding groove 1436 which is an upper surface of the intermediate member 1430 such that the pin 1040 passes through the guiding groove 1436. Since the transmission unit 1420 is further moved in the shaft direction into the intermediate member 1430, in order to prevent transmission unit 1420 from rotating with respect to the intermediate member 1430 by the shaft baffles 1438a and 1438b of each of the holding members 1438, the pin 1040 is raised by the shaft baffles 1438a and 1438b.

The transmission unit 1420 gradually moves to a far part in the shaft direction such that the pin 1040 sufficiently passes through the bottom of the short shaft baffle 1438b. At this time, the transmission unit 1420 can rotate with respect to the intermediate member 1430. In the aspect of FIGS. 45A to 45C and 46A to 46C, the transmission unit 1420 rotates in a counterclockwise direction. However, in one aspect, the rotation may be performed in a clockwise direction as the positions of the shaft baffles 1438a and 1438b are reversed.

Figure 46D:
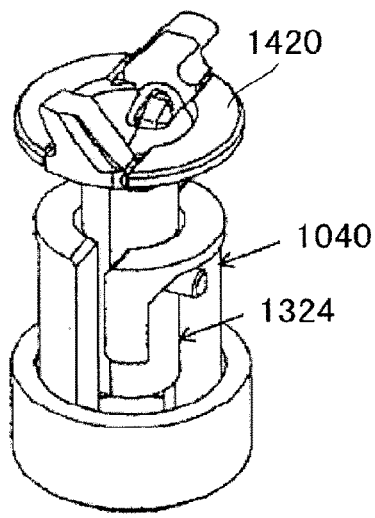

After the pin 1040 rotates passing through the bottom of the short shaft baffle 1438b, the pin 1040 enters a place which is called the guiding groove 1324 on the upper side. As illustrated in FIG. 46D, the guiding groove 1324 of the intermediate member 1430 is different from the description above in that the transmission unit 1420 is partially open such that the pin is attached to (or integrated with) the transmission unit 1420 before being inserted into the intermediate member 1430. Even when the guiding groove 1324 is partially open, as will be described later, the transmission unit 1420 is biased in the shaft direction by the elastic member 1050, such as a spring, and the pin 1040 is held in the guiding groove 1324.

As illustrated in FIG. 46D, the shape of the guiding groove 1324 formed by each of the holding members 1438 is inclined, and a part which extends to be parallel to the bottom side are provided on the upper side, the short shaft baffle 1438b does not extend to the rectangular bottom, and thus, parts other than the part including the opening on the left side have a rectangular shape. Other shapes, such as a rectangular shape, a quadrangular shape, an elliptical shape, a circular shape, or a triangular shape may be employed as long as the guiding groove 1324 formed by each of the holding members 1438 has a shape by which the pin enters the guiding groove 1324 and the guiding groove 1324 can hold the pin 1040 while the transmission unit 1420 freely moves and rotates in the shaft direction.

Figure 47A:
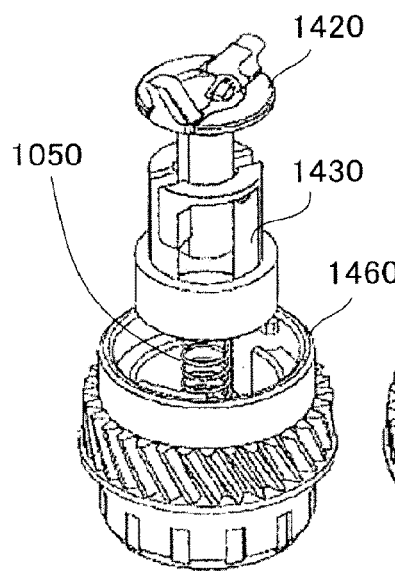
FIGS. 47A to 47C are views illustrating one aspect of the transmission apparatus and the assembly process thereof.
Figures 47B, 47C:
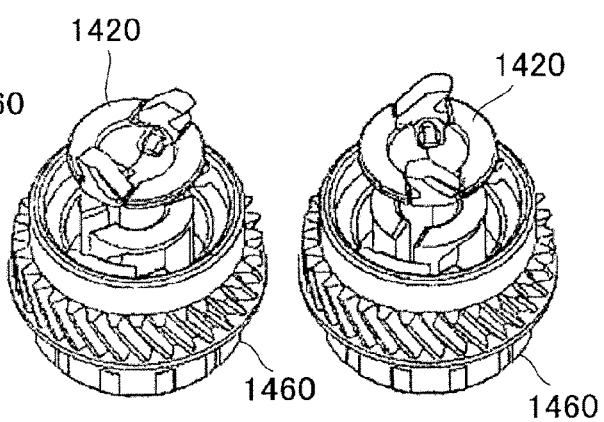

An attaching process of the intermediate member 1430 to the gear member 1460 will be described. When the intermediate member 1430 is integrated with or separated from the transmission unit 1420 that is already attached to the intermediate member 1430, the intermediate member 1430 can be attached to the gear member 1460. FIGS. 47A to 47C illustrate an aspect of the intermediate member 1430 attached to the gear member 1460 after the transmission unit 1420 is attached to the intermediate member 1430. FIGS. 47A to 47C illustrate an attaching process similar to that of FIGS. 42A to 42C, but a part of the cylindrical body 1432 is removed.

The elastic member 1050 is inserted into the gear member 1460, and is held between the center protruding portion 1462 and the peripheral protruding portion 1464. Next, the intermediate member 1430 is inserted into the gear member 1460 to the projection 1434 in the shaft direction. As can be ascertained from FIG. 42B, the projection 1434 extends to the outer side in the radial direction from the cylindrical body 1432 of the intermediate member 1430, and comes into contact with the inner wall surface projection 1466 of the gear member 1460. In addition, as can be ascertained from FIG. 42C, the intermediate member 1430 rotates until the projection 1434 comes into contact with the receiving member 1468. The receiving members 1468 respectively include openings, and the projection 1434 is fixed at the opening by snap-fitting. By the snap-fitting, the projection 1434 is prevented from going out to the rear part from the receiving member 1468 as long as a force which is sufficient for releasing the snap-fit state is not applied. In addition, the projection 1434 may be held at the opening by friction, or the projection may go out from the opening to be freely movable without resistance from the opening.

When the projection 1434 is received by the receiving member 1468, the gear member 1460 is attached to the intermediate member 1430. As described above, the transmission unit 1420 can be attached to the intermediate member 1430 before the intermediate member 1430 is attached to the gear member 1460. In this case, since the intermediate member 1430 is inserted into the gear member 1460 in the shaft direction, the elastic member 1050 passes through the opening which is at the bottom of the intermediate member 1430, comes into contact with the shaft 1070 of the transmission unit 1420, and biases the transmission unit 1420 to be far from the bottom of the intermediate member 1430. Accordingly, the pin 1040 of the shaft 1070 is oriented toward the upper side of the guiding groove 1324, is biased to be far from the opening of the guiding groove 1324, and accordingly, can hold the pin 1040 in the guiding groove 1324. Accordingly, the transmission unit 1420 remains in a state of being attached to the intermediate member 1430.

In order to remove the transmission unit 1420 from the intermediate member 1430, a force in the shaft direction which sufficiently exceeds the biasing force by the spring (elastic member) 1050 is applied to the transmission unit 1420, and accordingly, the transmission unit 1420 is moved in the shaft direction toward the bottom of the intermediate member 1430. In addition, the transmission unit 1420 rotates such that the pin 1040 passes through the lower part of the bottom of the short shaft baffle 1438*b*. After the pin 1040 passes through the lower part of the bottom of the shaft baffle 1438*b*, while the pin 1040 passes through the void between the holding members 1438, the transmission unit 1420 moves the transmission unit 1420 in the shaft direction and is separated from the bottom of the intermediate member 1430, and accordingly, the transmission unit 1420 can be freely separated from the intermediate member 1430 and can go out to the outside of the guiding groove 1436.

In a case where the intermediate member 1430 is not attached to the transmission unit 1420 after the intermediate member 1430 is attached to the gear member 1460, the intermediate member 1430 is attached to the transmission unit 1420 as described above, but the case is overcome since a biasing force is generated by the elastic member 1050, the force moves the transmission unit 1420 in the shaft direction to the bottom of the intermediate member 1430, and the transmission unit 1420 rotates such that the pin 1040 passes through the lower part of the bottom of the short shaft baffle 1438*b* and goes into the guiding groove 1324.

Another aspect of the transmission apparatus is illustrated by a reference number 1500 in FIGS. 48A to 52B. The transmission apparatus 1500 which functions as the end member includes a gear member (outline) 1560 which functions as a bearing member, an intermediate member 1530, and a transmission unit 1520 which functions as a shaft member. Each of the members is as described above in the transmission apparatus 1400, but the differences will be described in the following.

Figure 51:
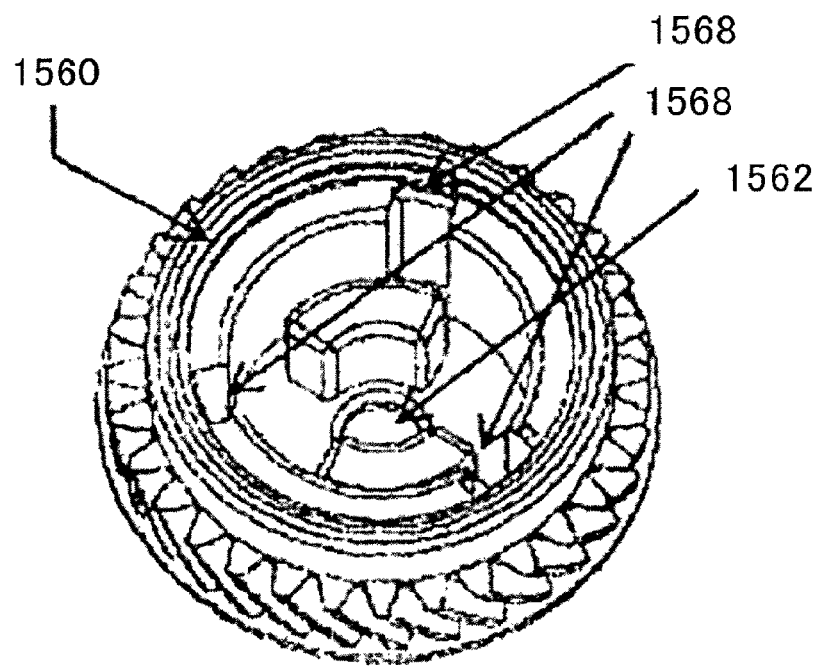
FIG. 51 is a view illustrating one aspect of the gear member used in the transmission apparatus.
Figure 52A:
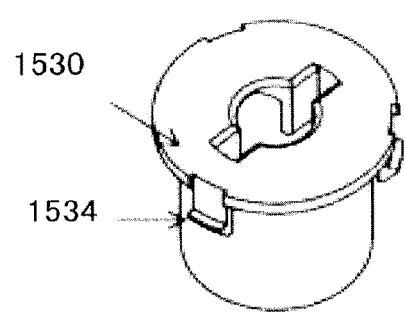
FIGS. 52A and 52B are views illustrating one aspect of the intermediate member used in the transmission apparatus.
Figure 52B:
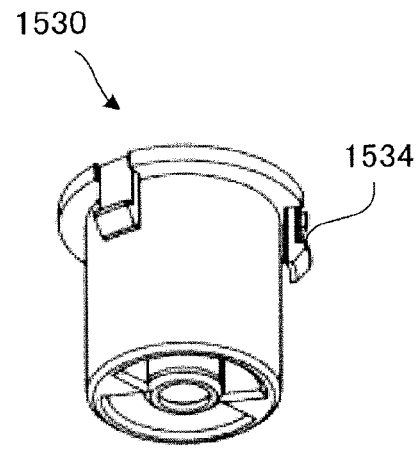

As illustrated in FIG. 51, the gear member 1560 includes a recess 1562 instead of the center protruding portion 1462 at the center of the bottom surface. In addition, one or more receiving members 1568 are provided instead of one or more receiving members 1468, and as will be described in detail in the following, a clip 1534 of the intermediate member 1530 is received and held instead of receiving and holding the projection 1434 of the intermediate member 1430.

The gear member 1560 of the aspect illustrated in FIG. 51 includes three receiving members 1568 which are separated from each other by three inner wall surface projections. However, the gear member 1560 may include one, two, four, or more receiving members 1568. Preferably, the number of receiving members 1568 is the same as the number of clips 1534 of the intermediate member 1530.

Figures 48A, 48B:
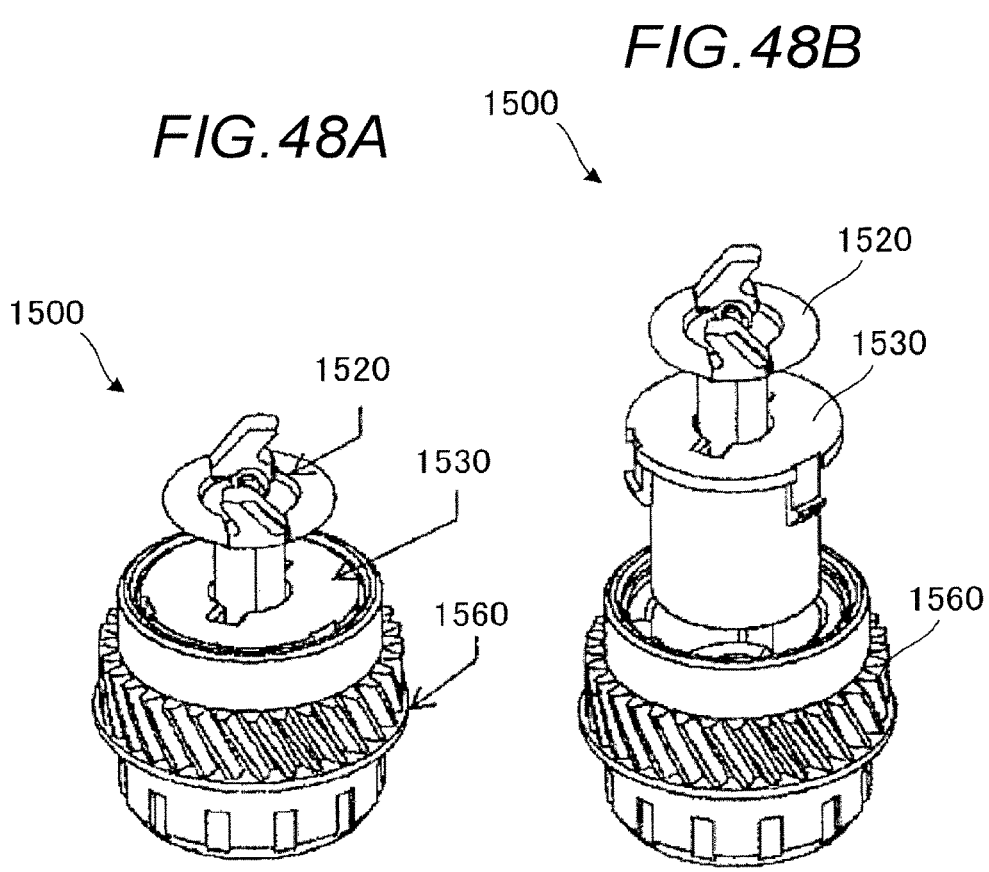
FIGS. 48A and 48B are views illustrating one aspect of the transmission apparatus and the assembly process thereof.
Figure 50:
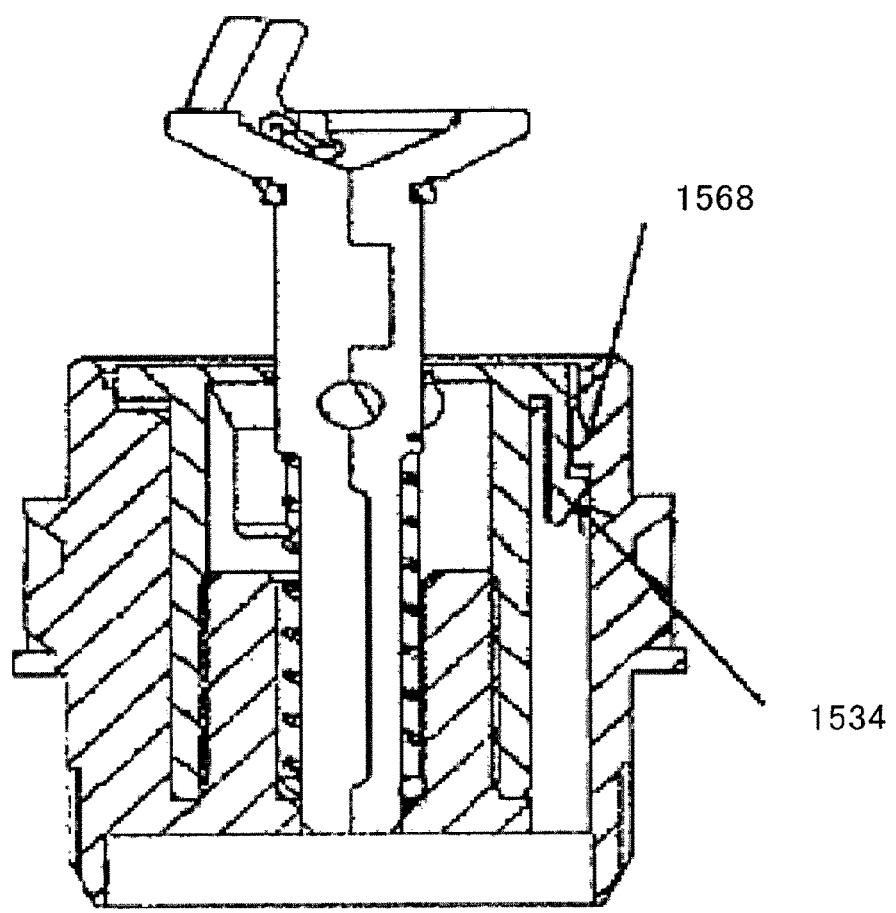
FIG. 50 is a sectional view illustrating one aspect of the transmission apparatus.

As described above, the intermediate member 1530 includes the clip 1534 instead of the projection 1434. Therefore, as illustrated in FIGS. 48A and 48B, the clips 1534 are aligned on one straight line with the receiving member 1568, the intermediate member 1530 is pushed to the gear member 1560 in the shaft direction, and accordingly, the intermediate member 1530 can be attached to the gear member 1560. First, the clip 1534 comes into contact with the receiving member 1568, and the intermediate member 1530 continues to be pushed to the inside of the gear member 1560 being bent to the inner side in the radial direction. When the intermediate member 1530 moves only by a sufficient distance in the shaft direction, the clip 1534 passes through the receiving member 1568, and elastically returns to the original posture. As illustrated in FIG. 50, at the attaching position, each of the clips 1534 includes a projection on the inner wall surface. When the user tries to detach the intermediate member 1530 from the gear member 1560, the projection on the inner wall surface comes into contact with the receiving member 1568, and the intermediate member 1530 is prevented from being detached from the gear member 1560. Therefore, instead of being inserted and rotating in the shaft direction, the intermediate member 1530 is attached to the gear member 1560 as the clip 1534 is on one straight line with the receiving member 1568, and the clip 1534 moves the intermediate member 1530 in the shaft direction until passing through the receiving member 1568.

In another aspect, even when the intermediate member 1530 is completely inserted into the gear member 1560, the receiving member extends in the shaft direction such that the clip 1534 comes into contact with the receiving member 1568. Therefore, while the clip 1534 remains being bent, by the friction generated due to the contact state with the clip 1534, the receiving member 1568 holds the intermediate member 1530 in the gear member 1560.

The transmission unit 1520 to which the intermediate member 1530 and the gear member 1560 are attached as illustrated in FIG. 49A is similar to the transmission unit 1420, but is different in that the shaft 1070 includes a part 1570 having a narrow diameter. In order to assemble the intermediate member 1530 and the transmission unit 1520, the elastic member 1050 is disposed around the part 1570 having a narrow diameter in the shaft 1070. In addition, the shaft 1070 of the transmission unit 1520 is inserted into the guiding groove 1436, and moves and rotates in the shaft direction. In this manner, as can be ascertained from FIGS. 49A and 50, the elastic member 1050 is disposed in the intermediate member 1530. The elastic member comes into contact with the bottom of the intermediate member 1530, a biasing force is generated with respect to the transmission unit 1520.

When the transmission unit 1520 moves in the shaft direction, more spaces for moving the shaft 1070 in the shaft direction are generated by a recess 1562 of the gear member 1560. Otherwise, instead of the recess 1562, a hole for making the shaft to pass through the gear member 1560 may be provided.

Similar to the transmission apparatus 1400, the intermediate member 1530 can be attached to the transmission unit 1520 even before and after the intermediate member 1530 is attached to the gear member 1560.

Figure 53A:
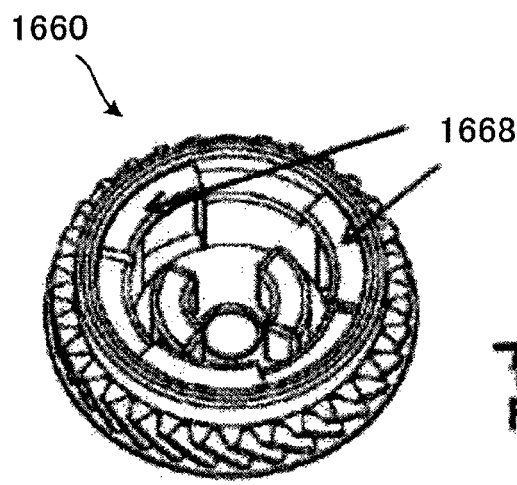
FIGS. 53A to 53C are views illustrating one aspect of the gear member used in the transmission apparatus.
Figure 53B:
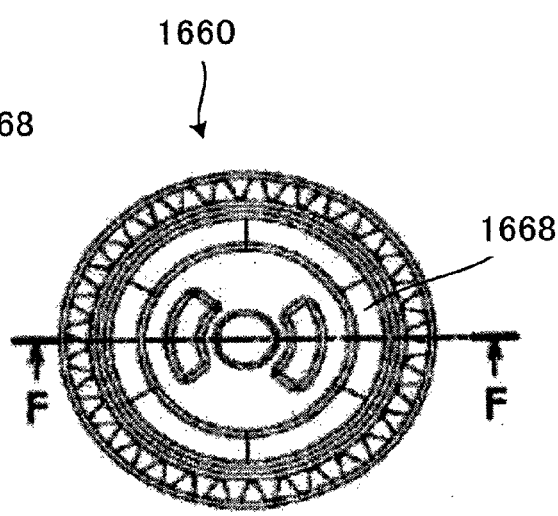
Figure 53C:
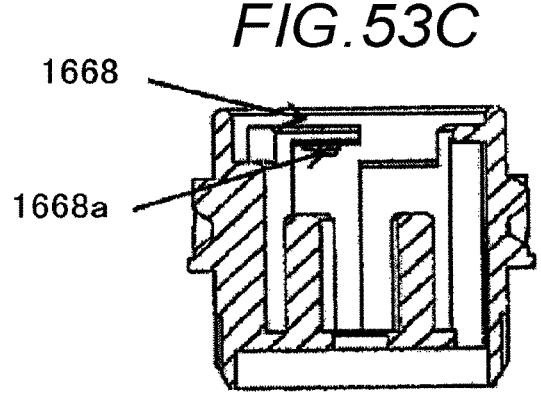

In another aspect of the transmission apparatus 1500, as illustrated in FIGS. 53A to 53C, by using a gear member 1660 instead of the gear member 1560, an intermediate member 1630 may be used instead of the intermediate member 1530. Hereinafter, except for the above-described difference, the gear member 1660 is the same as the gear member 1560, and the intermediate member 1630 is the same as the intermediate member 1530.

As can be ascertained from FIGS. 53A to 53C, the gear member 1660 includes a receiving member 1668 instead of the above-described receiving member 1568. Each of the receiving members 1668 includes a protruding portion 1668*a* which extends from the bottom surface of the receiving member 1668.

Figure 54A:
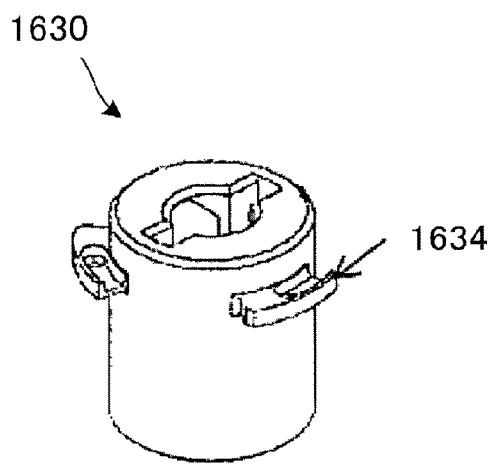
FIGS. 54A and 54B are views illustrating one aspect of the intermediate member used in the transmission apparatus.
Figure 54B:
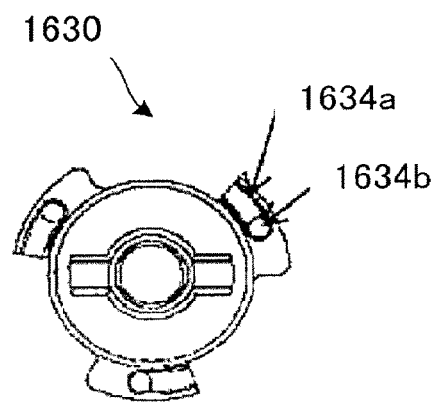

As can be ascertained from FIGS. 54A and 54B, the intermediate member 1630 includes a projection 1634 which extends from the cylindrical body to the outer side in the radial direction. Each of the projections 1634 includes a groove 1634*a* which is recessed from the upper surface of the projection. The groove 1634*a* extends from one end of the projection 1634, and is finished in a caved portion 1634*b* which is more recessed than the groove from the upper surface of the projection 1634. In addition, a through-hole may be used instead of the caved portion 1634*b*.

Figure 55A:
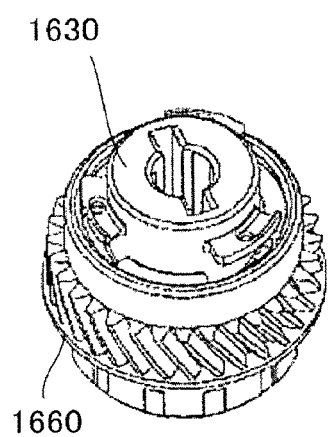
FIGS. 55A to 55C are views illustrating one aspect of the attaching process of the intermediate member used in the transmission apparatus and the gear member.
Figure 55B:
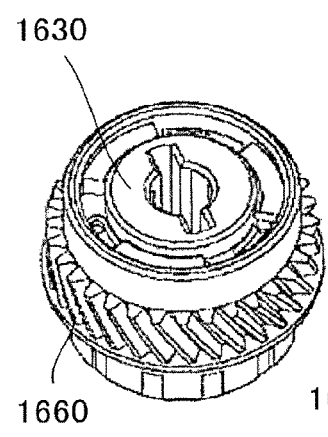
Figure 55C:
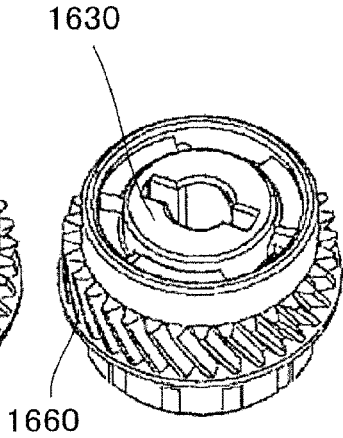

As can be ascertained from FIGS. 55A to 55C, the intermediate member 1630 can be attached to the gear member 1660 as the intermediate member 1630 is inserted in the shaft direction into the gear member 1660, and the projections 1634 are aligned on one straight line to pass through between the receiving members 1668 adjacent to each other until the projection 1634 comes into contact with the inner wall surface projection 1466. After the projection 1634 comes into contact with the inner wall surface projection 1466, the intermediate member 1630 rotates in the first direction (counterclockwise direction in FIGS. 55B and 55C) in accordance with the gear member 1660 such that each of the projections 1634 passes through the lower part of the corresponding receiving member 1668. When the intermediate member 1630 rotates, the protruding portion 1668a moves in the caved portion 1634b. In the aspect, the protruding portion 1668a comes into contact with the caved portion 1634b when the intermediate member 1630 rotates.

When the intermediate member 1630 further rotates, the protruding portion 1668a enters the caved portion 1634b, and the protruding portion 1668a is held by snap-fitting, friction or fastening, on the inside thereof. In one aspect in which the elastic member 1050 is positioned between the intermediate member 1630 and the gear member 1660, the elastic member biases the protruding portion 1668a to the caved portion 1634b, and helps the protruding portion 1668a be maintained in the caved portion 1634b.

The material which configures each member of the shaft member is not particularly limited, but a resin, such as polyacetal, polycarbonate, or PPS, or metal can be used. However, in order to improve the rigidity of the member, glass fibers or carbon fibers may be mixed into the resin in accordance with the load torque. In addition, the rigidity may further be improved by inserting metal into the resin, or the entire body may be manufactured by using metal.

The above-described structures including the transmission unit, the intermediate member, and the gear member can be respectively formed of metal and/or plastic. In one aspect, the gear member and the intermediate member is one member configured by two parts, the gear member and the intermediate member are respectively zinc the casts, and the intermediate member is bonded by insert molding not to be fallen out from the gear member. In another aspect, the gear member and the intermediate member may be respectively made of a resin, and may be assembled by the above-described method without using the insert molding. Therefore, the intermediate member can be detached from the gear member such that any part can be exchanged as necessary. The transmission unit can also be detached from the intermediate member and the gear member as necessary, and can be exchanged.

In a case where any of the above-described transmission apparatuses is used, the outline is fastened to the photosensitive drum installed in a toner cartridge, and the engaging structure of the transmission unit protrudes from one end of the toner cartridge. When the user attaches the toner cartridge to an accommodating portion of the image forming apparatus, a part of the driving member of the image forming apparatus is received at a receiving space, the engaging recessed portion is received and engaged with two columns of the driving member of the imaging apparatus, and accordingly, the engaging structure of the transmission unit is engaged with the driving member of the image forming apparatus disposed in the accommodating portion. Accordingly, the driving member of the image forming apparatus rotates the photosensitive drum.

The aspect of the transmission apparatus described here is simpler than that of the related art from the viewpoint of the structure, and a linking method and a detaching method of the transmission apparatus to and from the image forming apparatus are different from those of the related art. The transmission unit is movable along the drum axis L, and at the same time, by a shape which has characteristics of being rotatable along the drum axis L or characteristics of the engaging block of the transmission unit, even when the transmission apparatus is attached to or detached from the accommodating portion of the image forming apparatus at any angle, the transmission unit is firmly attached to the driving member and is smoothly detached from the driving member.

Figure 56:
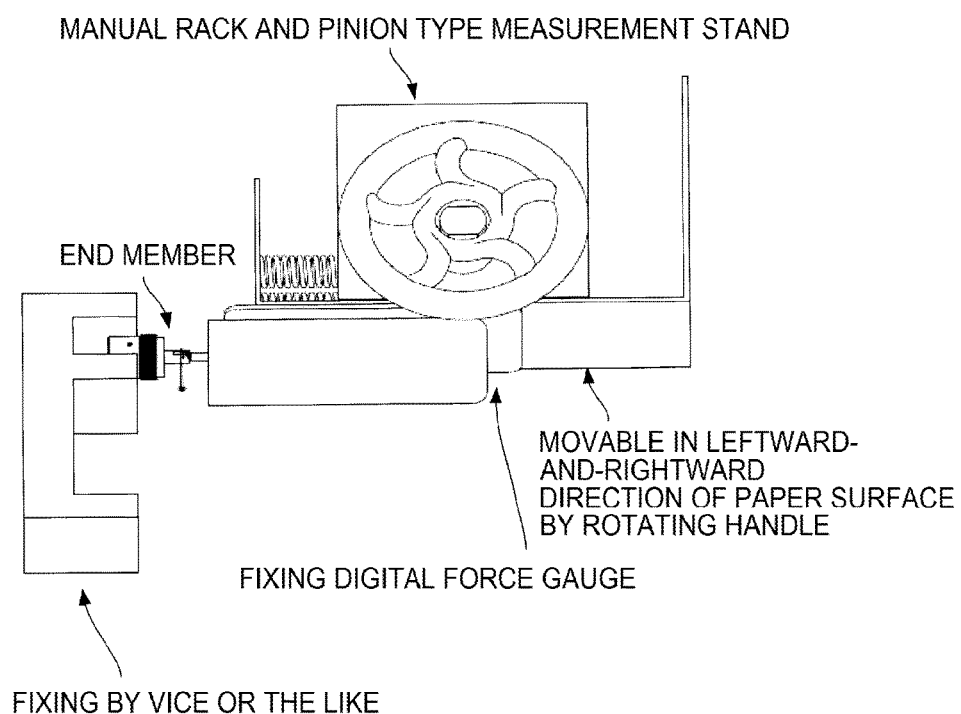
FIG. 56 is a schematic view illustrating a measurement test of the maximum static friction coefficient of the rotating shaft with respect to the bearing member.

Next, easiness of start of the rotating shaft with respect to the bearing member when the rotating shaft is pushed and moved to the bearing member in the axial direction, that is, a measurement test of the maximum static friction coefficient, will be described. In the measurement test, by using a digital force gauge (ZTA-5N) manufactured by IMADA, as illustrated in FIG. 56, the end member of the present invention is also disposed. However, in the measurement, a state where the rotating shaft elastic member is removed is achieved.

In the measurement test, while applying the force perpendicularly downward with respect to the rotating shaft, by using a manual rack and pinion type measurement stand, when the digital force gauge (manufactured by IMADA) is made to be close at 0.6 mm/sec in the axial direction of the rotating shaft, the maximum force related to the pushing of the rotating shaft is measured. Here, the perpendicularly downward force applied to the rotating shaft is applied by hanging weights having different weights. In the measurement test, weights, such as 200 g, 300 g, 400 g, 500 g, 750 g, and 1000 g, are respectively used. The value of the weight here also includes a self load of a jig (a wire or a container) used for hanging the weight.

Figure 57:
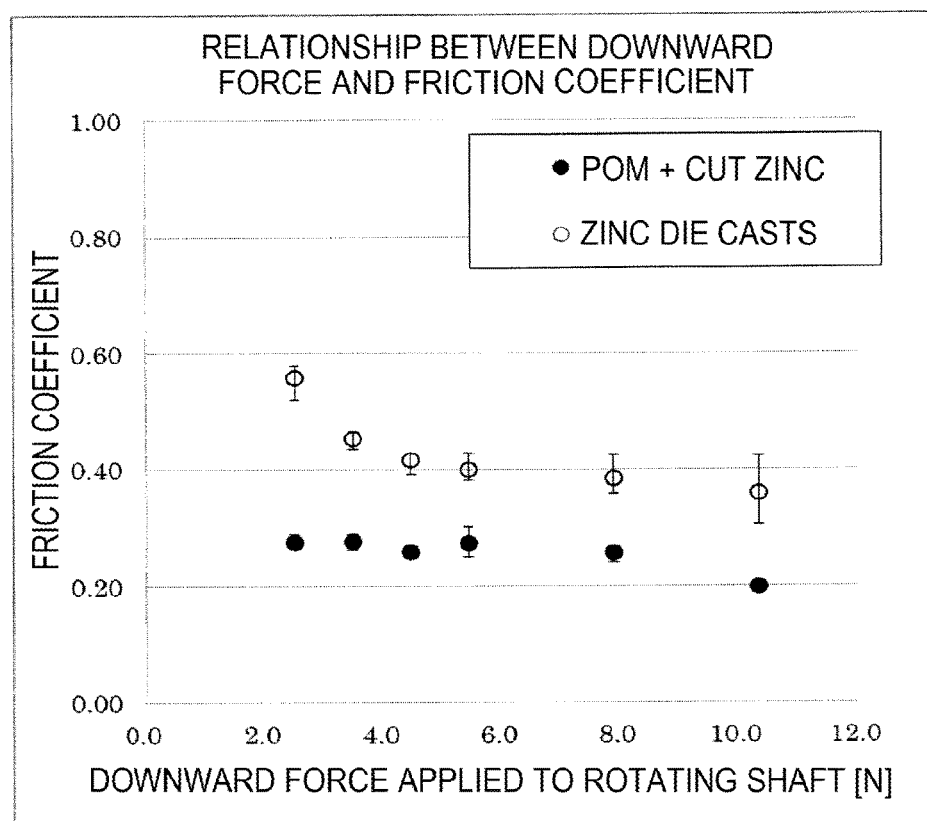
FIG. 57 is a graph in which static friction coefficients according to a difference in material of the bearing member and the rotating shaft are compared to each other.

When the measurement performed for 10 seconds at a sampling speed for 100 times for each second is regarded as one time, the measurement is performed three times, and an average of each of the maximum values is a measured value at the downward force. FIG. 57 illustrates the measurement result.

Here, a static friction coefficient acquired from the above-described measurement test will be described. A force that pushes the rotating shaft is F, a force applied downward with respect to the rotating shaft is R, and the static friction coefficient is $\mu$.

Figure 58:
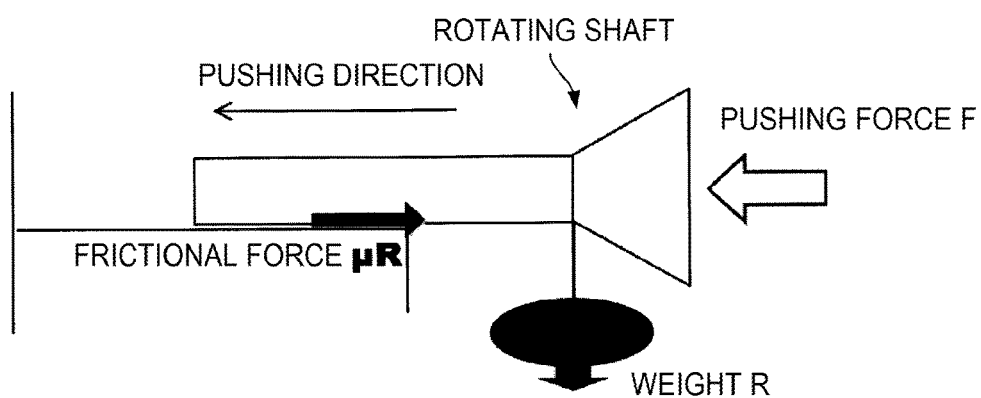
FIG. 58 is a schematic view illustrating a state when a force F which pushes the rotating shaft is applied at an equivalent speed.

As illustrated in FIG. 58, when F that pushes the rotating shaft is applied at an equivalent speed, the following equation is established at the moment when the rotating shaft starts to move.

$$F=\mu R$$

In addition, the maximum value of $\mu$ is the maximum static friction coefficient.

FIG. 57 is a view in which the static friction coefficients according to a difference in material of the bearing member and the rotating shaft are compared to each other.

The vertical axis illustrates a friction coefficient, and a horizontal axis illustrates a perpendicularly downward force [N] applied to the rotating shaft. Solid circles illustrate a case where the bearing member is manufactured by using a polyacetal resin (POM) and the rotating shaft is manufactured by cutting zinc, and hollow circles illustrate a case where both of the bearing member and the rotating shaft are manufactured by using a zinc die cast.

Next, a test for measuring smoothness when mounting the process cartridge by using the process cartridge including an electrophotographic photosensitive body with which the above-described end member is engaged, will be described.

In the measurement test of the smoothness, a process cartridge which corresponds to a laser printer (HP LaserJet P2055) manufactured by Hewlett-Packard Company is prepared. As the used rotating shaft elastic member, a coil spring may be used in any case.

In the test, "usual mounting" was tested for 60 times, and forces applied to the rotating shaft during the mounting are compared to each other. Here, "usual mounting" means mounting of the process cartridge by pushing the process cartridge in a direction orthogonal to the axial direction of the photosensitive drum unit.

With respect to the end member provided with the bearing member manufactured by POM and the cut zinc rotating shaft, and the end member in which both of the bearing member and the rotating shaft are manufactured by a zinc die cast, the process cartridge mounting test was performed.

The result of the mounting test is illustrated in Table 1. In Table 1, "A" means that the process cartridge can be smoothly mounted, "B" means that the process cartridge can be mounted not as smooth as "A" but without a problem, and "C" means that the process cartridge fails to be mounted.

TABLE 1

|  | Material of rotating shaft | Material of bearing member | A | B | C |
| --- | --- | --- | --- | --- | --- |
| Example 1 | Cut zinc | Polyacetal resin | 53 times | 7 times | 0 times |
| Comparative example 1 | Zinc die cast | Zinc die cast | 44 times | 10 times | 6 times |

As can be ascertained from Table 1, in the usual mounting, the mounting of process cartridge was not possible 6 times (10% of possibility) among 60 times in Comparative Example 1 in which any material is a zinc die cast. Meanwhile, in a case of Example 1, a case where the mounting of the process cartridge is not possible was seen 0 times (0% of possibility). In other words, when the friction coefficient is low, it is possible to smoothly mount the process cartridge. In addition, for the cases of the 6 times of failure, re-mounting can be performed without a problem.

In the investigation result of the above-described mounting test, by selecting the material or the processing method of the rotating shaft and the bearing member, and by setting the maximum static friction coefficient applied when the rotating shaft moves in the rotating axial direction with respect to the bearing member to be equal to or less than 0.40 when the force which acts in the direction orthogonal to the frictional force direction is 2.5 to 10.5 N, the process cartridge can be smoothly mounted. From the viewpoint of smoothness of the mounting of the process cartridge, the maximum static friction coefficient is preferably a small value, and specifically, when the force which acts in the direction orthogonal to the frictional force direction is 2.5 to 10.5 N, the maximum static friction coefficient is preferably equal to or less than 0.35, and more preferably equal to or less than 0.30.

A method for reducing the friction coefficient (maximum static friction coefficient) to a small value, for example, to be equal to or less than 0.40, is not particularly limited. Similar to the above-described example, by researching the material of the member itself, for example, by configuring the bearing member by a polyacetal resin or by configuring the rotating shaft by cut zinc, it is possible to reduce the friction coefficient. In addition, it is possible to employ various methods as a method for reducing the friction coefficient, for example, by supplying a lubricant, such as grease, to a sliding portion of the bearing member and the rotating shaft, or by performing predetermined plating for deteriorating the friction on the surfaces in any one or both of the rotating shaft and the bearing member.

The above-described aspects are used only for the practical examples and the description, and do not intend to entirely include the present invention and to be limited to specific aspects that disclose the present invention. Various changes or variations are possible based on the description above.

The above-described aspects are selected and described such that those skilled in the art can use the present invention and various aspects by changing the present invention and various aspects according to the use determined in advance, by describing the principle of the present invention and practical employment. By those skilled in the art, other aspects become apparent without departing from the spirit and the range of the present invention. The range of the present invention is regulated not by the above-described description or aspects but by additionally described claims.

Reference signs are listed below.
1: IMAGE FORMING APPARATUS
2: IMAGE FORMING APPARATUS BODY
3: PROCESS CARTRIDGE
10: PHOTOSENSITIVE DRUM UNIT
11: PHOTOSENSITIVE DRUM (COLUMNAR ROTATING BODY)
20: LID MEMBER
30, 130, 230, 330, 430, 530, 630: END MEMBER
40, 140, 440, 540, 640: BEARING MEMBER
50, 150, 250, 350, 450, 550, 650: SHAFT MEMBER
51, 151, 251, 351, 451: ROTATING SHAFT
55, 155, 262, 362: ROTATING FORCE RECEIVING MEMBER
59, 159, 270, 370: REGULATING MEMBER

What is claimed is:

1. An end member to be disposed in an end portion of a columnar rotating body mounted on an image forming apparatus body, the end member comprising:
a tubular bearing member; and
a shaft member held by the bearing member,
wherein the shaft member includes a rotating shaft which is rotatable around an axis and movable in an axial direction, and a rotating force receiving member which is disposed in one end portion of the rotating shaft and includes an engaging member to be engaged with a driving shaft of the image forming apparatus body,
wherein the engaging member is switchable between a posture of being engaged with the driving shaft and a posture of not being engaged with the driving shaft, and
wherein a maximum static friction coefficient applied when the rotating shaft moves in a rotating axial direction with respect to the bearing member is equal to or less than 0.40 where a force that acts in a direction orthogonal to a frictional force direction is 2.5 to 10.5 N.

2. The end member according to claim 1, wherein the bearing member includes an intermediate member having a guiding groove, and the intermediate member holds the shaft member to be rotatable around the axis and movable in the axial direction.

3. The end member according to claim 2, wherein the intermediate member which holds the shaft member is attachable and detachable in a state of being mounted on a cartridge.

4. The end member according to claim 2, wherein the intermediate member is made of a resin.

5. A photosensitive drum unit comprising:
    the end member according to claim 1 in the end portion of the columnar rotating body.

6. A process cartridge comprising:
    the photosensitive drum unit according to claim 5.

* * * * *